United States Patent

[11] 3,558,829

[72] Inventors Enn Aro;
Thomas K. Cheney; James J. Dankowski;
Clifford M. Fearn; Carl B. Nennerfelt;
Albert D. Patterson; Robert W. Sharland;
James A. Watts, Galion, Ohio

[21] Appl. No. 736,634

[22] Filed June 13, 1968

[45] Patented Jan. 26, 1971

[73] Assignee North Electric Company
Galion, Ohio
a corporation of Ohio

[54] CROSSBAR TELEPHONE SWITCHING SYSTEM WITH MARKER AND PROCESSOR STORED PROGRAM CONTROL
48 Claims, 41 Drawing Figs.

[52] U.S. Cl. .......................................................... 179/18

[51] Int. Cl. .......................................................... H04q 3/54

[50] Field of Search ........................................... 179/22
Cursory), 18SP, 18.211, 18.9

[56] References Cited

UNITED STATES PATENTS

| | | | |
|---|---|---|---|
| 3,365,548 | 1/1968 | Lucas et al. .................... | 179/18(.211) |
| 3,458,662 | 7/1969 | Hayes et al. .................... | 179/18(SP) |

*Primary Examiner*—Kathleen H. Claffy
*Assistant Examiner*—Thomas W. Brown
*Attorney*—Johnson, Dienner, Emick, Verbeck and Wagner

ABSTRACT: A telephone central office switching system in which communication paths are established over crossbar switches controlled by line group markers and group selector markers and which includes special features trunks. Logic for the special features trunks, interoffice trunks, and operator's trunks are concentrated in supervisory control units having a wired program; bulk memory in the form of magnetic cores with magnetic drum backup, changeable from the outside world, is provided for storage of data relative to called number information received, number group and translation functions, status of special features trunks, class of calls, line and trunk identification, etc.; and in which registering, translating, sending, control of supervisory control units, and other functions are processor controlled by means of a stored program which is changeable from the outside world to provide modified operation or new features.

INVENTORS

ENN ARO
THOMAS K. CHENEY
JAMES J. DANKOWSKI
CLIFFORD M. FEARN
CARL B. NENNERFELT
ALBERT D. PATTERSON
JAMES A. WATTS
ROBERT W. SHARLAND

BY

ATTORNEYS

NOTE : IN COMMON POOL OF RS-D UNITS, SLIPPED OR GRADED FROM TRL FIG. 7.

TWO-WAY TRUNK 416

FIG. 21 DATA TRANSFER UNIT (DTU-1)

NOTE:
CTX = CENTREX
PBX = PRIVATE BRANCH EXCHANGE
C.M. = CLASS MARKING
D.M. = DATA MEMORY
ALI = AUTOMATIC LINE

OPR. = OPERATOR
GSM = GROUP SELECTOR MARKER
K.C.RCVR = KEY CALL RECEIVER
ENTRY 0 = INITIAL ENTRY
EXIT S = EXIT TO SYSTEM SUPERVISORY PROGRAM
EXIT C = CENTREX OR PBX

ABB = ABBREVIATED
DIR. NO. = DIRECTORY NO.
SFT = SPECIAL FEATURES TRUNK
EXIT T.F. = TRUNK FORWARDING
EXIT E = OUTGOING TRUNK CALL
EXIT T.T. = TRUNK TERMINATION
EXIT S.C = SPECIAL CALL

CROSSBAR TELEPHONE SWITCHING SYSTEM WITH MARKER AND PROCESSOR STORED PROGRAM CONTROL

BACKGROUND OF THE INVENTION

1. Field of Invention

The present invention relates to telephone central office arrangements. (See Class 179)

2. Description of Prior Art

Certain types of crossbar telephone systems as exemplified in U.S. Pat. Nos. 2,989,592, 3,007,006, and 3,007,008 provide for expansion (and localization of any marker failure) by employing two subscriber line markers (each of which may be used for originating and terminating calls) for each thousand lines at the line stage with an expandable group selector stage having two group selector markers for each group selector building block.

In operation of such type system, when a subscriber lifts his handset, one of two randomly assigned subscriber line markers in his line group connects his telephone over the line stage crossbar switches, a subscriber originating trunk, and a subscriber register link to a register, whereupon the subscriber line marker used for such purpose becomes free to handle another call.

Upon receipt of dial tone, the calling subscriber dials the called number into the register, whereupon an idle sender is seized. If the called number is that of a local subscriber, the sender consults a number group circuit to determine the equipment location of the called line and the party on the line. The sender signals a group selector marker and code pulses two digits of information over tip and ring connections into the group selector marker which causes the associated group selector to extend the calling line over crossbar switches of the group selector into a subscriber terminating trunk associated with the called line group. At this time the group selector marker is released. The subscriber terminating trunk signals the sender which sends two coded pulses into the subscribers terminating trunk, the first coded pulse being associated with the class of call and the second coded pulse defining the ring signal.

The subscriber terminating trunk then calls in one of the two markers in the called line group, which markers are randomly assigned. The seized marker signals the sender which code pulses hundreds, tens, and units called location information thereto. As a result thereof, the marker, via the crossbar switch to which the called line is connected, tests the line as to its busy or idle condition. If the called line is found idle, the subscriber line marker extends a connection from the subscriber terminating trunk over the line-stage crossbar switches to the called line. The subscriber terminating trunk signals the sender, which releases, in turn releasing the register to cause the subscriber originating trunk to extend the connection to the subscriber terminating trunk. The marker is then released to handle another call. The called line is rung via the subscriber terminating trunk, and the calling line receives ringback tone over the subscriber terminating trunk. When the called party answers, communication may ensue.

If the call is to a distant subscriber, a translator (rather than a number group) is consulted, and the sender sends code pulses into the group selector marker which enables the associated group selector to extend the calling line over crossbar switches of the group selector stage into an interoffice trunk. The group selector marker then releases. The sender, except on calls to manual offices, outpulses via tip and ring connections over the established group selector path and over the trunk to complete the connection. The sender then releases.

An incoming trunk call is connected over a trunk register link to a register which seizes an idle sender. Such type of call does not involve a subscriber line marker for call origination but does involve a subscriber line marker for call termination on a trunk to local call, and proceeds much in the manner of the call described above. In such type call, however, the sender sends codes back over the incoming trunk to the group selector marker, etc.

In the above described crossbar systems, the logic of the system is "wired-in" so that provision of new features to meet modern day requirements and expected requirements would require much additional bulky hardware, and the incorporation of future features into existing switchboards would be difficult, if not economically unsound.

In addition, interoffice trunks and operator trunks each contain "wired-in" logic necessary for their operation, and as a result the trunk circuitry in such systems is relatively extensive, space consuming and expensive.

Different variations and improvements to or for such equipment are set forth in U.S. Pat. No. 3,377,433 which discloses a special features circuit, U.S. Pat. No. 3,336,442 which discloses a simplified trunk operated by common control, U.S. Pat. No. 3,133,184 which discloses electromechanical crossbar switches under the control of electronic central control equipment, and U.S. Pat. No. 2,955,165 which discloses a stored program controlled telephone system.

SUMMARY OF INVENTION

The present invention is directed to improvements on such type systems, and particularly to a system which includes means for enabling a crossbar telephone switching system of the general type described above for computer control by means of stored programs for the registering, translating, sending, and certain other functions in a manner which reduces the amount of hardware required, permits increased standardization of system components, and facilitates the incorporation of future new features by means of external software program changes.

Special features trunks are arranged as selector wraparound trunks, each additionally having a path to the main frame for line entrance as a line in its five hundred line group. These special feature trunks provide call waiting and three-way conference facilities, and are served by associated supervision control units. A reduction in interoffice, operator and special features trunk equipment and a great degree of standardization thereof is effected by concentrating trunk logic in the supervisory control units which serve the many trunks including the special features trunks.

Certain simple, inexpensive and existing relay logics which provide suitable electronic-electromechanical interface are retained, examples of which are subscriber line markers, group selector markers, and the logic of subscriber originating trunks and subscriber terminating trunks.

In carrying out the invention, pairs of routing control units are provided, each pair of which can serve a maximum of 16 subscriber line stage markers and a total of 128 senders, receivers, and receiver senders (although normally only ten subscriber line markers for five thousand lines or ten thousand directory numbers are required) and a maximum of 1,024 interoffice, operator, and special features trunks. Subscriber lines communicate with routing control units via line stage crossbar switches, subscriber originating trunks, receiver-sender circuits, and word-oriented data transfer units which act as a buffer between the electromechanical equipment and the electronic equipment of the routing control units. Under control of the program of the routing control units, dialed digit signals received in the receiver-senders are passed bit by bit in an online fashion into associated memory registers in the routing control units, and signals are sent bit by bit (or digit by digit as required) from the routing control units via the sender portion of the receiver-sender units. If pushbutton signalling is used at the calling substation, the multifrequency signals are routed under control of a routing control unit, via a multifrequency link, a key-call receiver, and a data transfer unit to the routing control unit where the information is stored in temporary memory register cores.

Interoffice, operator, and special features trunks communicate via an electromechanical-electronic buffer with supervisory control units, each of which normally handles up to 256 trunks, but are capable of handling a maximum of 512 trunks. Whenever a trunk requires the services of a routing control unit, the associated supervisory control unit sends an interrupt signal to the routing control unit which takes cognizance thereof, and inserts the request in the proper place in the program. Supervisory control units otherwise communicate with routing control units via data transfer units. If the incoming signalling over a trunk is of the multifrequency type, the routing control unit gives signals via a data transfer unit to a multifrequency link, which connects the trunk to a multifrequency receiver, and such receiver via the data transfer circuit communicates with the routing control unit. Similarly, if the incoming signalling over a trunk is of the code pulse type, the routing control unit gives signals via a data transfer unit to a multifrequency link, which connects the trunk to a key call receiver, and such receiver via the data transfer circuit communicates with the routing control unit. For sending purposes, the routing control unit via a data transfer unit connects the trunk to a sender which via the data transfer unit attains communication with the routing control unit.

Data transfer units are mounted in frames of equipment to act as concentration points so that fewer paths may lead to the routing control units. Transmission via data control units is by means of words containing a plurality of bits.

Each routing control unit comprises a multiplexer which connects to a processor, the processor comprising a data handling unit, a processor control unit and a memory for storing programs and for temporary storage of incoming call signals and the like.

Each routing control unit communicates with each data transfer unit in its associated line group (up to sixteen 500-line groups) via its multiplexer unit in a random manner as required. In certain cases, such as, for example, the data transfer units associated with supervisory control units and receiver-sender units, one routing control unit of a pair normally handles a certain combination of these data transfer units, and the other routing control unit of the pair normally handles a certain different combination of these data transfer units. Each routing control unit has the ability to take over the functions of the other in case of failure. Similarly, each supervisory control unit is arranged to take over the functions of a companion unit in case of failure.

A telephone system containing 20,000 lines (or 40,000 directory numbers) would comprise 40 groups of 500 lines each and can be served by four pairs of routing control units.

Number group data, routing translation data, and other data is stored in data memory facilities comprised of groups, each group comprising a core memory of 65K word capacity and control circuit, backed up for redundant purposes by a 65K word drum memory interface and control circuit, as many groups being provided as is necessary. In general, about one data core memory and associated drum is required for each 5,000 line group.

Each pair of routing control units communicates with all data memories via an assigned data transfer unit. After a routing control unit has requested information from the data memory, the data memory (when it has the answer ready) sends an interrupt signal to the routing control unit.

Subscriber line markers associated with each pair of routing control units communicate for line identity and class marking purposes via data transfer unit facilities with the routing control units.

Program instructions on magnetic tape may be fed into the associated routing control units. The routing control units may also print and/or send reports of internal conditions by means of teletype equipment.

Changes in data memory or program memory may be keyed into routing control units by means of a teletype keyboard. Initiation of a change sends an interrupt signal to the routing control unit.

BRIEF DESCRIPTION OF DRAWINGS

With reference to the drawings:

FIG. 22 comprises a block diagram of portions of the two routing control units connected to and associated therewith; and FIG. 20 provides expanded views in schematic and logic diagram form of certain word oriented crosspoints in FIG. 21;

OUTLINE

General Description of Block Diagram of FIGS. 1—13
Description of Routing Control Units
Description of Data Core and Drum Memories and Controls Loading Memories
Description of Data Transfer Units and Transfer Data
Local to Local Call
Local to Trunk Call
Trunk to Local Call
Trunk to Trunk Call
Call Waiting Via Special Features Trunk
Three-Party Conference Via Special Features Trunk
Abbreviated Dialing
Call Forwarding
Pad Switching
Supervisory Program of System
Processor
System Input/Output Operation

GENERAL DESCRIPTION OF BLOCK DIAGRAM (FIGS. 1—13)

The block diagram of FIGS. 1—13 sets forth the arrangement of a maximum size system of 20,000 lines or 40,000 directory numbers. The manner of providing a system of a reduced number of lines will be apparent to one skilled in the art from the following description.

In the block diagram of FIGS. 1—13, single line paths are used but it should be understood that most, if not all, of these paths comprise a plurality of conductors. Also in rectangles with crossbar symbols schematically representing crossbar switches, a minimum number of crossbar symbols are used to represent paths; however, it should be understood that many more crossbar horizontal and vertical members are implied. Furthermore, in many instances, a single rectangle may represent one circuit of a group of similar circuits.

Figure 1:
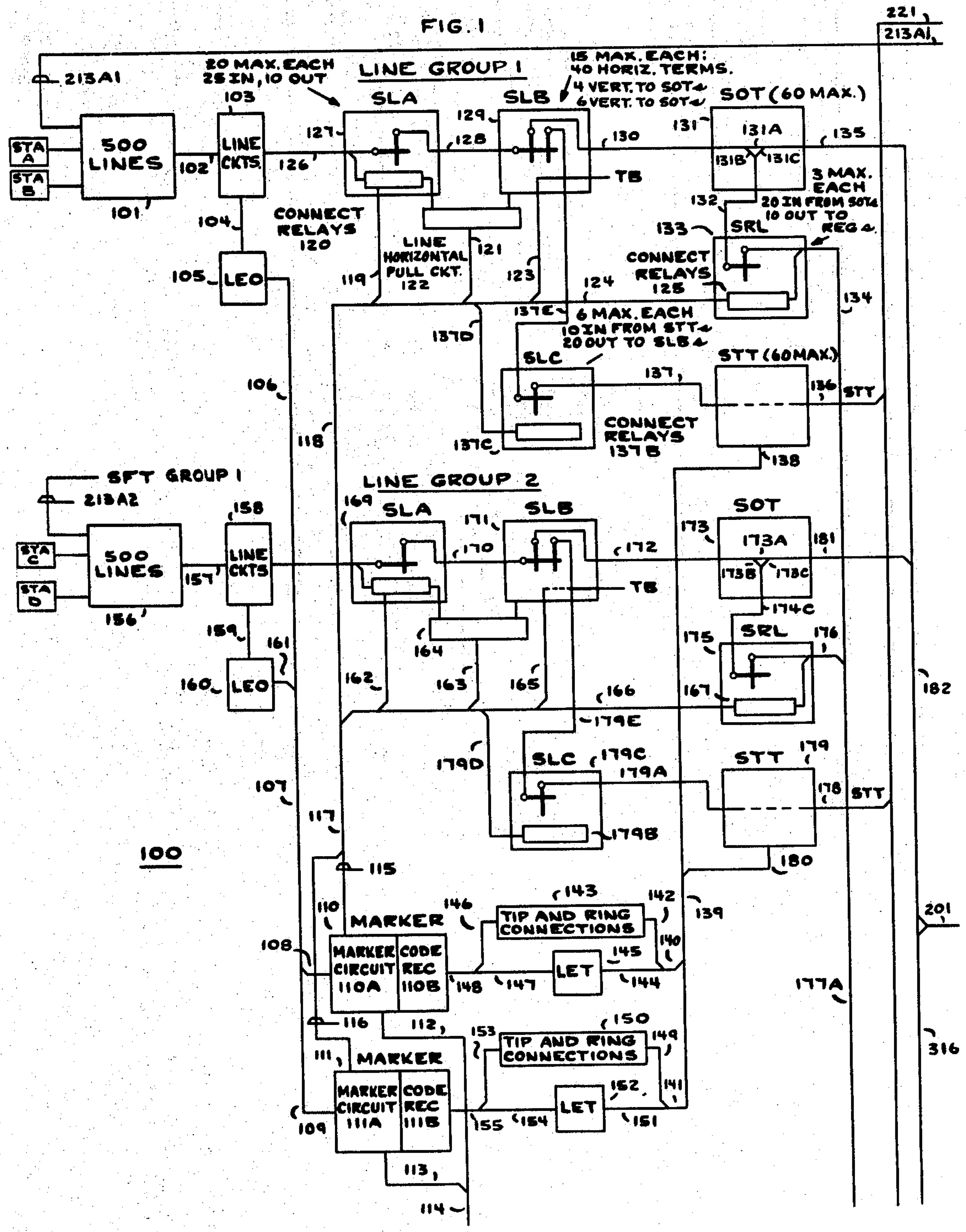
FIGS. 1—13, assembled as shown in FIG. 30, provide a block diagram of the system embodying the invention.

Referring now to FIG. 1, in the upper portion thereof is found a block diagram of circuits associated with the first group of 500 lines which are designated Line Group 1. Box 101 represents 500 lines, two of which lines have Station A and Station B respectively connected thereto. Lines 101 connect over path 102 to line circuits 103 which connect over path 104 to line entrance originating circuit LEO, designated 105, and paths 106, 107, 108, and 109 to subscriber line markers 110 and 111. Line circuit 103 is also connected over path 126 to subscriber line crossbar switches SLA, designated 127, of which there are 20 maximum, each having 25 lines input, such as 126, to the horizontals thereof and outputs, such as 128, connected to the ten verticals thereof. The outputs from the verticals of the SLA switches which are connected over paths, such as 128, enter horizontals of subscriber line crossbar switches SLB, designated 129, of which are 15 maximum, each having forty horizontal inputs and four vertical outputs, One vertical outputs, shown in FIG. 1, is connected over path 130 to subscriber originating trunks SOT, designated 131, for originating traffic. Switch SLB also indicates six vertical outputs such as the vertical outputs connected over path 137E to subscriber line crossbar line crossbar switches SLC for terminating traffic.

Figure 2A:
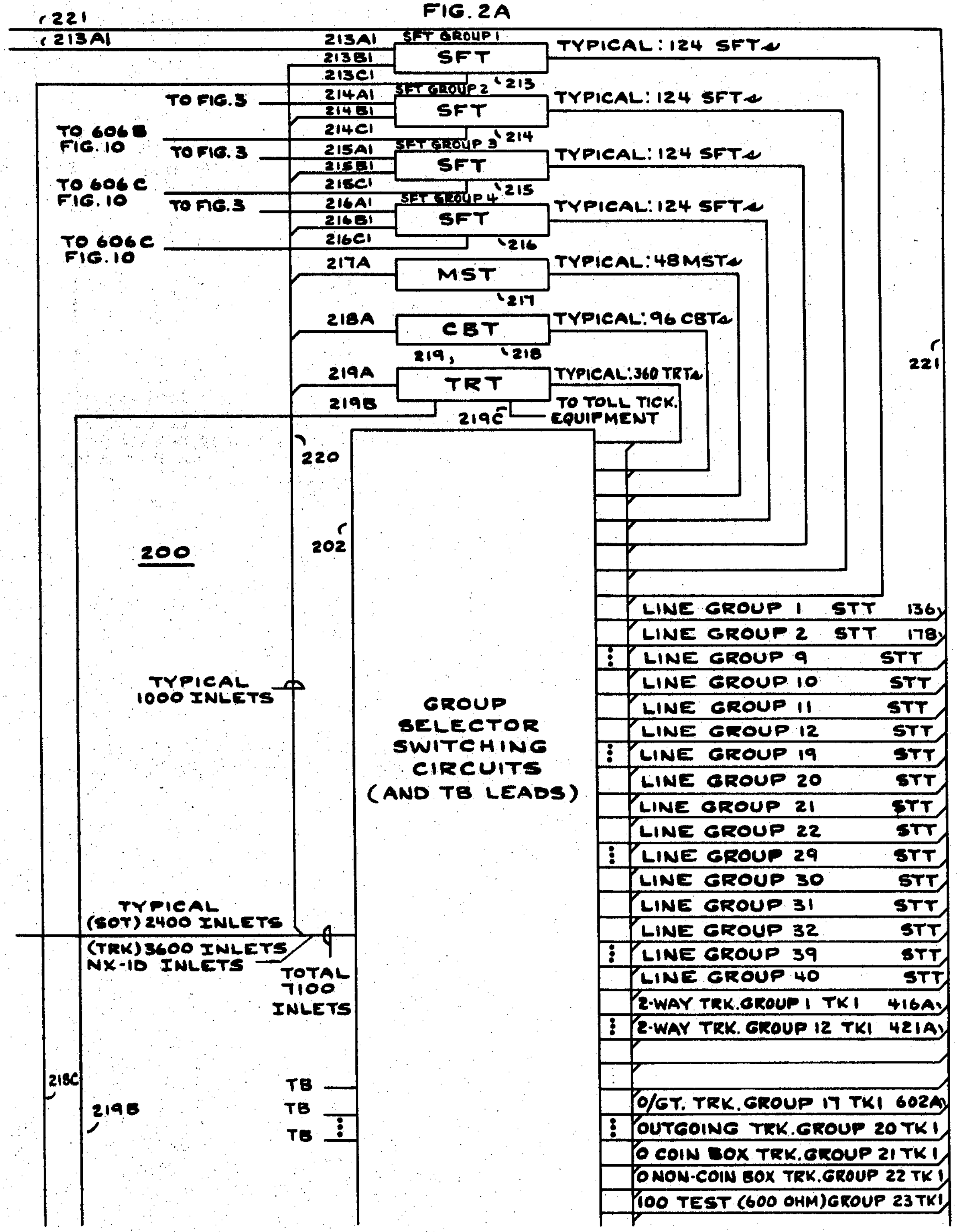
Figure 2B:
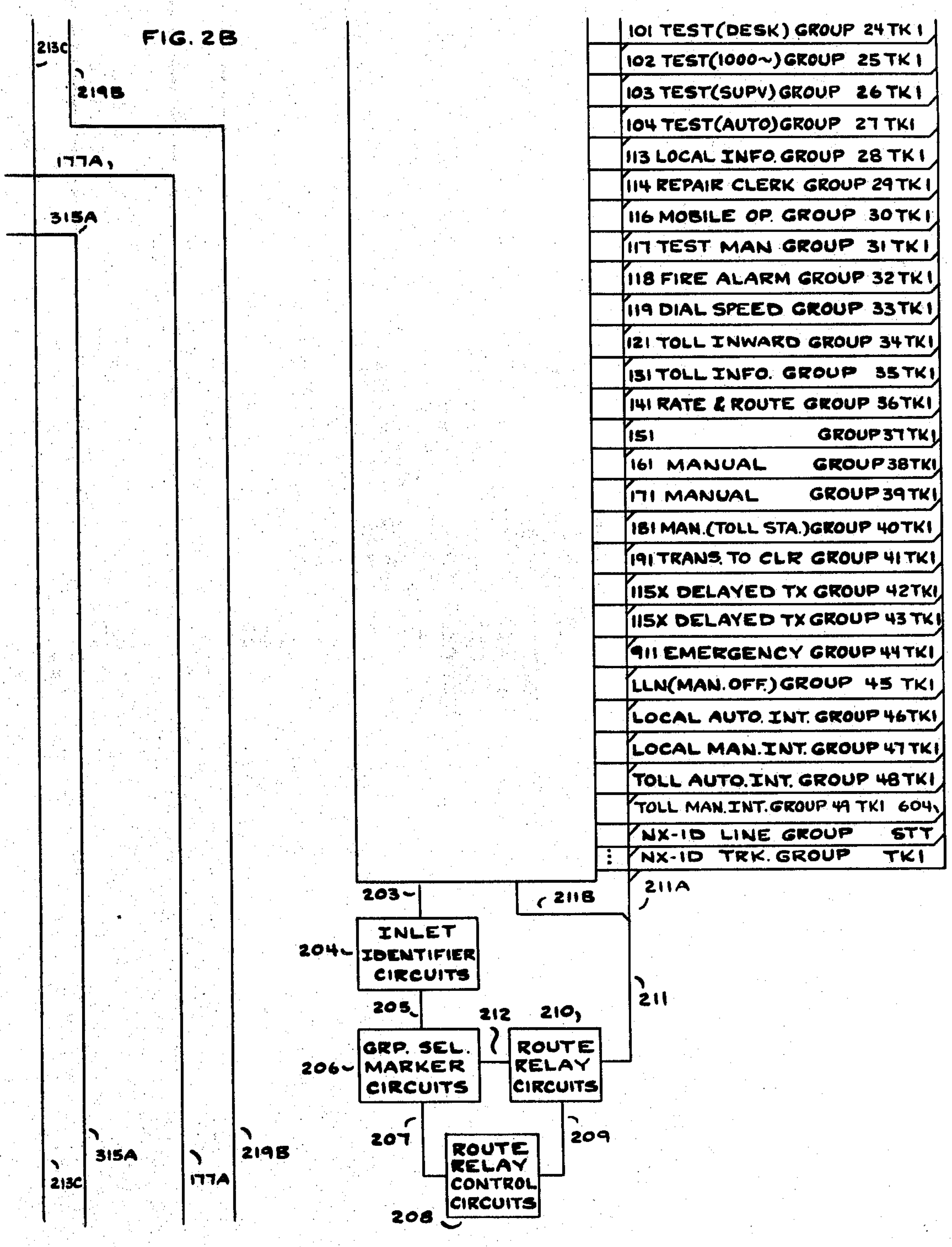

There are a maximum of sixty SOTS such as illustrated SOT 131, in each 500 line group, certain outputs of which over path 132 lead to subscriber receiver link circuits SRL (crossbar switches) and other outputs of which extend over paths 135, 182, and 201 to the group selector 202 of FIGS. 2A and 2B.

Figure 3:
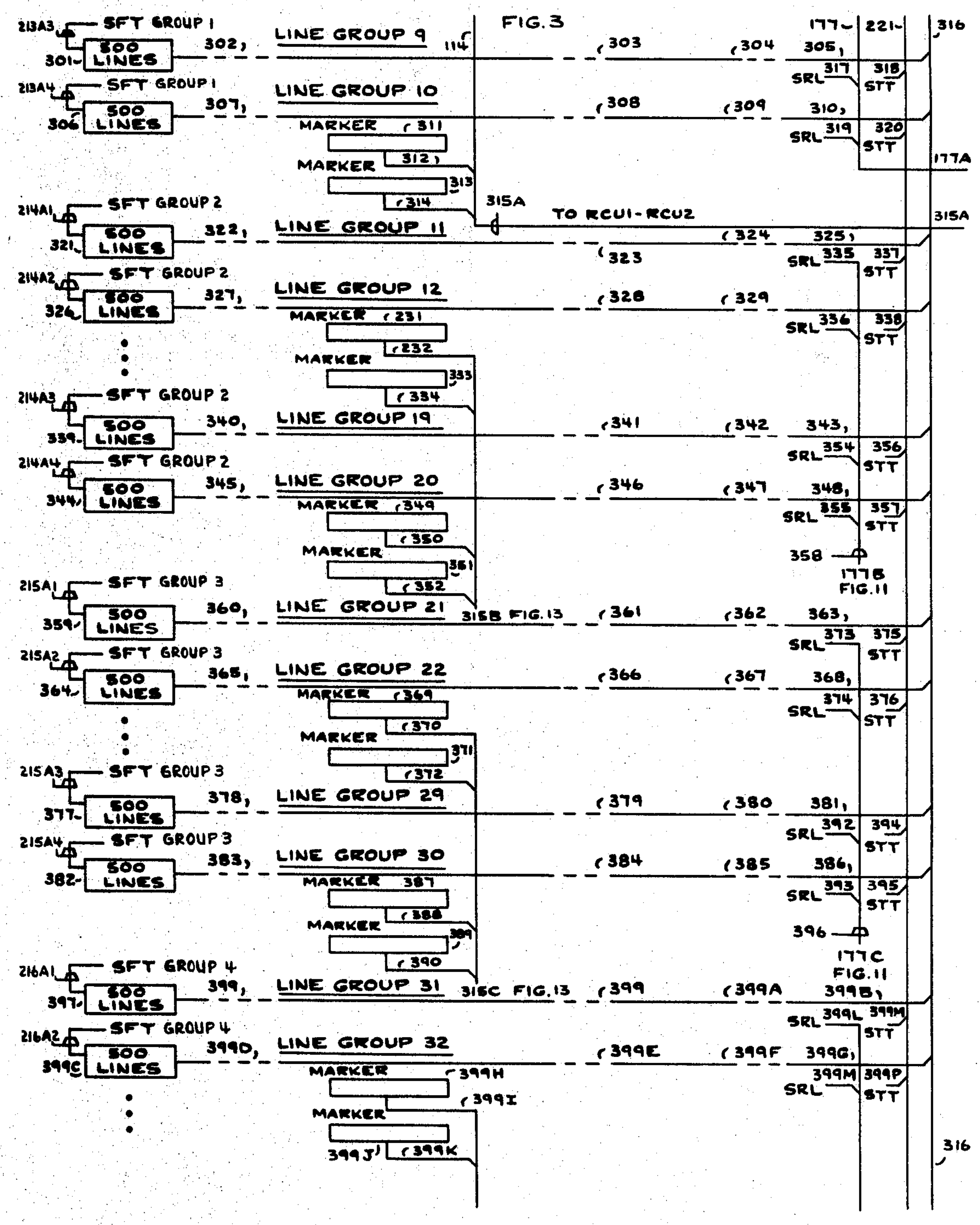
Figure 5:
Figure 30:
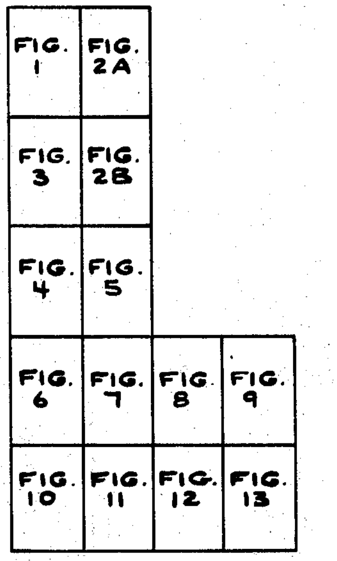
FIGS. 30, 31 and 32 are assembly patterns.
Figure 31:
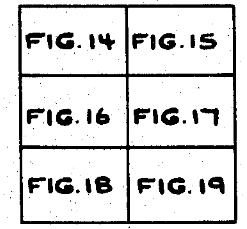
Figure 7:
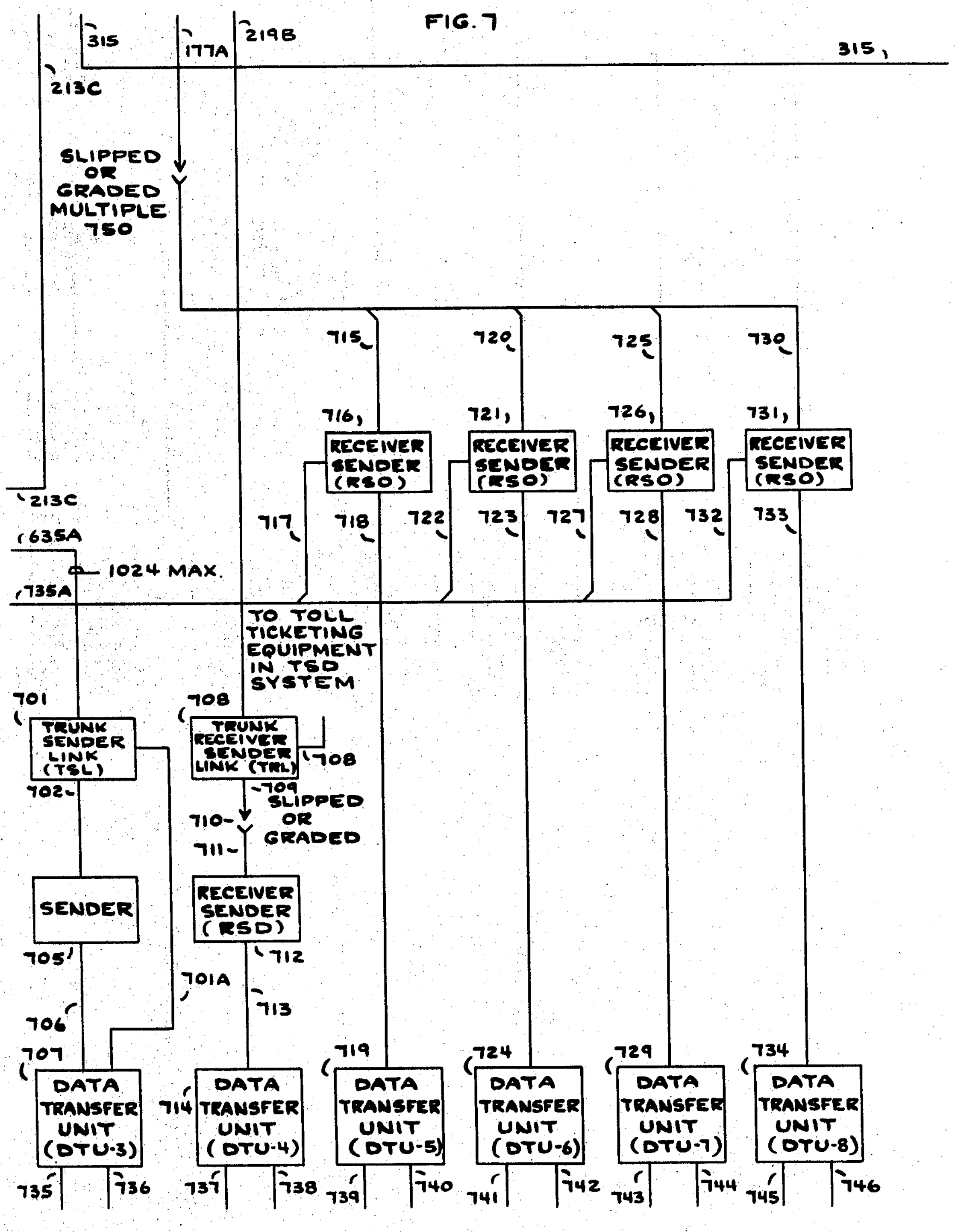

There are a maximum of three SRL switches in each 500 line group, each of which has 20 inputs, such as 132, to the horizontal thereof, and ten vertical outputs leading over paths, such as 134, and 177A through FIGS. 3, 2B, 5 and a slipped or graded multiple over paths 715, 720, 725, and 730 to receiver-sender circuits RSO in FIG. 7, designated 716, 721, 726, and 731 respectively, the number of receiver-sender circuits in a system being determined by traffic requirements. Such circuits will be described in more detail hereinafter.

Referring now to the group selector of FIGS. 2A and 2B, the output path therefrom in FIG. 2A (right hand side) which is designated Line Group 1 STT, comprises a plurality of paths 136 which extend over path 221 in FIG. 2A and FIG. 1 and path 136 to subscriber terminating trunks STT, designated 137.

Subscriber terminating trunks 137 over paths 138, 139, 140, and 141, 142, 144, 149, and 151 communicate via line entrance terminating circuits 145 and 152, tip and ring connections 143 and 150, and paths 147, 146, 148, 153, 154, and 155 with the code receiver portions 110B and 111B of subscriber line markers 110 and 111 for control of terminating calls.

Subscriber terminating trunks 137 also over paths 137A enter verticals of the SLC switches, there being a maximum of six SLC switches, each having 10 vertical inputs from STT trunks, such as 137, and 20 horizontal outputs, such as 137E, to SLB switches for terminating call connections.

It will be observed that lines 213A1 from special features trunks SFT, designated 213, in FIG. 2A extend to and become a part of, the first five hundred line group 101.

Line Group 2 which is similar to Line Group 1 is shown below Line Group 1 in FIG. 1. Stations C and D are shown connected to lines of the five hundred line group identified as Line Group 2. The thousand line group comprising Line Group 1 and Line Group 2 is designated 100.

Subscriber line markers 110 and 111 associated with the two particular five hundred line groups are randomly assigned on calls originated by LEO circuits and terminated via LET circuits. The originating portion, such as 110A, of a given marker, such as 110, can be in use serving an originating call at the same time that code receiver portion, such as 110B, thereof is in use serving the termination of a different call. In case one marker of the pair fails, the other marker can serve the thousand lines of the two groups associated therewith.

Line Groups 3—8, not shown, are impliedly located below Line Groups 1 and 2 and above Line Groups 9 and 10 which are shown in the upper portion of FIG. 3. Line Groups 1—10 thus comprise the first five thousand line group. Line Groups 11—40 which comprise the next four five thousand line groups are shown schematically in FIG. 3 and the upper portion of FIG. 4.

In the first five thousand line group, it should be understood that the four lines 213A1, 213A2, 213A3, and 213A4 which extend to the SFT trunks (FIG. 2A) are representative of 124 such lines, for example, which enter the ten five hundred groups from a group of 124 special features trunks, such as, for example, trunk 213 in FIG. 2A.

It should be observed that lines 214A1-214A4 of the second five thousand line group serve special features trunks, such as 214, of FIG. 2A and are representative of 124 such lines; also, that lines 215A1-215A4 of the third five thousand line group serve special features trunks, such as 215, of FIG. 2A and are representative of 124 such lines; and that lines 216A1–216A4 of the fourth five thousand line group serve special features trunks, such as 216, of FIG. 2A and are representative of 124 such lines.

Figure 13:
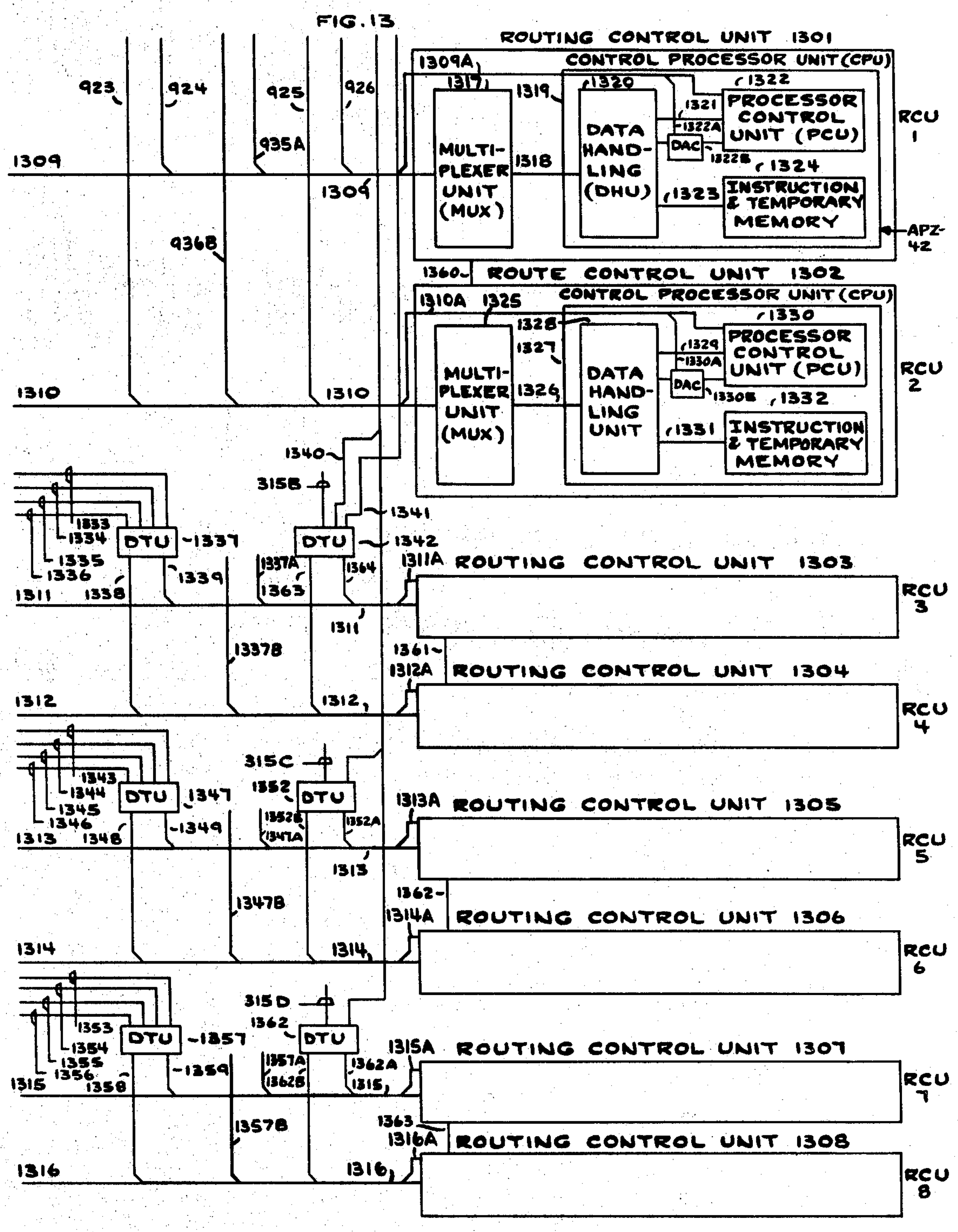

Furthermore it should be observed that all of the markers, such as 110, 111, etc., of the first five thousand line group communicate over paths in path 315A via data transfer unit DTU designated 922 (FIG. 9) with routing control units RCU-1 and RCU-2 of FIG. 13 designated 1301 and 1302 respectively; that all of the markers of the second five thousand line group communicate over paths in path 315B via data transfer unit DTU designated 1342 (FIG. 13) with routing control units RCU-3 and RCU-4, designated 1303 and 1304, respectively; that all of the markers of the third five thousand line group communicate over paths in path 315C via data transfer unit DTU designated 1352 (FIG. 13) with routing control units RCU-5 and RCU-6 designated 1305 and 1306 respectively; and that all of the markers of the fourth five thousand line group communicate over paths in path 315D via data transfer unit DTU designated 1362 (FIG. 13) with routing control units RCU-7 and RCU-8 designated 1307 and 1308, respectively. Although only ten such markers are shown or indicated as communicating with an RCU pair, it should be understood that each RCU of a pair and each pair is capable of handling 16 such markers.

Figure 4:
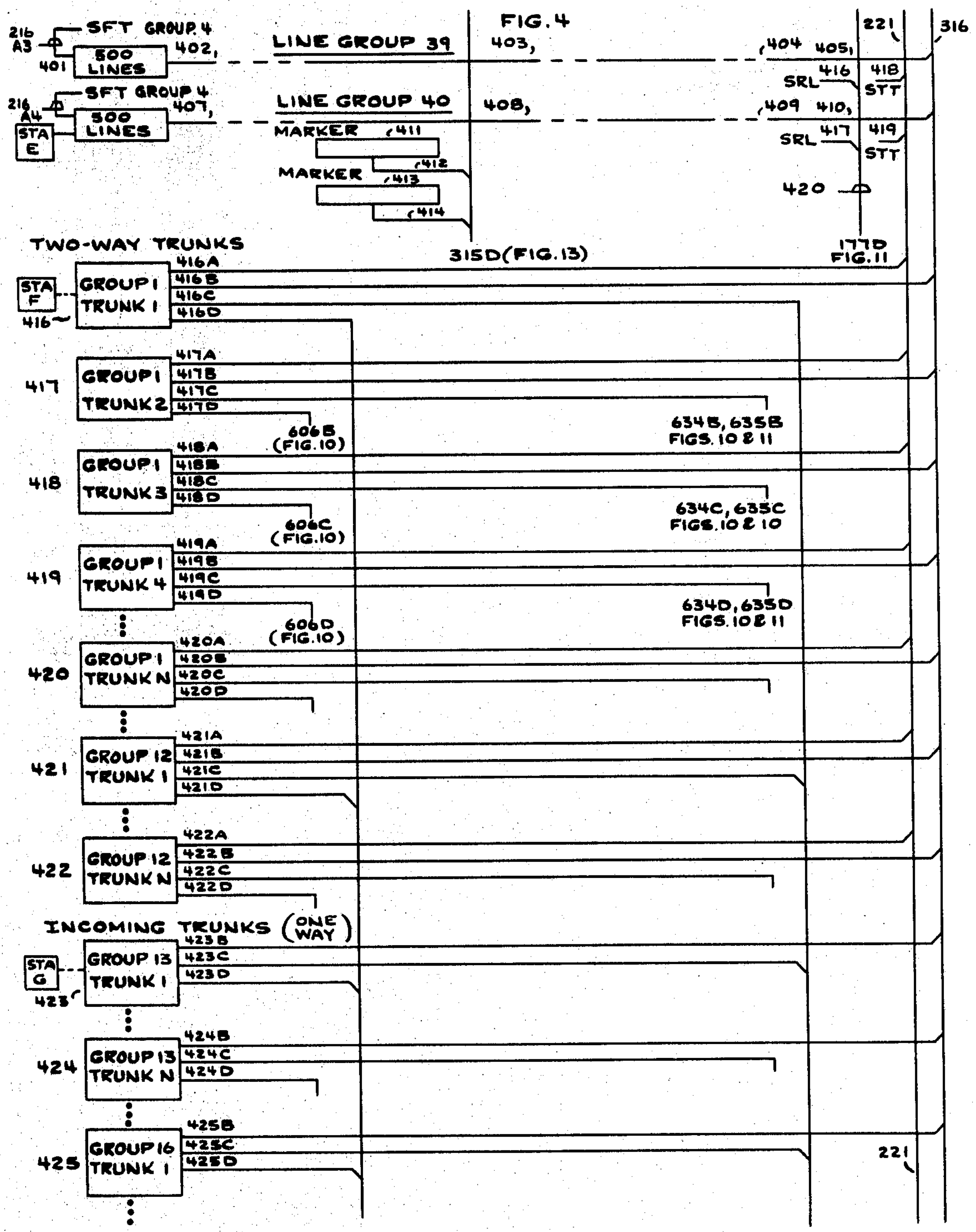

Referring now to FIG. 4, in the center thereof twelve groups of two-way trunks are shown or indicated. Boxes 416, 417, 418, 419, and 420, for example, represent trunks 1, 2, 3, 4, ... N of trunk group 1. Station F (through intervening equipment represented by the broken line) is indicated as having access to the system via trunk 1 of group 1. Boxes 421 and 422 represent trunks 1 ... N of group 12.

With reference to two-way trunk 416, an incoming call from Station F, for example, passes over paths 416B, 316, and 201 to an inlet on group selector 202. A call from the group selector 202 outgoing over the trunk 416 passes, for example, over path 221 (FIGS. 2A, 3, 4), path 416A, over trunk 416, and intervening equipment to station F. A detailed showing of this trunk (which has been illustrated, for example, as a loop-dial trunk) is set forth in FIGS. 14 and 15.

Loop signalling in either direction over trunk 416 is detected over paths 416D, 606A, 607, path 609 (in normal conditions), interface 613, and path 617 by supervisory control unit (SCU) 625. With detection of loop signalling SLU 625 sends an interrupt signal via path 625A, for example, OR circuit 633X (which also can respond to the other SCUs, such as SCU 2, 3, 4), path 633A, and path 1309A to processor control unit (PCU) 1322 of routing control unit 1301 (RCU-1) to effect insertion of a request for service into the proper place in the program. RCU-1 via paths 1390 and 656 ascertains from data transfer unit DTU-1 which one of the SCU's initiated the request. RCU-1 thereupon monitors a bit position in DTU-1 which is allocated to SCU-1, whereby SCU-1 via path 629, data transfer unit 633, and normally via path 656 and path 1309 enables the multiplexer unit (MUX) 1317 of routing control unit 1301 to pick up the loop signalling, and over path 1318 enables the data handling unit (DHU) 1320 under control of the processor control unit 1322 to store the same via path 1323 in the temporary memory portion of memory 1324.

If the other end of the trunk communicates with equipment which sends the called number by means of multifrequency signals, when trunk seizure is detected by RCU-1 via path 416D, RCU-1 via path 1309, 658, data transfer unit 654 and path 647 signals multifrequency link (MFL) 636 which extends a connection from trunk 416 over paths 416C and 634A, and multifrequency link designated 636, path 637, and slipped or graded multiple 638, and path 639 to multifrequency receiver (MFR) designated 640 which receives the multifrequency signals and converts them to binary form, whereby the called number via path 641, data transfer unit (DTU) designated 654, and normally over paths 658 and 1309 are stored in the temporary memory of RCU-1.

If the other end of the trunk is connected to the toll ticketing trunk at a tributory office, the signalling and called number might arrive by loop signalling followed by the calling number keyed over the trunk by an operator. In such event, upon original trunk seizure via path 416D, the routing control unit RCU-1 by checking the class marking of trunk 416 in the data memories (FIG. 8) would be so informed and would arrange to receive the called number on a loop basis via DTU-633 and the calling number via DTU-654 on a multifrequency basis.

Figure 8:
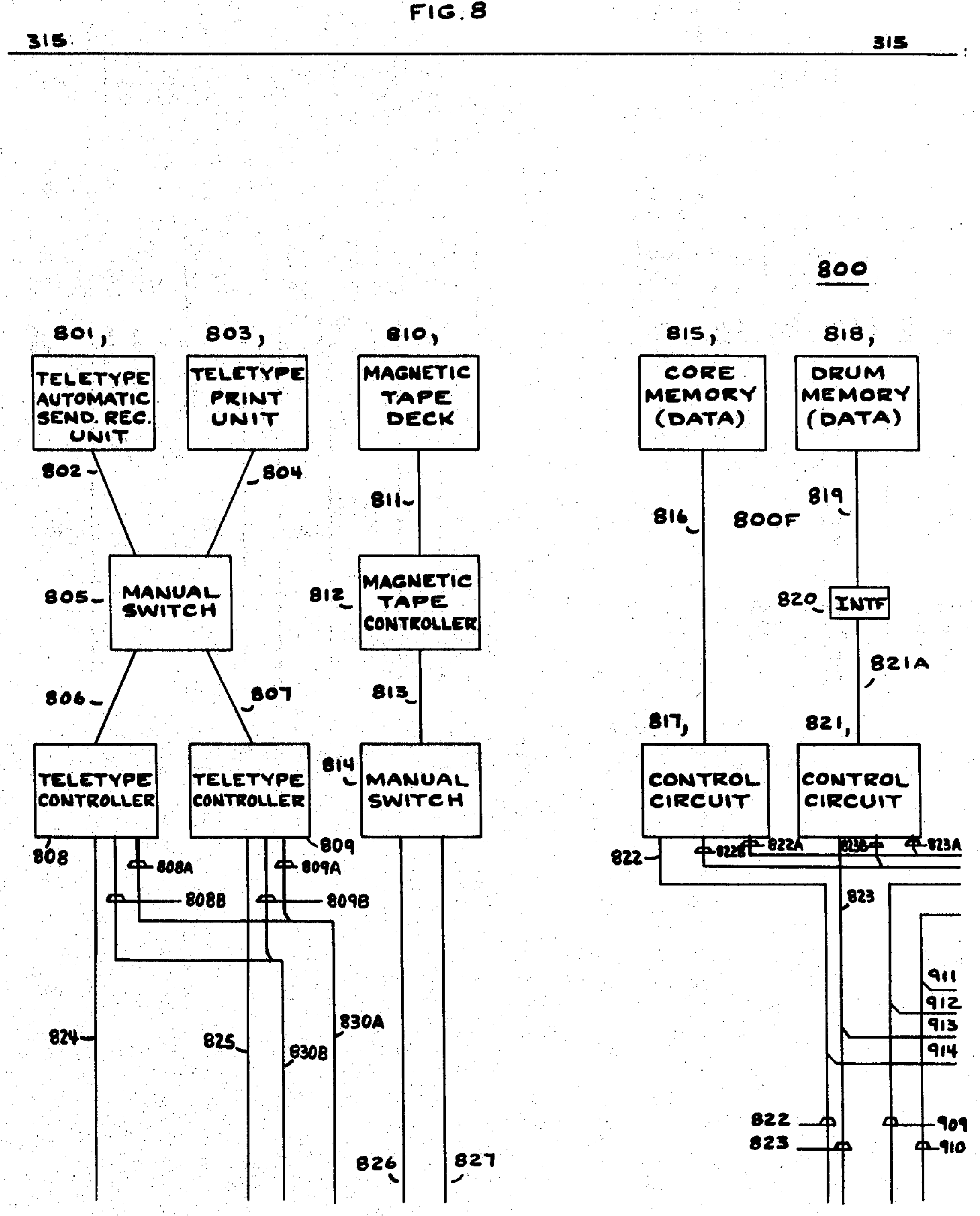

If the other end of trunk 416 is directly connected to a WATS subscriber, upon detection of trunk seizure via path 416D in the manner described, RCU-1, by checking the class of trunk 416 in the data memories in FIG. 8, would be so informed, and via DTU-654 and path 647 would signal multifrequency link 636. Multifrequency link 636 would thereupon extend a path from trunk 416 over paths 416C and 634A, and multifrequency link 636, path 642, and slipped or graded multiple 643, and path 644, to key call receiver KCR, designated 645, which receives the key call signals (i.e., a selected frequency from each of two groups of frequencies constituting dual tone multifrequency signals) and converts them to binary form, whereby the called number via path 646, DTU-654, and normally over paths 658 and 1309 are stored in the temporary memory of RCU-1.

Figure 6:
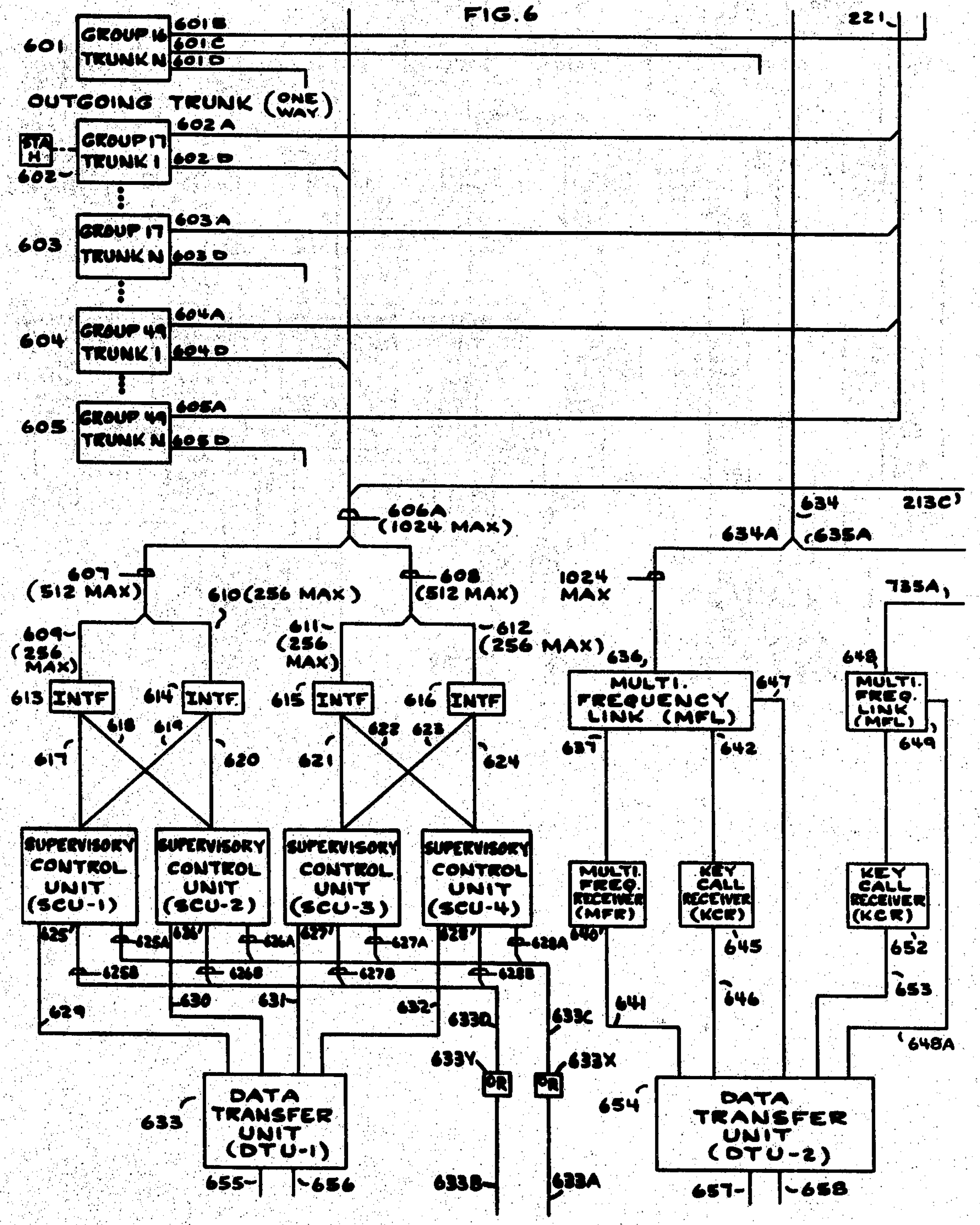

One way incoming trunks are shown in the lower part of FIG. 5 and the upper part of FIG. 6. It will be observed that these trunks do not have outgoing paths, such as 416A from the group selector. The functions of paths, such as 423B, 423C, 423D, etc. are essentially the same as those described above for 416B, 416C, and 416D.

One way outgoing trunks are shown in the top half of FIG. 6. It will be observed that these trunks do not have incoming paths, such as 416B, to the group selector. The functions of paths, such as 602A, 602C and 602D are essentially the same as those described above for 416A, 416C, and 416D.

With reference to FIGS. 2A and 2B, combined group selector of the system, designated 200 is shown thereat. For illustrative purposes, 24 SOT inlets, 3,600 trunk inlets and 1,000 wraparound trunk inlets are shown entering the group selector switching circuits 202. Also shown in schematic form are NX-1D inlets. Such showing is for the purpose of illustrating that if the system shown in the drawings of this application is an addition to an existing electromechanical system, the inlets of the existing electromechanical system can be connected over the NX-1D inlets. The total number of 3,100 inlets, however, would include the NX-1D inlets.

The group selector 200 of the maximum system would comprise at least two serial stages of crossbar switches, each stage comprising two groups of serially related crossbar switches. Thus a path through the group selector might traverse four crossbar switches. In general, wraparound trunks, shown as rectangles above the group selector box, would traverse only the first stage (i.e., paths through only two crossbar switches in series).

The wraparound trunks found in the upper portion of FIG. 2A, comprise a group of toll recording trunks TRT, such as 219, which in a given installation might number 128; a group of coin box trunks CBT, such as 218 which might number 96; a group of measured service trunks MST, such as 217, which might number 48; a group of special features trunks SFT, such as 216, associated with the fourth five thousand line group which might number 124; a group of special features trunks SFT, such as 215, associated with the third five thousand line group which might number 124; a group of special features trunks SFT, such as 214, associated with the second five thousand line group which might number 124; and a group of special features trunks SFT, such as 213, associated with the first five thousand line group which might number 124.

Each of these wraparound trunk groups is reached via different group selector output levels as shown. Also each of these wraparound trunk groups has inlets for each of the trunks in its group via path 220 to the group selector.

Each TRT trunk, for example, has communication over a path, such as 219B, trunk receiver-sender link 708, a path such as 709, slipped or graded multiple 710, a path such as 711, a receiver-sender RSD, such as 712, path 713, DTU-714, and path 738 or 737, and path 1309 with RCU-1 or RCU-2; or via slipped or graded multiple 710 and a receiver-sender RSD and DTU-1110 (FIG. 11), etc., with RCU-3 or RCU-4; or via slipped or graded multiple 710 and a receiver-sender RSD and DTU-113 (FIG. 11), etc., with RCU-5 or RCU-6; or via slipped or graded multiple 710, and a receiver-sender RSD and DTU-116, etc., with RCU-7 or RCU-8.

Also each TRT trunk has communication over a path, such as 219C, with toll ticketing equipment. In a system in which the toll ticketing arrangement is served by a toll service desk (TSD), the toll service desk controls the connection through the trunk receiver-sender link (TRL), designated 708 (FIG. 7) as indicated.

Each special features trunk SFT, such as 213, in the first five thousand line group is served over paths 213C1, 606A, 607, and 609, interface 613, and path 617 by supervisory control unit 625 or path 610, interface 614, and path 620 by supervisory control unit 626. Supervisory control units SCU-1 and SCU-2 communicate via DTU-633 with RCU-1 and RCU-2.

Each special features trunk SFT, such as 214, in the second five thousand line group is served over paths 214C1, 606B (FIG. 10), etc., by a supervisory control unit associated with the second five thousand line group which is indicated by the dotted line which communicates via DTU-1001 with RCU-3 and RCU-4.

The SFTs, such as 215, are similarly served by equipment in the third five thousand line group, and the SFTs, such as 216, are served by equipment in the fourth five thousand line group.

Referring again to the group selector shown in FIGS. 2A and 2B, immediately below the wraparound trunk outlet levels are shown forty line group output levels for line groups 1—40, each level leading to a different line group serving five hundred lines in FIGS. 1—4.

For example, the selector outlet shown on the first such level designated Line Group 1 STT leads via paths 136 and 221 to the first STT (137) of Line Group 1 in FIG. 1. It is to be understood that other similar selector outlets on this same level lead to other STT's in Line Group 1 in FIG. 1 up to a maximum of 60.

Similarly, the selector outlet shown on the next level below designated Line Group 1 STT leads via path 178 and 221 to the first STT (179) of Line Group 2 in FIG. 1. It is to be understood that other similar selector outlets on this same level lead to other STT's in Line Group 2 in FIG. 1 up to a maximum of 60. The other line groups 3—40 are connected in a like pattern.

Below the line group output levels just described, the various trunk group levels are shown. The selector outlet designated Two-Way Trunk Group 1 TK1 shown on the first such trunk level leads via paths 416A and 221 to the first two-way trunk 416 of the first group of two-way trunks in FIG. 4. It is to be understood that other similar selector outlets on this same level lead to trunks 2, 3, 4, ... N designated 417, 418, 419,...420 in FIG. 4. Additional two-way trunk group levels 2-11 not shown are indicated by the three dots.

The selector outlet designated Two-Way Trunk Group 12 TK1 on the 12th such level leads via paths 421A and 221 to the first two-way trunk 421 of the 12 th group of two-way trunks in FIG. 4. It is to be understood that other similar selector outlets on this same level lead to other trunks on this same level including trunk N designated 422.

Below the two-way trunk levels are shown one-way outgoing trunk levels 17-49. More specifically, the selector outlet designated Outgoing Trunk Group 17 TK1 on the first outgoing trunk group level leads via paths 602A and 221 to the first one-way outgoing trunk 602 in FIG. 6. It is to be understood that other similar selector outlets on this same level lead to other trunks on this same level including trunk N designated 603. Other two-way trunk group levels 18 and 19 (not shown) are indicated by three dots in FIGS. 2A and 6. The selector outlet designated Outgoing Trunk Group 20 TK1 leads via 221 to the first outgoing trunk on trunk level 20 which is not shown but indicated in FIG. 6 by three dots.

The selector outlet designated O Coin Box Trunk Group 21 TK1 on the 21st trunk level leads via path 221 to the first outgoing trunk on this level 21 which is not shown but indicated in FIG. 6 by the same three dots. Similarly, the various selector outlets shown on trunk levels 22—48 lead via path 221 to the first outgoing trunk on each of these levels which is not shown but indicated in FIG. 6 by the same three dots.

The selector outlet designated TOLL MAN INT. GRP 49 TK1 on the 49trunk level leads via paths 604 and 221 to the first outgoing trunk 604 on this level.

Below these outgoing trunk levels, the selector outlet designated NX-1D LINE GROUP STT leads to the first STT in a five-hundred line group of an NX-1D system and is representative of other such selector outlets for the same and different NX-1D line groups. With such arrangement the present system (NX-1E) May be connected as an addition to an older system (NX-1D), but should not be considered as limiting of the present system as an addition circuit.

Finally, the selector outlet designated NX-1D TRK GRP TK1 leads to the first trunk in a trunk group associated with an NX-1D system if so connected. It is apparent that in combined systems, the group selector becomes a combined group selector for both systems.

Referring to the lower part of FIG. 2B, calls over the inlets to the group selector become identified by the inlet over path 203, inlet identifier circuits 204 and path 205 to group selector marker circuits 206, whereby tip and ring communication paths are set up to the group selector market circuits. RCU units are connected (FIG. 13) via data transfer units and senders, such as 704, (FIG. 7), receiver-senders RSD, such as 712 (FIG. 7) and receiver-senders RSD such as 716, 721, 726, and 731 to send coded signals into the group selector marker circuits 206 to identify the called level and characteristics thereof, whereby the group selector marker circuits 206 by means of the route relay control circuits 208 and the route relay circuits 210 select an idle interoffice trunk (trunk or STT) on the selected level and operate the appropriate crossbar switches in the group selector switching circuits 202 to extend the calling inlet to an idle trunk or STT (intraoffice trunk) on the selected level.

Figure 10:
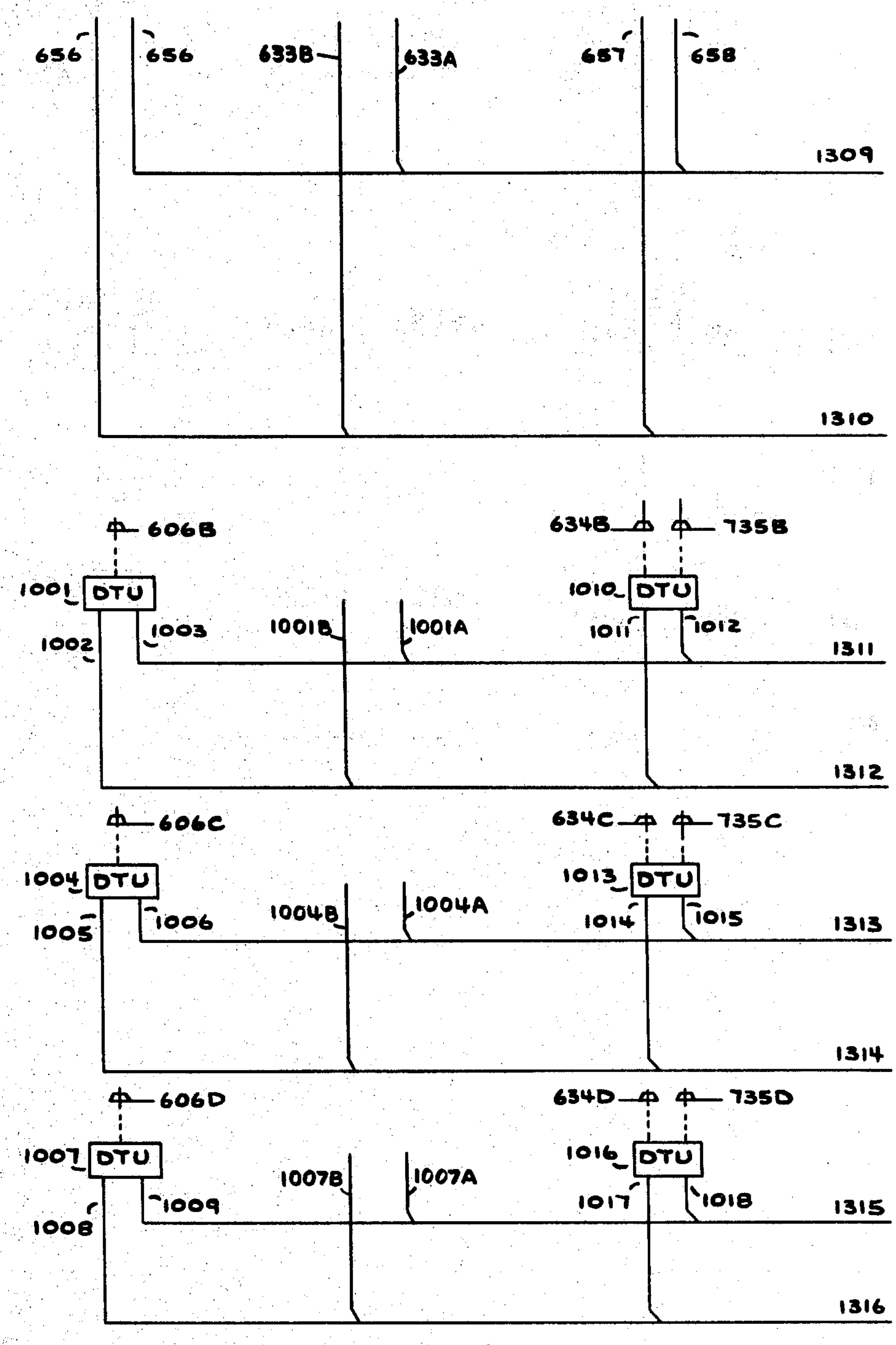

Referring now to FIGS. 4, 6, and 10, it will be seen that path 416D of trunk 1 of trunk group 1, path 421D of trunk 1 of trunk group 12, path 423D of trunk 1 of trunk group 13, path 425D of trunk 1 of trunk group 16, path 602D of trunk 1 of trunk group 17, and path 604D of trunk 1 of trunk group 49 enter path 606A. It should be understood that the corresponding path of trunk 1 of the intervening trunk groups indicated, but not shown, also enter path 606A. Furthermore, paths, such as 213C, from the first group of SFT's associated with the first five-thousand line group also enter path 606A. Path 606A is associated with supervisory control units SCU-1, SCU-2, SCU-3, and SCU-4 and routing control units RCU-1 and RCU-2 of FIG. 13 which serve the first five-thousand line group.

Also it will be observed that path 417D of trunk 2 of trunk group 1 enters path 606B (FIG. 10). It should be understood that the corresponding path of trunk 2 of the various trunk groups also enter path 606B for example. Furthermore, paths, such as 214C, from the second group of SFT's associated with the second five-thousand line group also enter path 606B. Path 606B is associated with supervisory control units (not shown but indicated by the dotted line) and routing control units RCU-3 and RCU-4 of FIG. 13 which serve the second five-thousand line group.

Similarly path 418D of trunk 3 of trunk group 1 enters path 606C (FIG. 10). It should be understood that the corresponding path of trunk 3 of the various trunk groups also enters path 606C. Furthermore, paths, such as 215C, from the third group of SFT's associated with the third five thousand line group also enter path 606C. Path 606C is associated with supervisory control units (not shown, but indicated by the dotted line) and routing control units RCU-5 and RCU-6 of FIG. 13 which serve the third five-thousand line group.

Similarly path 419D of trunk 4 of trunk group 1 enters path 606D (FIG. 10). It should be understood that the corresponding path of trunk 4 of the various trunk groups also enters path 606D. Furthermore, paths, such as 216C, from the fourth group of SFT's associated with the fourth five thousand line group also enter path 606D. Path 606D is associated with supervisory control units (indicated by the dotted line, but not shown) and routing control units RCU-7 and RCU-8 of FIG. 13 which serve the fourth five-thousand line group.

The corresponding path of the fifth trunk of each trunk group shown in FIGS. 4 and 6 would enter path 606A. The corresponding path of the sixth trunk of each trunk group would enter path 606B, etc. The pattern of connection of the trunk will be apparent from such description.

Path 606A may comprise a maximum of 1024 trunk paths described. Half of these paths (for a maximum of 512) are indicated as entering path 607; the other half of these paths (or a maximum of 512) are shown entering path 608. Half of the trunk paths of path 607 (or a maximum of 256) are indicated as entering path 609; the other half (or a maximum of 256) are indicated as entering path 610. Similarly half of the trunk paths of path 608 (or a maximum of 256) are indicated as entering path 611; and the other half (or a maximum of 256) are indicated as entering path 612.

Each trunk path in path 609 enters an interface circuit, such as 613, which, over a path, such as 617, communicates with a supervisory control unit (SCU-1) designated 625. Each trunk path in path 610 enters an interface circuit, such as 614, which, over a path, such as 620, communicates with a supervisory control unit (SCU-2) designated 626.

Trunk paths in paths 611 and 612 communicate in a like manner via interface circuits 615 and 616 with supervisory control units SCU-3 and SCU-4, designated 627 and 628 respectively.

If SCU-1 should fail, SCU-2 under control of RCU-1 or RCU-2 can via paths, such as 618, take over communication and control of trunks associated with interfaces, such as 613. Also if SCU-2 should fail, SCU-1 under the control of RCU-1 or RCU-2 can over paths, such as 619, take over communication and control of trunks associated with interfaces, such as 614. SCU-3 and SCU-4 can take over for each other in a like manner in case of failure of the other.

Trunk 1 of each group of two-way trunks and incoming trunks has a path, such as path 416C, 421C, 423C, and 425C, which enters path 634 of the first five-thousand line group or similar paths in the other five-thousand line groups. Certain conductors in this trunk path enter path 634A (or 634B, 634C, or 634D—FIG. 10) to multifrequency link (MFL) designated 636 (or a similar link in other five-thousand line groups) whereas certain conductors enter path 635A to trunk sender link (TSL) designated 701 (or a similar link in other five-thousand line groups). The routing control units RCU-1—RCU-8 via data transfer units 654, 1010, 1013, and 1016, as the case may be, control the multifrequency link, such as 636, via a path, such as 647, to extend a connection from the trunk to a multifrequency receiver, such as 640 or a key call receiver, such as 645; or a sender link, such as 701, via a path, such as 701, to extend a connection from the trunk to a sender, such as 704.

Referring to FIG. 7, path 177A from the SRL verticals of FIGS. 1 and 3 associated with the five-hundred line groups 1—10 of the first five-thousand line group are connected via a slipped or graded multiple 750 and paths, such as 715, 720, 725, and 730 to four groups of receiver-sender circuits RSO, representative ones of which are shown and designated 716, 721, 726, and 731, each group of which connects with transfer units (DTU) 719, 724, 729, and 734 as illustrated. The receiver-sender units are divided into four groups because the capacity of the data transfer units require four such units for a maximum size system controlled by one RCU pair.

Figure 11:
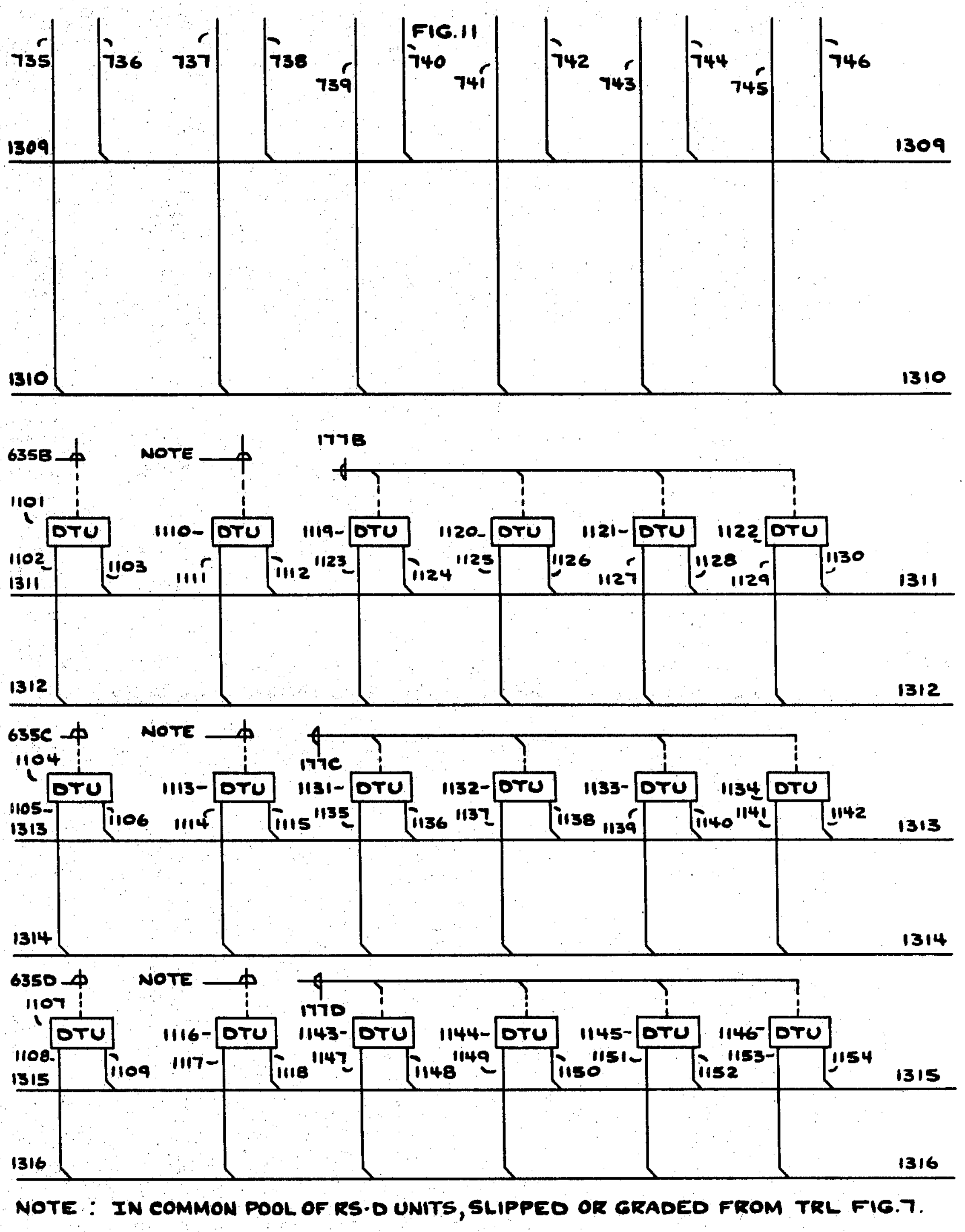

Referring to FIG. 11, a similar path designated 177B from the SRL verticals of FIG. 3 associated with the five-hundred line groups 11—20 of the second five-thousand line group leads to receiver-sender circuits designated by the dotted lines associated with DTU's 1119, 1120, 1121, and 1122. Paths 177C and 177D for the third and fourth five-thousand line group are similarly connected to associated DTU's 1131—1134 and 1143—1146 respectively.

Figure 12:
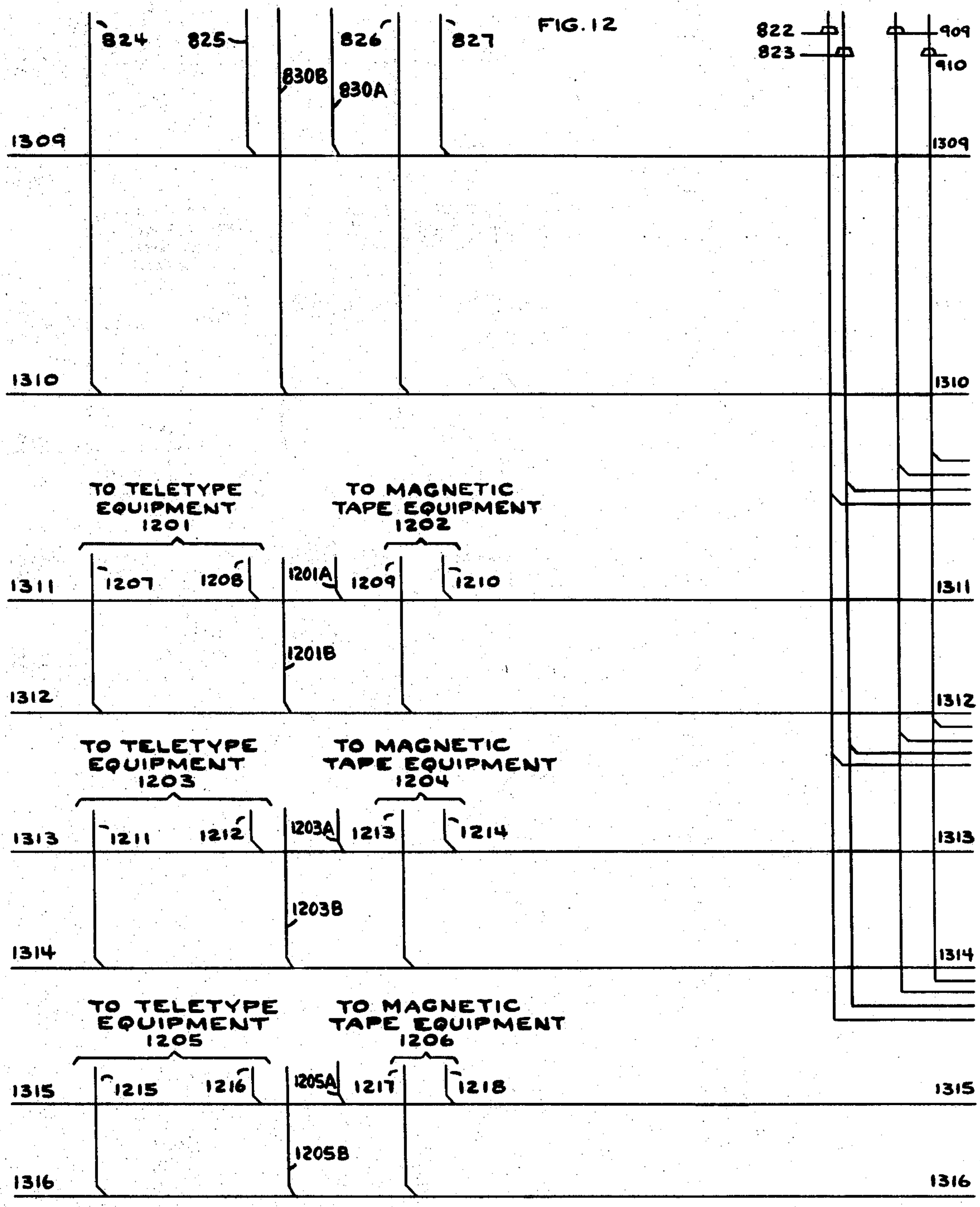

Referring to FIG. 12, magnetic tape deck 810 provides a means for running a prepared magnetic tape containing program information and data whereby via path 811, magnetic tap controller 812, path 813, manual switch 814, and either path 827 or path 826 as determined by the position of manual switch 814, the program for running the system may be stored via path 1309, for example, via multiplexer 1317, path 1318, data transfer unit DHU, designated 1320, and path 1323 (under control of processor control unit PCU via path 1321) in the instruction memory portion of memory 1324. The stored program thereupon routes the ensuing data via the multiplexer unit 1317, path 1318, and the data handling unit 1320 back over paths 1309, 924, data transfer unit 915 and paths 911, 912, ... 913, and 914 via the control circuits 817, 821, ..., 903, 908 via paths such as 816; 821A; interface 820 and path 819; 902; 907; interface 906 and 905 into the core and drum data memories 815, 818 ... 901, and 904, the drum memories being backup memories for the core memories.

When the manual program switch 814 is in the alternate position, the program will be loaded via paths 826, 1310, multiplex unit 1325, path 1326, data handling unit 1328 and path 1331 into the instruction portion of memory 1332.

Reference to FIG. 12 will also show that magnetic tape equipment 1202 of like structure is provided for cooperation over paths 1210 and 1209 with RCU-3 and RCU-4; magnetic tape equipment 1204 of like structure cooperates via paths 1214 and 1213 with RCU-5 and RCU-6; and similar magnetic tape equipment 1206 via paths 1218 and 1217 cooperate with RCU-7 and RCU-8.

As before stated, initiation of a magnetic tape transmission is first by means of an interrupt signal to the routing control unit. However, loading of the data memory equipment 800 may only be accomplished by means of RCU-1 or RCU-2.

Referring to FIG. 8, a teletype print unit 803 and a teletype automatic receiver-sender unit 801 are provided. Unit 801 comprises a print unit together with a keyboard unit. With the manual switch 805 in one position, teletype print unit 803 is connected via path 804, the manual switch, path 807, teletype controller 809, path 825, and path 1309 to RCU-1; and unit 801 is connected over path 802, the manual switch, path 806, teletype controller 808, path 824, and path 1310 to RCU-2. RCU-1 can, by way of example, cause unit 803 to print out a diagnostic record, and RCU-2 can cause unit 801 to also print out a diagnostic record. Also, by means of the keyboard of unit 801, revised assignments, such as "number group" changes can be keyed into the instruction portion of memory 1332, and transferred from memory 1332 under control of RCU-2 to update the appropriate portion of the data memory 800. Furthermore, under control of RCU-2, about once a day the contents of data memory 800 can be inserted a block at a time into the temporary portion of memory 1332 and recorded on magnetic tape by unit 810. In such manner a daily check of the stored information is provided to the exchange. It should be appreciated that with new features in the system, such as "follow me", for example, the contents of data memory 800 can be modified by subscriber control.

With manual switch 805 in the second position, teletype print unit 803 is connected via path 804, the manual switch 805, path 806, teletype controller 808, path 824, and path 1310 to RCU-2; and unit 801 is connected over path 802, the manual switch, path 807, teletype controller 809, path 825, and path 1309 to RCU-1; with corresponding alternate operation as will be understood.

Reference to FIG. 12 will also show that similar teletype equipment 1201 is provided for cooperation over paths 1208 and 1207 with RCU-3 and RCU-4; similar teletype equipment 1203 is provided for cooperation over paths 1212 and 1211 with RCU-5 and RCU-6; and similar teletype equipment 1205 is provided for cooperation over paths 1216 and 1215 with RCU-7 and RCU-8.

Initiation of a keyboard transmission is effected by means of an interrupt signal to the routing control unit.

Figure 9:
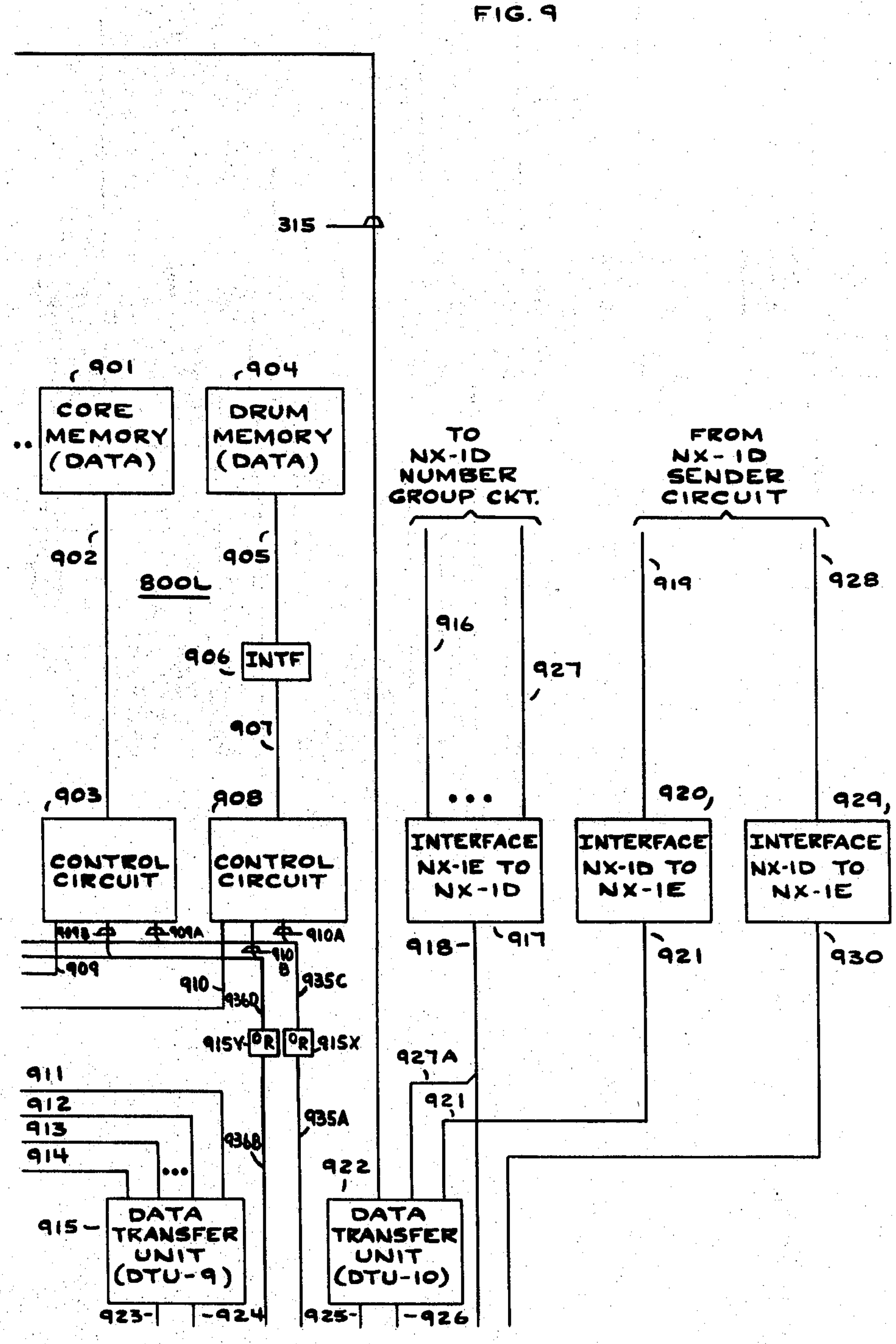

Referring to FIGS. 8 and 9, data memory 800, as shown, comprises a plurality of data memory groups 800A...800N. Group 800A, for example, comprises a core memory designated 815 of approximately 65536 words of 16 bits each, the associated control circuit 817, a drum memory of approximately 65,000 such word capacity designated 818, associated interface 820, and associated control circuit 821. The drum is much slower than the core memory in access time and is used only for backup in case of core memory failure. Of course, any changes made in the data must be written into both memories so the drum must always be active. Required access time for a core data memory is about 4 milliseconds whereas average access time for the drum is eight ms. in a maximum system. Therefore a drum cannot be used to replace an entire core memory without a reduction in traffic capacity as a backup unit. Each of the RCU's 1—8 can access any core memory, such as 815, or any drum, such as 818. No reconfiguration is necessary in case of a memory failure, since the RCU simply selects drum instead of core memory. As an alternative the drum can be replaced by a core memory.

The primary areas of data storage are those areas which store "number group", "translation" for routing and rate selection purposes, "automatic line and class identification", and "abbreviated dialing" data. Other areas of data storage are present.

As many memory groups are equipped as are necessary. Normally one memory group would be sufficient for five-thousand lines. Thus a five-thousand line office may comprise only one memory group, such as for example the illustrated memory group 800F.

Referring to FIG. 13 each pair of RCU's serve a five-thousand line group as follows:

RCU-1 and RCU-2 serve the first five-thousand line group.

RCU-3 and RCU-4 serve the second five-thousand line group.

RCU-5 and RCU-6 serve the third five-thousand line group.

RCU-7 and RCU-8 serve the fourth five-thousand line group. Each pair of RCU's can handle a maximum of 96 senders, such as 705, receiver-sender units RSO, receiver-sender units RSD(together) in its associated five-thousand line group (or larger as determined by SLM identification facilities in the routing control units) and 32 trunk receivers in its memory, such as 1324. Also a pair of RCU's can handle a maximum of 64 multifrequency receiver units and key call receiver units. Hence, if traffic requirements permit a larger number of lines to be served by the 128/64 devices, a pair of RCU's can handle more than five-thousand lines.

Each pair of RCU's communicates with data memory 800 via an associated data transfer unit: RCU-1 and RCU-2 via DTU-915; RCU-3 and RCU-4 via DTU-1337; RCU-5 and RCU-6 via DTU-1347; and RCU-7 and RCU-8 via DTU-1357.

Furthermore RCU-1 and RCU-2 communicate with subscriber line markers in the first five thousand line group for example via DTU-922; RCU-3 and RCU-4 communicate with subscriber line markers in the second five thousand line group for example via DTU-1342, RCU-5 and RCU-6 communicate with subscriber line markers in the third five thousand line group for example via DTU-1352; and RCU-7 and RCU-8 communicate with subscriber line markers in the fourth five thousand line group for example via DTU-1362.

The novel system of the invention, designated an NX-1E system, as noted above, is capable of being connected as an addition to an existing electromechanical system, identified in the field as an NX-1D system. By way of example, it will be assumed that an existing installation comprises an NX-1D system of five thousand lines or ten thousand directory numbers to which is added a five thousand line or ten thousand line NX-1E system, and that later another five thousand line or ten thousand directory number NX-1E group is to be added. Interconnections between the systems are shown in FIGS. 9 and 13 (see interfaces 917, 921, and 929 associated circuitry) and in FIGS. 2A and 2B in conjunction with the unified or common group selector. The main purpose of the illustrated interconnections of FIGS. 9 and 13 is to avoid duplication of "-number group" storage, which information is very voluminous. Translation information relative to trunk calls, which is of a lesser volume, is duplicated in the NX-1D and NX-1E systems. As an alternative, in smaller systems the NX-1E system may use the NX-1D translator for such purpose, in which case no translation information is stored in the data memory.

On a call from a subscriber or trunk in the NX-1E system to a subscriber in the NX-1D system, RCU-1 (and RCU-2) communicate via DTU-922 and interface circuit 917 with the NX-1D number group circuitry to determine the equipment location, class, and ringing information relative to the called station, the routing control unit appearing as a sender to the NX-1D system. More specifically, the routing control unit sends information to interface 917 which enables the interface to select a path 916...927 leading to the appropriate number group and then extends thousands, hundreds, tens, and units information over this path to the selected number group. Information comes back over interface 917 and DTU-922 to the routing control unit RCU. Thereupon the routing control unit, via a DTU, and the calling SOT, or calling trunk delivers signals to the group selector marker circuits 206 to enable the group selector to select an STT in the appropriate NX-1D five hundred line group, and thereafter to deliver signals over this established path into the STT of the NX-1D system and via this selected STT into the engaged subscribers line marker of the NX-1D system to complete the call.

On a call from a subscriber or trunk in the NX-1E system to a distant party over a trunk in the NX-1D system, the routing control unit, such as RCU-1, for example via DTU-915 obtains translation information from the data memory 800 (or from the NX-1D translator) to enable the routing control unit to complete the call via the group selector.

On a call from a subscriber or trunk in the NX-1D system to a subscriber in the first five thousand line group of the NX-1E system, the NX-1D sender involved via path 919, interface circuit 920, path 921, data transfer unit 922 and path 1309, for example, communicates with RCU-1 (or over path 1310, for example, communicates with RCU-2) whereby the routing control unit via DTU-915 ascertains the "number group" information from data memory 800 and relays such information back over DTU-922, path 921, and interface 920 to the NX-1D sender, enabling it to deliver signals to the group selector marker circuits 206 to enable the group selector to select an STT in the appropriate NX-1E 500 line group. The group selector thereafter delivers signals over this established path into the STT of the NX-1E system and via this selected STT into the engaged subscriber line marker of the NX-1E system to complete the call.

On a call from a subscriber or trunk in the NX-1D system to a subscriber in the second five thousand line group of the NX-1E system, the NX-1D sender involved via path 928, interface circuit 929, path 930, data transfer unit 1342 and path 1311, for example, communicates with RCU-3 (or over path 1312, for example, with RCU-4) whereby the routing control unit via DTU-1337 ascertains the "number group" information from the date memory and relays the information back over DTU-1342, paths 930, interface 929, and path 928 to the NX-1D sender, enabling the sender to complete the call as described.

In a similar manner, on a call from a subscriber or trunk in the NX-1D system to a distant subscriber over a trunk in the NX-1E system, the NX-1D sender is enabled by the NX-1D translator to complete the call via the group selector.

It should be understood that, as an alternative, in systems requiring only one pair of RCU's, the data memory physically can be part of each processor memory such as 1324.

DESCRIPTION OF ROUTING CONTROL UNITS

Referring to FIG. 13, each routing control unit, such as RCU-1, (designated 1301) comprises a multiplexer unit 1317 by means of which the routing control unit is enabled in a random selective manner to communicate over separate paths, such as 656, 658, 736, 738, 740, 742, 744, 746, 924, and 926 (FIGS. 6, 7 and 9 respectively) with data transfer units 633, 654, 707, 714, 719, 724, 729, 734, 915, and 922 respectively, these paths being indicated collectively as path 1309.

Each path, such as path 656, for example comprises a group of 16 data conductors for conveying word oriented data to and from data transfer unit means, such as DTU-633, a group of 16 address leads, whereby routing control unit RCU selectively can effect an address selection of one out of sixty-four magnetic cores by actuating an 8 × 8 word selection matrix in the data transfer unit, and six control leads by means of which the routing control unit can control the data transfer unit DTU including the direction of transmission.

As an alternative arrangement, a group of common busses can run from each RCU of a pair to its associated DTU's comprising input conductors, output conductors, and control conductors whereby the RCU addresses the selected DTU via the control conductors which, because of said addressing, will be the only DTU at that time to make itself responsive to the RCU via the input and output conductors.

The set of instructions comprising a master routine and subroutines for operation of the system are stored in the instruction portion of memory 1324. In operation of the system, when the processor control unit 1322 is ready for the next instruction, it sends a 16 bit word comprising an address via path 1321 and data handling unit 1320, path 1323 to memory 1324, resulting in a 16 bit instruction word being transferred from the instruction memory via path 1323, data handling unit 1320, and path 1321 back to PCU-1322.

As a result of receipt of this instruction word, for example, PCU-1322 via data handling unit 1320 and path 1318, conditions the multiplexer unit 1317 for the next transmission between a data transfer unit and RCU-1, the particular data transfer unit to which transmission is effected being determined in random access manner by the program.

Normally, by means of the stored program, RCU-1 is conditioned, for example, to serve SCU-1 and SCU-3 via DTU-633 (and SCU-2 and SCU-4 if RCU-2 fails) and RCU-2 is conditioned to serve SCU-2 and SCU-4 via DTU-633 (and SCU-1 and SCU-3 if RCU-1 fails). Also, RCU-1 is conditioned, for example, to serve RSO's via DTU-719 and STU-729, whereas RCU-2 is conditioned to serve RSO's via DTU-724 and DTU- 734. Also each RCU, such as RCU-1 and RCU-2, is conditioned to serve multifrequency receivers and key call receivers via DTU-654 and DTU-707 as required in handling specific calls.

In a testing arrangement relative to a routine control unit failure, each routing control unit of a pair, such as RCU-1 and RCU-2, has a word in data memory. As an example, RCU-1 has a word which we shall designate test word 1 in data memory 800, and RCU-2 has a word which we shall designate test word 2 in data memory 800. As one part of its work in the execution of its program RCU-1, via data transfer unit DTU-9, modifies test word 1 according to a prearranged program.

RCU-2 in the normal execution of its program, via data transfer unit DTU-9 looks at test work 1 in data word memory 800 for the expected pattern. If this pattern is found, RCU-2 assumes that RCU-1 is operating properly. If the expected pattern is not found, RCU-2 assumes that RCU-1 is defective, adjusts its program to handle the work of RCU-1, as well as its own work, and shuts RCU-1 down directly over path 1360. RCU-2 also effects the printing out of a message to this effect via teletype unit 803 or teletype automatic receive unit 810, reporting the failure. Similarly, RCU-2, in the normal execution of its program, modifies test word 2 in data memory 800 and RCU-1, in the normal execution of its program, looks at this test word pattern. If the correct pattern is found, RCU-1 assumes that RCU-2 is operating properly. If an incorrect pattern is found, RCU-1 modifies its program to take over the work of RCU-2 and shuts RCU-2 down directly over path 1360 and effects the printing out of the condition.

In a routing control unit, such as RCU-1, the data handling unit, such as 1320, the processor control unit, such as 1322, and the instruction and temporary memory unit, such as 1324, together comprise the control processor unit (CPU) designated 1319 (North Electric designation APZ-142).

The RCU's, as shown, operate in pairs. The work load is divided into two parts by partitioning the receiver-senders and other units into groups assigning one RCU to each part. In an alternative mode of operation, a first RCU of a pair performs all work while the other is in a standby condition ready to take over the full load upon failure of the first RCU.

When an RCU is taken out of service for any reason, the RCU which failed is normally allowed to finish any calls it is processing, but all new calls are handled by the remaining RCU. There is no disruption of service except that some calls being handled by the RCU which has a failure may be incorrectly routed. If these subscribers try to make a call a second time, the calls will be handled correctly.

For this to be accomplished, it is necessary for the remaining RCu to receive a signal designating that the faulty RCU of the pair is to be taken out of service. The remaining RCU then inputs the status for the units scanned by the faulty RCU and updates the status map in memory. All seizure signals present at the time are assumed to be old work, and the remaining RCU will accept only seizure signals appearing for the first time after that moment. The faulty RCU will be conditioned to refuse new seizures, but will clear out old work.

If one RCU should suffer a catastrophic failure, such that it could not clear itself out as described above, the remaining RCU must first release the units scanned by the faulty RCU. This would put on temporary lockout any callers using these units. The remaining RCU would handle all new seizures.

Other system effects of switching over to one RCU are: (1) the teletype automatic send receive set (ASR) may be assigned manually to the faulty RCU in which case the teletype printer would be assigned to the other RCU.

Before leaving this section, the following description of the temporary storage area of memory 1324, for example, is given.

The temporary memory is an area in the program memory of the routing control unit which is allotted to data storage on a per call basis. It will be organized as a storage area, or register, for each call in progress, and will therefore have a "register" comprising groups of cores corresponding to each receiver-sender unit.

The receiver scan process for call handling will, in fact, be accomplished by scanning the registers one at a time in sequence and inputting data from the receiver corresponding to that register as required. The data so obtained can be compared with that previously stored in the register to determine the status of the call. As digits are received, they will also be stored in the register, along with the line or number identity of the calling party, classmarking of both parties, and sender data.

The "register" for one receiver-sender, such as 716, in the temporary memory portion of the memory, such as 1324, in a routing control unit, such as RCU-1, comprises groups of cores as follows, for example:

| CORES | MEMORY FUNCTION |
|---|---|
| 1 | Busy |
| 5 | Coarse Timer |
| 4 | Fine Timer |
| 6 | Register Status |
| 7 | Originating Class Mark |
| 4 | Terminating Class Mark |
| 2 | Access Code |
| 4 | Called Number Digits or Line |
| 4 | Groups, Party, and Line HTU |
| 4 | Digits |
| 4 | |
| 4 | |
| 4 | |
| 4 | |
| 4 | Called Number Digits or Line |
| 4 | Group, and Line HTU Digits |
| 4 | |
| 4 | |
| 4 | Group Selector Code |
| 2 | |
| CORES | MEMORY FUNCTION |
| 2 | Group Selector |
| 4 | |
| 4 | Calling Number Digits or |
| 4 | Originating Line Group, Line |
| 4 | and Party |
| 4 | |
| 4 | |
| 4 | Calling Number or Originating |
| 4 | Line Identification |

The "register" associated with an SCU would not have the calling number digits or originating line group, line and party storage area but would have the following:

| CORES | MEMORY FUNCTION |
|---|---|
| 4 | Trunk Number for Incoming Trunk |
| 4 | Calls |
| 4 | |

On calls from a tributory office for toll ticketing purposes the calling number would be stored as shown above.

DESCRIPTION OF DATA CORE AND DRUM MEMORIES

In order to define the data memory requirements, the amount and types of data stored and the access times required for the various areas are presented.

"Number Group" Data

The "number group" data provides a translation of a directory number to line terminal equipment numbers. For a unit serving ten thousand directory numbers and five thousand terminal numbers, ten thousand memory words will be required. Each word contains the following data:

| | Bits |
|---|---|
| Office Code Group, 1 of 4/Office | 2 |
| Line Group, 1 of 10/Office Code | 4 |
| Line, 1 of 500/line group | 9 |
| Party, 1 of 10/line | 4 |
| Originating Class | 7 |
| Terminating Class | 4 |
| Total | 30 |

Total storage: 10,000 × 30 = 300 k bits
Timing Approximately 100 ms. for 5 calls or 20 ms. per call.

Automatic Number Identification (ANI) Data

The ANI data provides a translation of line terminal data to a directory number. For a unit serving ten thousand directory numbers and five thousand terminal numbers, five thousand memory words will be required. Each word will contain fourteen bits which if the minimum required to represent any directory number from 0000 to 9999. In the case of one-party lines, this 14-bit word will be the directory number. In the case of multiple-line party lines, the 14-bit word will be a reference address to a second memory area. The second area will consist of up to ten thousand 14-bit words, one for each directory number. The actual directory number word addresses obtained from the reference address modified by the party number.
Total storage: (5,000 + 10,000) × 14 = 210 k bits.
Timing: Approximately 50 ms. per call (in TSD).

Translator Data

The "translator" data supplies the following information:

TABLE 6

| Home Area and Four Foreign Areas: | Bits |
|---|---|
| "A" Group Select Code, 2 out of 4 | 4 |
| "B" Group Select Code, 2 out of 4 | 4 |
| "C" Group Select Code, 2 out of 4 | 4 |
| Intertoll | 1 |
| Pulsing Type | 4 |
| "A" Routing Digit, 2 out of 4 | 4 |
| "B" Routing Digit, 2 out of 4 | 4 |
| "C" Routing Digit, 2 out of 4 | 4 |
| Destination Board, 2 out of 4 | 4 |
| No Alternate | 1 |
| Dial Stop | 1 |
| Toll | 1 |
| DDD | 1 |
| Delete Digits | 4 |
| Total | 41 |

TABLE 7

| Home Area Only: | Bits |
|---|---|
| Toll Diversion | 1 |
| 4 Digit Blocking | 3 |
| Proceed After | 6 |
| All Digits Pulsed | 1 |
| Area Code | 1 |
| Delayed Ring | 1 |
| Free Service | 1 |
| Special Service | 1 |
| Total | 15 |

Each area has one thousand, one hundred possible 3-digit translations, including one hundred with missing digits, and area codes. Total translations will not exceed 5 × 1,100 or 5,500. Of this number there are usually fewer than one hundred different translations. To establish the amount of storage required, assume a maximum of five hundred different translations will be provided. Foreign areas will require 41 bits/word and the home area 56 bits/word. Assume 56 bits will be provided for all translations. Address five thousand, five hundred 9-bit words each containing a reference address to the five hundred word translation table. The address to one of five thousand, five hundred words is obtained from the 3-digit office code plus a weighting digit for one of the four foreign areas.

Total storage: 5,500×9=49. 5K
Total storage: 500×9=28 K

Total 77. 5K
Timing: 100 ms. for 2 calls or 100 ms. per call.

Abbreviated Dialing Data

According to one embodiment, abbreviated dialing data may be handled by providing a ten thousand word table addressable by the subscriber's directory number and containing the address of an abbreviated number field assigned to him. The field address is modified by the abbreviated number digit dialed, and the result is an address of a word which contains the terminating directory number. Assume one thousand subscribers out of ten thousand are provided abbreviated dialing capability, and each of these allowed eight abbreviated numbers within his own office. Then the ten thousand word table would require 10 bits to address the one thousand word field, and each word in the field would require eight numbers × four digits/number × four bits/digit = 128 bits. This is an admittedly simplified approach to the problem but should serve to indicate the amount of data storage required.

Total storage would be (10,000 × 10) + 1000 × 128) = 228 k bits.

SUMMARY OF STORAGE DATA REQUIREMENTS

| | | | |
|---|---|---|---|
| NGR: | 10, 000× | 30= | 300 K |
| ANI: | 5, 000× | 14= | 70 K |
| ANI: | 10, 000× | 14= | 140 K |
| TNS: | 500× | 56= | 28 K |
| TNS: | 5, 500× | 9= | 49. 5K |
| AD: | 1, 000× | 128= | 128 K |
| AD: | 10, 000× | 10= | 100 K |
| Total | | | 845. 5K bits |

NX-1D: NGR=50 accesses/second
NX-1D: ALI= 8
NX-1D: TNS=20

Total 78, or 1/78=12.8 ms./access

LOADING MEMORIES

When the system of the invention has been installed a magnetic tape containing program information followed by data is fed through the tape deck 810 (FIG. 8) and results in signals over path 811, the magnetic tape controller 812, path 813, the manual switch 814, path 827 (assuming that the manual switch is so set), path 1309, multiplexer 1317, path 1318, data handling unit 1320, and path 1323 into the instruction portion of memory 1324. As a result of the program thus stored, the ensuing data on the tape is transferred via DTU-915 into the assigned memory units of data memory 800.

Thereupon switch 814 is manually directed to its alternate position, and the same tape or another tape is fed through the tape deck 810 whereby signals over path 811, the magnetic tape controller 812, path 813, the manual switch 814, path 826, path 1310, multiplexer 1325, path 1326, data handling unit 1328, and path 1331 into instruction memory portion of memory 1332.

The instruction memories of RCU-3 and RCU-4 of the second five thousand line group are loaded by magnetic tape equipment 1202; the instruction memories of RCU-5 and RCU-6 by magnetic tape equipment 1204; and the instruction memories of RCU-7 and RCU-8 by magnetic tape equipment 1206.

As an alternative, the same tape equipment could also be switched between all RCU groups.

DESCRIPTION OF DATA TRANSFER UNITS AND TRANSFER OF DATA

Figure 32:
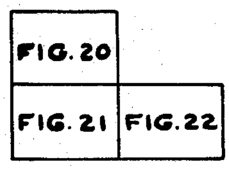
Figure 20:
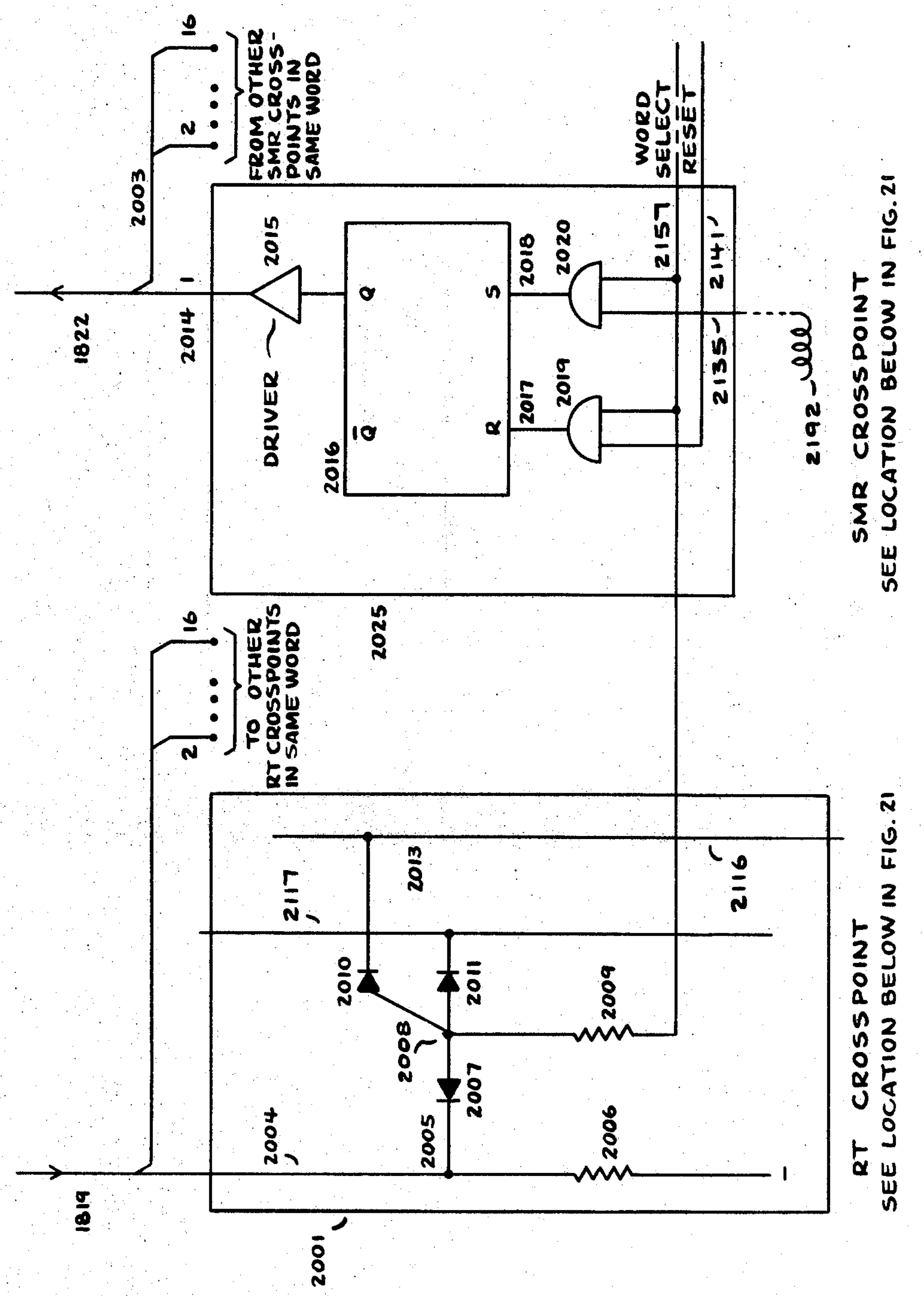
FIGS. 20—22, assembled as shown in FIG. 32, provide an assemblage drawing in which FIG. 21 comprises a block diagram of a data transfer unit.
Figure 21:
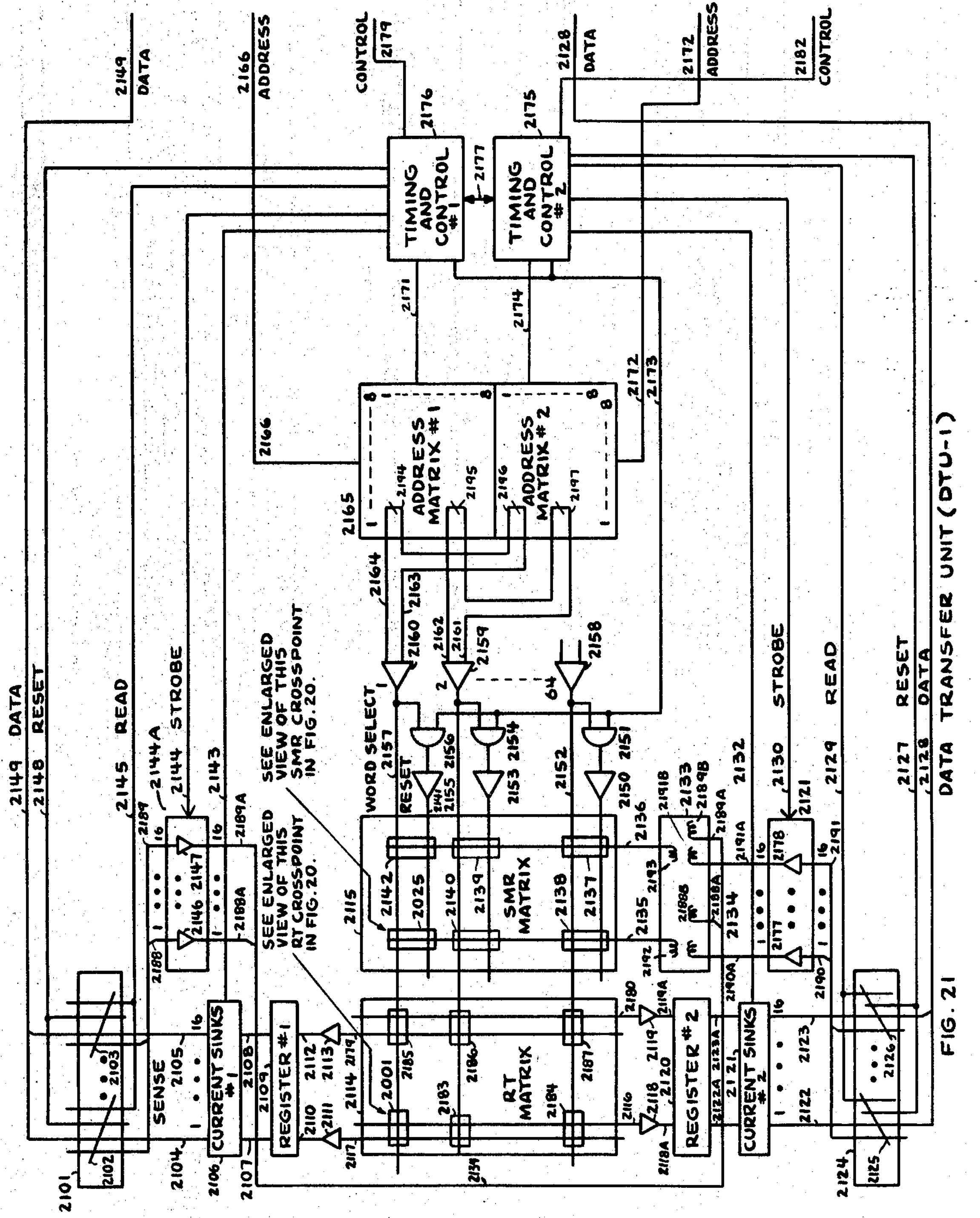
Figure 22:
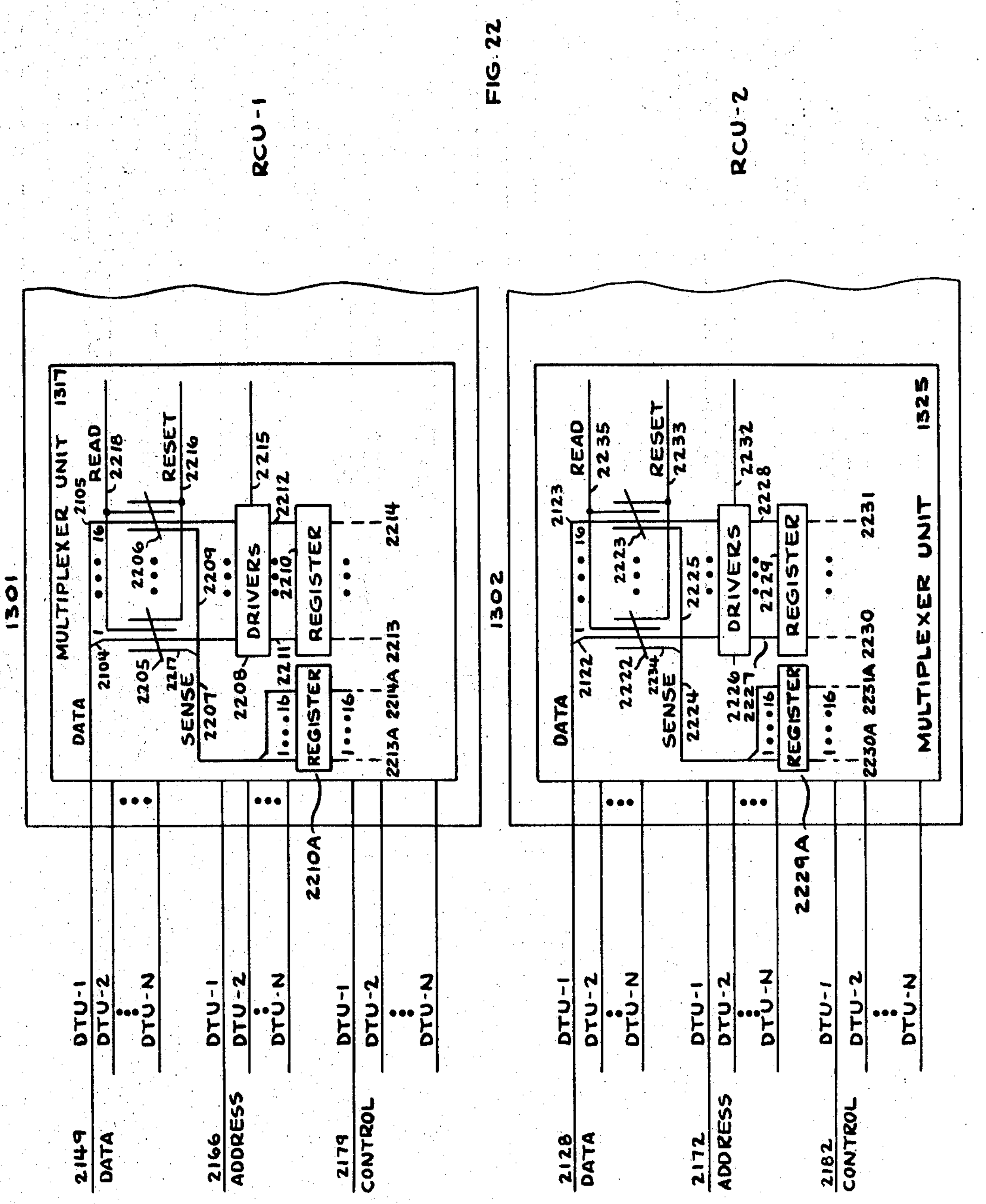

Referring to FIGS. 20, 21 and 22 assembled as shown in FIG. 32, a more detailed consideration of the data transfer unit, such as 633, and its cooperation with the RCU units and other circuitry is set forth.

More specifically, in FIG. 21 a latching type SMR matrix designated 2115 comprised of 64 words is provided for the purpose of effecting control by RCU-1 and RCU-2 of equipments served by the DTU (portions of the multiplexer units thereof being shown in FIG. 22). A nonlatching type RT matrix, designated 2114 comprised of 64 words is provided for the purpose of effecting communication from equipments served by the DTU to RCU-1 and RCU-2. It will be seen that each word select conductor, such as 2157, is common to both matrices; but that each reset conductor, such as 2141, only affects the SMR matrix.

Energization of each word select lead is controlled by either address matrix 01 (a 8 × 8 matrix) associated with RCU-1 or address matrix 02 (a 8 × 8 matrix) associated with RCU-2, address matrix 01 being provided with address information over the address path 2166 comprising 16 conductors from RCU-1 and address matrix 02 being provided with address information over the address path 2172 comprising 16 conductors from RCU-2.

SMR Matrix Operation

Words are read into the data transfer unit from RCU-1, for example, at such time as the program in RCU-1 directs the multiplexer unit 1317 to the DTU-1 terminals, involving operations over control path 2179, address path 2166, and data path 2149 in that order.

First, RCU-1 checks via path 2179 and timing control circuit 01, designated 2176, to determine whether the data transfer unit is busy or idle. If busy, RCU-1 initiates a timing interval. Normally the idle condition is detected before the end of this timing interval. If not, a system error is indicated. When idle, RCU-1 marks the DTU timing and control circuit 01 (2176) for SMR operation, whereupon this circuit via path 2143 conditions the 16 current sinks collectively, designated 2106, all to be turned on in preparation for reception of data from RCU-1.

RCU-1 then selectively activates the 16 leads of path 2166 with the word address, whereby address matrix 01 utilizes these signals on an 8 × 8 manner to select and switch one of 64 rectangular hysteresis cores, such as core 2194 for word 1. Word select lead 2157 is connected via a resistor to negative potential in amplifier circuit 2160. The switching of core 1 via leads 2163 and 2164 provides a pulse to amplifier 2160 which grounds lead 2157 for an interval, then removes the ground.

After the address signals have been sent via path 2166 as described but before the referred to interval has expired, RCU-1 sends signals over the data path 2149. More specifically, as a result of the selective loading of the 16 memory cells of register 2210 via the paths 2213...2214, RCU-1 via paths 2211...2212 causes the drivers of the group collectively designated 2208 to selectively energize the selected data leads of the group collectively designated 2104...2105 which pass through selected cores of the group collectively designated 2205...2206 and extend over DATA path 2149 through cores 2102...2103, through conductors 2104...2105 and current sinks collectively designated 2106. Selected cores of the group 2205...2206 and 2102...2103 switch, these cores being of the rectangular loop hysteresis type. The switching of the cores of the group 2205...2206 is incidental but the switching of the selected cores of the group 2102...2103 conveys the data.

Thereafter timing and control 01 extends a current pulse over READ lead 2145 which extends through all cores 2102...2103 causing the cores which have been switched to provide signals via the selected sense conductors of the group of 16 collectively designated 2188-2189 to select certain ones of the 16 strobe gates collectively designated 2144A.

Thereafter timing and control 01 via strobe path 2144 strobes all 16 gates driving the current pulse, whereby selected signals pass over the group of leads 2188A...2189A and path 2134 to selected ones of the primary windings 2188B...2189B which via selected secondary windings of the group 2192...2193 energizes selected leads 2135...2136 which extend through SMR crosspoints, activating the selected crosspoints of the selected word, the word select pulse on the horizontal conductor and the data pulse on the vertical conductor overlapping for the "ANDING" function.

For example, suppose that word 1 had been selected placing a ground pulse on lead 2157, and that also an overlapping ground pulse was placed on lead 2135. Crosspoint 2025 would thus be activated. An enlarged diagram of this crosspoint is shown in the right portion of FIG. 20. AND gate 2020, as a result of the ground pulse constructing the logic 1 word select signal on lead 2157 and the pulse constructing logic 1 on the column select lead 2135 gives out a logic 1 signal over lead 2018 to the "set" terminal of flip-flop 2016, whereby this flip-flop latches and via the Q terminal driver 2015, and paths 2014 and 1822 extend a logic 1 signal to further equipment.

Thereafter RCU-1 via path 2179 signals the timing and control 01 (2176) which provides a reset signal on reset lead 2148, whereby all cores of the group 2101 are reset. RCU-1 also provides a reset signal over reset lead 2216 (FIG. 22) whereby all cores of the group 2205...2206 in multiplexer 1301 are reset.

Words are received from associated equipment and read into RCU-1 as now described. Path 1819 (FIG. 20) which conveys information from associated equipment contains 16 conductors which extend to the 16 crosspoints of word 1 (i.e., the topmost word) in the RT matrix as indicated. The first conductor designated 2004 extends to crosspoints 2001 (See this crosspoint in FIGS. 20 and 21).

Crosspoint 2001 functions in the manner now described. Lead 2004 passes through point 2005 which is one side of diode 2007 and is connected via resistor 2006 to negative potential. Point 2008 which is the other side of diode 2007 is connected via resistor 2009, the word select lead 2157 through a resistor to negative potential, not shown, but in amplifier 2160 (FIG. 21).

Four conditions may occur at crosspoint 2001.

Condition 1: This is the normal condition when no information is being presented over path 1819 and word select is not in effect. With lead 2004 open and word select lead open, negative potential from the word select lead on point 2008 is more negative in potential than the negative potential on the other sides of diodes 2007, 2010, and 2011 back-biasing all of these diodes. No current flows in leads 2116 and 2117.

Condition 2: When an equipment attempts to convey information via path 1819 over lead 2004, ground potential is placed on lead 2004. Assume that word select is not in effect. This ground further back-biases diode 2007; the negative potential on the word select lead continues to back-bias diodes 2010 and 2011. This is a preparatory condition awaiting word select by a routing control unit.

Condition 3: If condition 2 obtains at the time that word select is made by a routing control unit (i.e. by the routing control unit placing ground on the word select leas as a result of the program being executed by the routing control unit), ground is on both sides of the diode, whereby it exercises no effect on point 2008. With ground from the word select lead via resistor 2009 on point 2008, diodes 2010 and 2011 are forward biased and conduct, whereby current flows in paths 2116 and 2117 (refer to leads 2116 and 2117 in FIG. 20 and also FIG. 21), activating amplifiers 2111 and 2118 which register a logic 1 bit of information in the first of 16 memory cells in registers 01 and 02.

Condition 4: At such time that the routing control unit places ground on the word select lead 2151, if lead 2004 is open, ground on point 2008 back-biases diodes 3007, 2010 and 2011, and no current flows in leads 2116 and 2117.

In summary, it can be stated that the only condition in which current flows in leads 2116 and 2117 is that condition when information is being presented on lead 2004 and word select occurs.

With this background reference is made to FIGS. 20413 22. In canvassing path 1819 for the purpose of bringing in any data waiting on the 16 conductors thereof, RCU-1 first checks over paths 2179 to ascertain the busy or idle condition of the date transfer unit. If idle, RCU-1 signals via paths 2179 to the timing and control 01 designated 2176, marking 2176 for RT operation; timing and control 01 via lead 2143 prepares the current sinks for operation.

RCU-1 then sends the address of word 1, for example, via path 2166, whereby address matrix 01 via amplifier 2160 places a ground pulse on lead 2157 to select word 1. At this time, the 16 current sinks 2106 are selectively turned on according to the pattern of logic 1 signals registered in the 16 registers 2109. RCU–1 then via lead 2215 turns on its drivers 2208, but current flows only in the drivers of its 16 drivers corresponding to the current sinks of the 16 current sinks 2106 which have been prepared by register 01. As a result, 2102...2103 and 2205...2206 are selectively switched by the current pulse, the switching of any cores 2102...2103 being incidental, but the selective switching of cores 2205...2206 conveys the information to RCU–1.

RCU–1 then presents a read pulse over lead 2218 to all cores of the group 2205...2206 and the cores, which have been switched, switch back selectively pulsing the sense leads 2217...2209 which via path 2207 set memory cells in register 2210A, whereby over leads 2213A...2214A RCU–1 has access to the transferred information.

Thereafter RCU–1 presents a reset pulse over lead 2216 to cores 2205...2206, and timing and control 01 presents a reset pulse over lead 2148 to reset cores 2102...2103.

LOCAL TO LOCAL CALL

Referring to FIG. 1, it will be assumed that the subscriber at Station A which is connected to one of the lines of the five hundred lines, designated 101, originates a call to the subscriber at Station C by lifting the receiver from his substation set. The associated line circuit in the group of line circuits 103 is actuated over the path 102, and signals the line entrance originating circuit (LEO) 105 over path 104.

LEO circuit 105 over path 106 and 108 or 109 calls in one of the subscriber line marker circuits 110 and 111, each comprising a marker relay group, such as 110A, a code receiver relay group, such as 110B, and connect relays (not shown); and indicates to the seized marked the 25 line group origin of the calling line (i.e. the particular subscriber's crossbar switch or link SLA designated 127 to which the calling line is connected), and also extends signalling circuits into the seized one of the markers by means of which the marker identifies the calling line. In the present example, it will be assumed that marker 110 is seized.

Marker 110 next by "by-path" principles tests for and selects an idle receiver-sender of the group 716, 721, 726, 731 (FIG. 7) by means of a test lead from the receiver-sender through off-normal break contacts of an idle SRL crossbar vertical in one of the three units such as 133, over paths indicated as 115, 117, 118, and 124; test guard and connect relays, such as 125, in subscriber's receiver link (SRL) equipment, such as 133; and paths, such as 177A.

The calling subscriber's line is connected to the horizontal of the SLA switch assigned to the 25 line group containing the calling subscriber's line, such as SLA–127. The marker accordingly has the problem of connecting the horizontal of the calling switch 127 with the vertical of the SRL switch, such as 133, associated with the seized receiver-sender as represented by such vertical.

It should be observed at this point that in effect each subscriber's line is connected to a particular horizontal of a single SLA switch, each five hundred group of lines having 20 SLA switches. Each SLA switch has in effect ten verticals which are in effect connected in a certain pattern to the horizontals of a plurality of subscriber's links B (SLB) such as 129. The number of SLB switches is determined by traffic considerations, there being a maximum of 15 in a five hundred line group. Each SLB switch has ten verticals, four of which are connected to subscriber originating trunks (SOT) such as 131, and six of which are connected to horizontals of subscriber link C circuits (SLC). such as 105, there being a maximum of six such SLC switch circuits in a five hundred line group. Each SOT is connected as an input to a vertical in a group of group selector switches of the group selector circuits designated 202 FIGS. 2A and 2B).

It should also be observed that each SOT circuit is connected in effect to a horizontal of a subscriber's register link, such as 133. Accordingly, an SOT circuit is represented by a vertical in an SLB crossbar switch, a vertical in a GSA crossbar switch, and a horizontal in an SRL crossbar switch.

The seized marker 110 now tests as to whether the calling SLA switch has an idle vertical (or verticals) leading to the SLB switches, the tested verticals being represented in effect by certain horizontals in the SLB switches. The marker also tests for an idle SOT for connection to an idle SLB horizontal and an idle SRL vertical. Since the SLA horizontal magnet has been operated at an earlier time, the marker now operates the SLB and SRL horizontal magnets, and the operation of the vertical magnets of the SLA, SLB, and SRL switches is effected thereafter. It should be understood that the horizontal magnets are "select" magnets and the vertical magnets are "-hold" magnets. After the hold magnets are operated, the select magnets are released. The testing and circuit operations above described are accomplished over paths, such as 115, 117, 119, 121, 123, and 137D. It should be understood that leads entering or leaving a box, such as 133, for example, may have connections inside the box other than the ones specifically shown.

At this stage of operations, the calling line is extended over paths, such as 102, 126, and SLA switch 103 (primary crossbar switch), path 128, and SLB switch 129 (secondary crossbar switch), path 130, through path 131B of SOT circuit 131, path 132, SRL switch 133, path 177A, slipped or graded multiple 750, and path 715, for example, to a receiver-sender (R-SO), such as 716.

Each receiver-sender, such as 716, is connected over a path, such as 718, with a data transfer unit, such as 719 (DTU–5 in this case).

Before proceeding with a sequential description, slight digression is made to consider certain logical word assignments in the routing control units RCU's and in data transfer units DTU's.

The memory, such as 1324, in each routing control unit, such as RCU–1, contains three groups of words for storing signals pertaining to senders, such as 705, receiver-senders RSO, such as 716, and receiver-senders RSD, such as 712. All words in memory 1324 contain 16 bit positions, all or part of which may be used in a given word.

The first group in 1324 comprises eight RT words for a plurality of 128 bits, each bit of which is for the purpose of storing the incoming seized condition of a sender, RSO, or RSD up to a maximum of 128.

The second group comprises a plurality of 128 RT words, each word being for the purpose of storing signals incoming from DTU pertaining to a sender, RSO, or RSD for a maximum of 128.

The third group comprises a plurality of 128 SMR words, each word being for the purpose of controlling an associated sender, RSO or RSD.

Additional memory space is assigned by the program in the instruction memory for storing dialed digits and keeping an up-to-date status of register senders.

As in the RCU memory, so in the DTU's associated with senders, RSO's, and RSD's, certain RT words are reserved for seizure indications, each sender, RSO or RSD being represented by a single bit (crosspoint).

Also in these DTU's, each associated unit has its associated 16 bit RT word in a second group and its associated SMR word in a third group.

The following table defines the 16 bit positions in each RT word associated with a receiver-sender in DTU's:

TABLE 1

| | Function in RSO | Function in RSD |
|---|---|---|
| Bit position: | | |
| 1 | Code receiver bit #1 | Same. |
| 2 | Code receiver bit #2 | Do. |
| 3 | Code receiver bit #3 | Do. |
| 4 | Code receiver bit #4 | Do. |
| 5 | Code receiver bit #5 | Do. |
| 6 | Code Start/Stop | Do. |
| 7 | No error | Do. |
| 8 | Test | Do. |
| 9 | Dial Pulse | |
| 10 | Coin/2 Party Test | |
| 11 | Vacant | Class M1. |
| 12 | do | Class M2. |
| 13 | do | Vacant. |
| 14 | do | Do. |
| 15 | do | Do. |

The following table defines the above code receiver bit configurations and their corresponding digit values and/or message conveyed:

TABLE 2

| Code Receiver Bits 5 | 4 | 3 | 2 | 1 | Digit Value | Message (Code Meaning) |
|---|---|---|---|---|---|---|
| 0 | 0 | 0 | 0 | 0 | Blank | |
| 0 | 0 | 0 | 1 | 1 | 1 | |
| 0 | 0 | 1 | 0 | 1 | 2 | |
| 0 | 0 | 1 | 1 | 0 | 3 | LBY, Line Busy. |
| 0 | 1 | 0 | 0 | 1 | 4 | Trunk Seizure. |
| 0 | 1 | 0 | 1 | 0 | 5 | |
| 0 | 1 | 1 | 0 | 0 | 6 | |
| 1 | 0 | 0 | 0 | 1 | 7 | |
| 1 | 0 | 0 | 1 | 0 | 8 | |
| 1 | 0 | 1 | 0 | 0 | 9 | |
| 1 | 1 | 0 | 0 | 0 | 0 | GBY, Congestion Busy. |
| 1 | 1 | 1 | 1 | 0 | | START (Operator). |

The following table defines the 16 bit positions in each SMR word associated with a receiver-sender in DTU's.

TABLE 3

| | Function in RSO | Function in RSD |
|---|---|---|
| Bit Position: | | |
| 1 | Code Send | Same. |
| 2 | Battery-Ground Send | Do. |
| 3 | Multifrequency Send | Do. |
| 4 | Dial Pulse Send | Do. |
| 5 | Sender Digit Bit 1 | Do. |
| 6 | Sender Digit Bit 2 | Do. |
| 7 | Sender Digit Bit 3 | Do. |
| 8 | Sender Digit Bit 4 | Do. |
| 9 | Sender Digit Bit 5 | Do. |
| 10 | Sender Digit Bit 6 | Do. |
| 11 | Sender Commands Bit 1 | Vacant. |
| 12 | Sender Commands Bit 2 | Do. |
| 13 | Sender Commands Bit 3 | Do. |
| 14 | (M2)A Identify SLM | Do. |
| 15 | (M3)B Identify SLM | Do. |
| 16 | Connect RSO Unit | Do. |

The following table defines the above sender digit bits.

TABLE 4

| Sender Digit Bits 6 | 5 | 4 | 3 | 2 | 1 | Digit Value | Message (Code Meaning) |
|---|---|---|---|---|---|---|---|
| 0 | 0 | 0 | 0 | 0 | 0 | Blank | |
| 0 | 0 | 0 | 0 | 1 | 1 | 1 | Local (SLM). |
| 0 | 0 | 0 | 1 | 0 | 1 | 2 | Delayed Ring (SLM). |
| 0 | 0 | 0 | 1 | 1 | 0 | 3 | Local-Official Number (SLM). |
| 0 | 0 | 1 | 0 | 0 | 1 | 4 | Trunk (SLM) (or Trunk) (Trunk origin). |
| 0 | 0 | 1 | 0 | 1 | 0 | 5 | |
| 0 | 0 | 1 | 1 | 0 | 0 | 6 | |
| 0 | 1 | 0 | 0 | 0 | 1 | 7 | Test (Busy Verification) (SLM). |
| 0 | 1 | 0 | 0 | 1 | 0 | 8 | Request Calling Number (District Office) TT Local MCH SLM. |
| 0 | 1 | 0 | 1 | 0 | 0 | 9 | |
| 0 | 1 | 1 | 0 | 0 | 0 | 0 | Trunk Origin-official Terminating Number SLM. |
| 1 | 0 | 0 | 0 | 0 | 1 | | GS Outlet Identity. |
| 1 | 0 | 0 | 0 | 1 | 0 | | Local Origin-Official Terminating Number—MCH. |
| 1 | 0 | 0 | 1 | 0 | 0 | | KP (1st Digit of MF Message). |
| 1 | 1 | 0 | 0 | 0 | 0 | | ST (Last Digit of MF Message). |

NOTE.—MCH=Malicious Call Hold.

The following table defines the above RSO sender command codes:

TABLE 5

| Command Bits 3 | 2 | 1 | Sender Command |
|---|---|---|---|
| 0 | 0 | 0 | Blank. |
| 0 | 0 | 1 | Toll Diversion. |
| 0 | 1 | 1 | Return Coin. |
| 1 | 0 | 1 | Request GS Marker. |
| 1 | 1 | 0 | Apply Dial Tone. |
| 1 | 1 | 1 | Call Trouble Hold. |

Returning from the digression, routing control units RCU in going through their program, scan RT words in the DTU's serving senders, RSO's, and RSD's at least once every 10 milliseconds.

When an RCU, in going through its program, detects the logic 1 signal in the seizure bit assigned to receiver-sender 716 in DTU–5 in the group of words used for seizure detection, it stores a logic 1 signal in the corresponding bit in memory 1324 and, while standing on DTU–5, sends a composite SMR word pattern to SMR word 01 comprising the logic 1 signal in bit positions 14 and 16 (see Table 3). (If RCU–2 (1302) had been involved with DTU–5 (719) it would have sent a composite SMR word pattern comprising a logic 1 signal in bit positions 15 and 16 (see Table 3). The logic 1 signal in bit position 14 is for the purpose of ascertaining which SLM is involved; whereas, that in bit position 16 is for the purpose of controlling the SOT involved.

Figure 23:
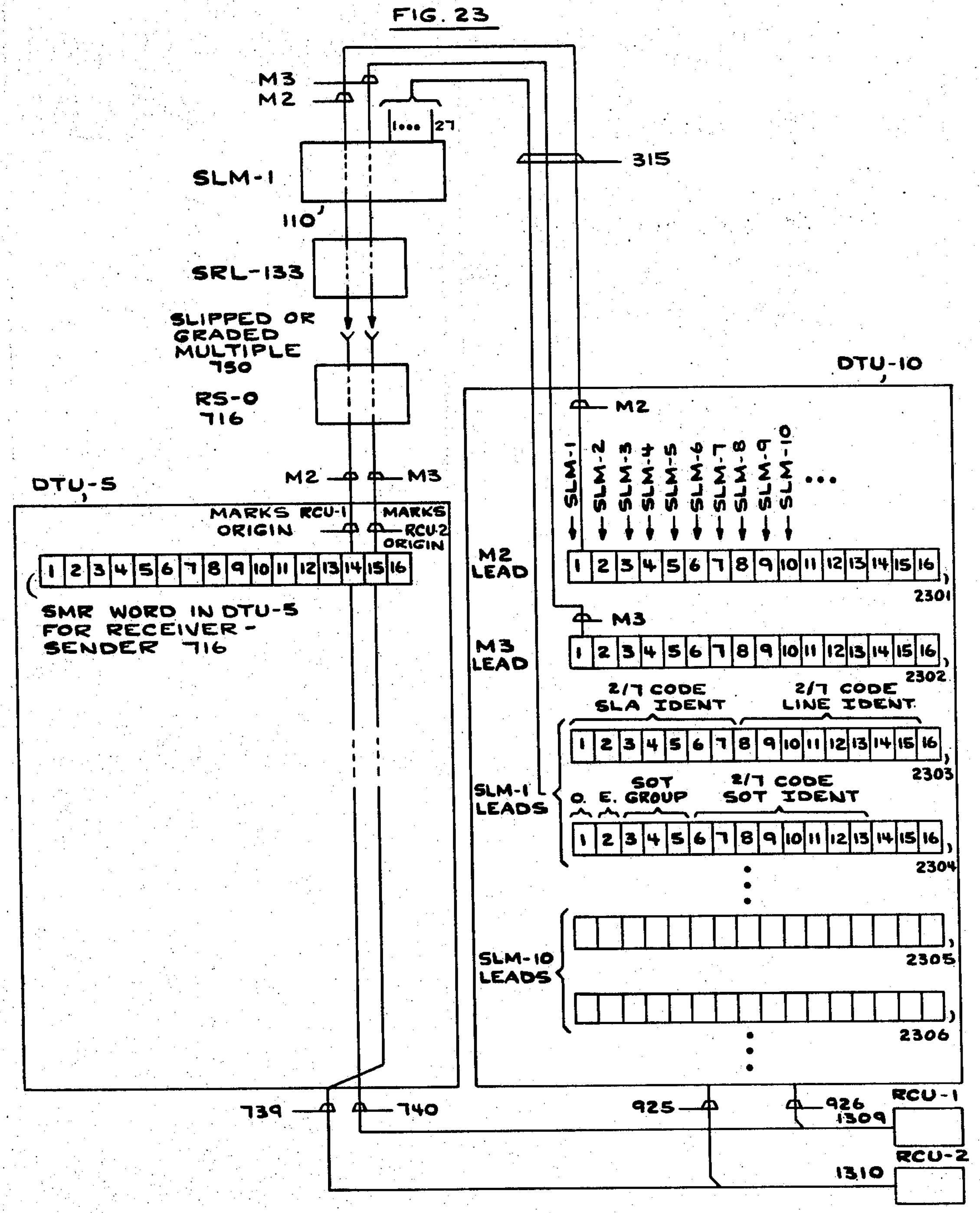
FIG. 23 is a block diagram illustrating cooperation between routing control units, data transfer units, receiver-senders, subscriber receiver links, and subscriber line markers to provide certain calling identification.

Reference is made to FIG. 23 to further explain the function of the logic 1 signal in bit position 14. In this FIG., RCU–1 over paths 1309 and 740 has placed the logic 1 signal in bit position 14 of the SMR word in DTU–5 for receiver-sender 716. As a result thereof, the logic 1 signal is sent from bit 14 over the M2 lead which is associated with RCU–1, through receiver-sender 716, slipped or graded multiple 750, SRL–133, SLM–1, the M2 path from SLM–1 to bit position 1 in the M2 lead word, designated 2301, in DTU–10 which is an RT word, placing the logic 1 signal in this bit position, whereby RCU–1 when it subsequently reads the M2 lead word in DTU–10 as directed by its program, via paths 926 and 1309 receives a marking that SLM–1 is involved in the call. If SLM–2 has been involved in the call, a corresponding signal out of SLM–2 via its M2 lead which is connected to the bit 2 position of the M2 lead word 2301 would have resulted in the logic 1 signal in the bit 2 position. Similarly for SLM's 3—10 relative to bit positions as indicated.

If RCU–2 had been involved, as stated previously, it would have placed the logic 1 signal in bit position 15, whereby the logic 1 signal from bit position 15 via the M3 lead, register-sender 716, slipped or graded multiple 750, SRL–133, SLM–1, the M3 lead from SLM–1, would have been placed in the bit 1 position of the M3 lead word, designated 2302, in DTU–10 whereby, via paths 925 and 1310, RCU–2 would have received a marking that SLM–1 is involved in the call.

Backtracking, when RCU–1 was informed that SLM–1 is involved in the call, it looks at the RT words designated 2303 and 2304 associated with SLM–1, which have 27 leads over path 315A connected to 15 bit positions of word 2303 and 12 bit positions of word 2304. Over such leads, logic 1 signals are selectively placed in the bit positions to convey information to RCU–1. More specifically, the bit positions 1—7 of word 2303 provide a 2 out of 7 code (abbreviated 2/7 code) to identify the calling SLA of 20 such SLAs; the bit positions 8—15 of word 2303 provide a 2/8 code to identify the specific calling line of 25 such lines in this SLA; bit position 1 of word 2304, if it contains logic signal 1, indicates that SLM–1 is working in the odd five hundred line group; alternatively, bit position 2 of word 2304, if it contains logic signal 1, indicates that SLM–1 is working in the even five hundred line group; bit positions 3, 4, and 5 of word 2304 indicate which SRL group of SOT's is involved (the presence of the logic signal 1 in one of such positions indicating the group; and bit positions 6—12 of word 2304 provide a 2/7 code to identify the particular SOT involved in the SRL group.

There are two such RT words for each SLM in the five thousand line group. If RCU–1 had discovered logic 1 in bit position 10 of word 2301, it would have looked at words 2305 and 2306 to which the 27 corresponding leads from SLM–10 are connected. Line and SOT data is checked for any errors which, if any, are recorded.

While only ten SLM's are indicated in DTU–10, it would be apparent to one skilled in the art how provision for up to 16 would be made. By adding another RT word for SLM identification, up to 32 SLM's could be accommodated.

The function of the logic 1 signal placed in bit position 16 of the SMR word in DTU–5 for receiver-sender 716 is now set forth. Such logic 1 signal operates a relay in receiver-sender 716 which connects ground to a lead which holds the SRL switch vertical operated when SLM–1 releases, and connects resistance ground to two control relays in series in the SOT, so that only the first of the two relays operates and holds open the tip and ring connections, represented by path 131A, between the SOT and the group selector. This first relay in the SOT also connects ground to the incoming test wire which operates the calling line cutoff relay and holds the vertical magnets of the SLA and SLB crossbar switches when the marker releases. This same ground on the incoming test wire extends to marker 110, releasing it.

RCU–1 stores the identities just described in its memory 1324 and passes the calling line identity to data memory 800, receiving back the class marking for the calling line. Also as a result of detection of 3240 ohm ground on the tip by receiver-sender 716, if the calling party is party 02 on the line, circuit 716 places the logic 1 signal in the bit 10 position of its RT word in DTU–5, whereby RCU–1 detects party 02 and registers the same in memory 1324.

Thereupon RCU–1 places logic 1 in each of bit positions 11 and 12 of the SMR word in DTU–5 for receiver-senders 716, whereby 716 returns dial tone over tip and ring connections to the calling line.

The calling subscriber at station A then dials the seven digits of the called subscriber's directory number comprising the three digit office code plus four digits defining the called line which are received over tip and ring connections in receiver-sender 716.

Digressing, memory, control logic, and storage such as found in NX–1D registers are relegated in the present design to the data transfer units and routing control units, thereby reducing the functional complexity of the receiver-sender units. The receiver-sender units contain electromechanical switching devices, such as relays, required to perform the receiving and sending functions relative to associated equipment. Timing of all signals outgoing from the receiver-sender are controlled by the RCU units, according to the stored program. With this arrangement, the complexity of receiver-senders is minimized.

Receiver-sender 716 pulses bit position 09 in its RT word in DTU–5 as the called number is dialed, whereby RCU–1 during successive scans every 10 milliseconds or less detects the same and stores the digits received in memory 1324 in registers comprising pluralities of magnetic cores assigned to receiver-sender 716.

After the first digit is dialed, the status register sends an SMR word having a logical 0 in all the command bits which removes the dial tone. This SMR word will retain the logic "1" in the bit 16 position.

After the fist three digits of the called directory have been stored in memory 1324, RCU–1 compares the same with the three digits of the four office codes (i.e., one for each RCU group, typically five thousand lines or ten thousand directory numbers). As the three digits received coincide with the first of the four office codes, RCU–1 does not consult data memory 800 at this time but continues to store the remaining four digits of the called directory number.

After the called directory number has been stored in memory 1324, RCU–1 sends an address corresponding to the called number to the data memory 800 via DTU–9 and receives back and stores in the memory 1324 a "number group" translation thereof comprising identification of (1) the five hundred group in which the called number is located, (2) the equipment hundreds digit location of the called subscriber, (3) the equipment tens digit location of the called subscriber, (4) the equipment units digit location of the called subscriber, and (5) the party-on-the-line designation of the called subscriber (or in the case of private branch exchange, the fact that the called subscriber is associated with private branch exchange lines).

If abbreviated dialing was used the corresponding directory number is requested from the data memory. Its digits are analyzed and checked for validity.

Thereupon RCU–1 places the logic 1 signal in bit positions 11 and 13 of the SMR word associated with receiver-sender 716 in DTU–5 enabling 716 to place solid ground on the lead via SRL 133 to SOT 131 causing a second relay in SOT 131 to operate which forwards the sleeve lead ground over path 135 to the group selector circuits 202. The group selector circuits extend the inlet over path 203 to the inlet identifier circuits 204 which identify the inlet and extend a tip and ring connection over path 205 to the group selector marker circuits 206.

The group selector marker circuits 206 place a 24 volt negative "dial start" signal on the tip lead from circuit 206 which extends back to the receiver-sender 716 which places the logic 1 signal in bit position 6 of its RT word in DTU–5, whereby RCU–1 is notified that sending is in order and stores this information in the RT word in memory 1324 associated with receiver-sender 716.

Assume that the party at station A (FIG. 1) dialed the directory number of station C (FIG. 1) and that the following "number group" information relative to station C was obtained by RCU–1 from memory 800 and stored in memory 1324:

Five hundred group code—01
Equipment hundreds digit code—03
Equipment tens digit code—05
Equipment units digit code—07
Party-on line designation code —02

Digressing, it should be observed that wraparound trunks are reached, for example, from the first stage of group selection; whereas line and trunk groups are reached from the second stage of group selection; so that to reach wraparound trunks, routing control units must send only two digits via DTUs and receiver-senders to the group selector marker circuits. However, to reach line and trunk groups, two digits must be sent to the first stage marker circuits and two additional digits to the second stage marker circuits. In the case of line groups, two digits are sent to the first stage group selector marker circuits and the same two digits are repeated to the second stage group selector marker circuits.

It is now assumed that the sender must send 01–01 to reach the first five hundred group of lines. RCU–1 in accordance with Table 3 places logic 1 in bit positions 1, 8, 9, 11, 13, and 16 of the SMR word 01 in DTU–5. The logic 1 in bit position 1 marks receiver-sender 716 for code sending to the group selector marker. The logic 1 in bit positions 11, 13, and 16 retain the two switching relays in SOT–131 operated. The logic 1 in bit positions 8 and 9 (as further elaborated in Table 4) enables RS 716 to code send digit 0 to the first stage of the group selector marker code receiver therein. These code signals (see U.S. Pat. No. 3,007,008) comprise the application of +48 volts, –48 volts, ground, or nothing to the tip conductor; and simultaneously +48 volts, –48 volts, or nothing to the ring conductor, wherein zero volts is ground. To send digit 0, nothing is placed on the tip and –48 volts is placed on the ring. At the time of sending this SMR word to DTU–5, RCU–1 starts a timing interval and proceeds with its program, the SMR word bits being latched in DTU–5.

At the end of a timed interval (40 milliseconds) RCU–1 connects to DTU–5 again, tests for busy or idle and, if idle, by a pulse marks the SMR operation over control path 2179. Timing control 2176 transmits a reset pulse over path 2148 whereby logic 0's are placed in all bit positions in SMR word 01. While thus standing on DTU–5, RCU–1 again pulses the address of SMR word 01 over address path 2166 and then sends the pattern of logic 1's in bit positions 1, 11, 13, and 16 whereby digit 0 is ended. The relays in the receiver-sender are slow enough that the ones receiving logic 1 again do not drop during the transition.

At the end of another timed interdigital interval (40 milliseconds) RCU–1 connects to DTU–5 again, tests for busy or idle, and, if idle, marks the SMR operation over control path 2179. Timing control 2176 transmits a reset pulse over path 2148 whereby logic 0's are placed in all bit positions in SMR word 01. While thus standing on DTU–5, RCU–1 pulses the address of SMR word 01 over address path 2166 and then pulses the digit 1 over the data path 3149, placing logic 1s in bit positions 1, 5, 6, 11, 13, and 16 which enables 716 to code send digit 1 to the first stage group selector marker code receiver. To send digit 1 ground is placed on the tip and –48 volts is placed on the ring. After the timed interval RCU–1 again resets SMR word 01 in DTU–5.

At the end of a timed interval (40 milliseconds) RCU–1 ends the sending of digit 1, as would be understood.

Thus, two such signals are sent to the group selector marker circuits to represent tens and units decimal digits. With the various combinations of two such digits, any one of one hundred possible selections can be made by two rapid signal applications. Digressing, certain of these one hundred selections are for wrap around trunks off the first stage of group selection. Certain other of these selections lead as inlets to the second stage of group selection for five hundred line group selection and trunk group selection.

Receiver-sender 716 again receives the dial start signal in the RT word 01 which RCU–1 detects. Thereupon RCU–1 via DTU–5 and 716 sends digits 01 to the second stage group selector code receiver.

As a result thereof, the second stage group selector marker circuits of 206, by means of the route relay circuits 210 and route relay control circuits 208, test for and select an idle outlet associated with the STTs of the first five hundred line group, and by "bypath" means examine the possible idle routes from the calling SOT inlet, such as 135, to the idle STT outlet, and over "bypath" connections 206A (similar to 190 and 191 in FIG. 1 of U.S. Pat. No. 3,007,006) actuate first the horizontal select and then the vertical magnets of the crossbar switches in the first and second group selector stages of group selector 202 to extend a connection from SOT 131 to the idle STT, such as STT–179, in the called five hundred line group. The group selector marker circuits then release.

The seized STT circuit, such as 179, transmits –24 volts over the tip to the receiver-sender 716, whereby when RCU–1 makes the next RT selection of 716, it becomes aware via DTU–5 of the "dial-start." In a manner similar to that described, RCU–1 via DTU–5, and receiver-sender 716 transmits two information bearing signals to the code receiver in the connected STT–179, the first signal indicating the type of origin of the call and the second signal indicating the party on the line.

The first of these signals indicates, according to the combination of the signal, any one of four possibilities as to the origin of the call and one possibility as to the destination thereof and the adjustment in the STT necessitated thereby. Thus according to one combination, if the call is of local origin, the STT is conditioned to insert calling and called battery feed coils and condenser bridge. (If another combination indicates that the call is of trunk origin, the STT is conditioned to cut the tip and ring conductors through metallic in which case the battery feed coils are located in the calling trunk circuit. If another combination indicates that the call requires a delayed ring feature, the STT pretrips the ring for delayed ring, the operator reclosing the ring tip relay over "c" wire. Etc.)

The second signal to the STT takes any one of 10 combinations to condition the STT in preparation to place any one of 10 ringing combinations on the called line to signal the called subscriber station.

After these signals have been received by the STT and are properly registered, the STT, such as 137, extends a call signal over paths 138, 139, and 140 or 141, 144 or 151, line entrance terminating circuit 145 or 152, path 147 or 154 and 148 or 155 to seize the code receiver, such as 110B or 111B, of one of the subscriber line markers, such as 110 or 111. It should be understood that the code receiver of a given marker can be receiving the signals incident to a terminating call simultaneously with the use of the marker in the establishment of an originating call.

After the code receiver of the line group marker, such as 110, for example, has been seized and the tip and ring conductors extended thereto (see path 142, box 143, and path 146), the marker 110 applies –24 volts to the tip lead as a code start signal to the receiver-sender 716, which via the bit 6 position of the RT word in DTU–5 enables RCU–1 to receive the code start signal.

It should be recalled that it was postulated that the equipment hundreds digit code is 03. Accordingly, RCU–1, at the proper time in its program, transmits SMR word data to the SMR word associated with receiver-sender 716 in DTU–5 comprising logic 1 in bit positions 1, 8, 9, 13, 15, and 16, whereby 716 code sends digit 0 to code receiver 110B. RCU–1 proceeds with other items in its program and after the timed interval (40 milliseconds has expired), RCU–1 transmits SMR word data to the SMR word associated with receiver-sender 716 in DTU–5 comprising logic 1 in bit positions 11, 13, and 16, whereby the logic 1 in bit positions 1, 8, 9 is removed. RCU–1 proceeds with other items in its program and after an interdigital pause (40 milliseconds) which it times, RCU–1 transmits SMR word data to the SMR associated with receiver-sender 716 in DTU–5 comprising logic 1 bit positions 1, 6, 7, and 16, whereby 716 code sends digit 3 to code receiver 110B. RCU–1 proceeds with other items in its program.

It was further postulated that the equipment tens digit code is 05. After a timed interval, RCU–1, in a similar manner, via DTU–5 and receiver-sender 716, effects the registration of digits 05 in code receiver 110B. It was also postulated that the equipment units digit code is 07. After a timed interval, RCU–1, in a similar manner, via DTU–5 and receiver-sender 716 effects the registration of these digits on code receiver 110B.

Digressing, as an alternative, the code receiver for the STT information also can be code receiver 110B, in which event there need not be a code receiver in each STT. With this alternative marker 110 returns the STT information back to the STT.

Upon receiving the hundreds, tens, and units information relating to the called line equipment location, the marker code receiver 110B seizes the marker circuit portion 110A of marker 110 when it is idle. Marker 110 then operates to connect relays associated with the SLA switch containing the called line and horizontal magnets in this SLA switch to set up a test connection to the called line test wire of station C over the horizontal off-normal contact, whereby marker 110 gets an indication as to the busy, idle, or lockout condition of the called line. Such switching is accomplished over paths 115, 117, and 162. If the called line is busy, marker 110 then determines whether or not the called line is identical to the calling line, that is, whether this is a reverting call. Such test consists of testing the continuity of the test wire by means of a tone oscillator. (If the call were of a reverting nature, marker 110 would establish connections from STT–137 to the called line through SLC, SLB, and SLA switches over paths 137A, 137E, 128, 126, and 102 to the called station. Also a signal would be sent to STT–137 from marker 110, indicating that the call is a reverting call).

Assuming that the call is not of a reverting nature the line group marker does not complete the connections from the STT to the called line through switches SLC, SLB, and SLA, but instead marker sends a line busy signal comprising +48 volts to the code receiver in the receiver sender 716, indicating that 716 can release.

Receiver-sender 716 places the logic 1 signal in bit positions 2 and 3 of its RT word in DTU–5 (see Tables 1 and 2), whereby RCU–1 learns that the called line is busy and transmits SMR information comprising all logic 0's to the SMR word of receiver-sender 716 in DTU–5, whereby all relays in receiver-sender 716 become released. Receiver-sender is now marked idle (via the "TB" lead, FIG. 1) to the subscriber line markers, and the two relays in the SOT circuit are leased to remove ground from the sleeve wire, thereby releasing all switches which have been used in establishing the connection and placing the calling line on lockout. This gives busy tone to the calling subscriber until he replaces his receiver.

If the called line had been on lockout, the marker 110 would have determined this fact by making a marginal test on the sleeve wire of the called line, and would have given the busy signal to receiver-sender 716 (except in case of wire chief test call) which would have been released as described in the case of a non-reverting busy line.

When ground is removed from the sleeve-wire of the calling line, the calling line is placed on lockout and receives busy tone through the line circuit until the calling subscriber replaces the receiver.

If the called line is found idle, marker 110 establishes connections from STT 179 over path 179A, an SLC crossbar switch, such as 179C, path 179E, and SLB switch such as 171, path 170, an SLA switch, such as 169, path 168, line circuit 158, path 157, over the one of the lines of the 500 line group 156 determined by the called directory number to station C. It will be observed that switches SLA and SLB are used for both originating and terminating calls.

When the SLC switch 179C is set, a signal from the vertical magnet off-normal contacts thereof signals the STT circuit 179. Thereupon the STT circuit 179 opens its loop to marker 110 via path 180, causing it to release. STT 179 also gives normal battery feed signals over the tip and ring to receiver-sender 716, which signals 716 that it is time to release.

Receiver-sender 716 places the logic 1 signal in bit positions 2 and 3 of its RT word in DTU–5, whereby RCU–1 learns that it is time for the sender to release. RCU–1 transmits SMR information comprising all 0's to the SMR word of 716 in DTU–5. All relays in 716 release, in turn making 716 idle, which releases the two relays in the SOT circuit 131, whereby the calling loop is extended to STT–179 over path 131A in SOT–131. All connections are held by ground placed on the sleeve by STT–179, the subscriber terminating trunk being under control of the calling line loop.

RCU–1 removes the logic 1 from the bit in memory of the 128 bits which is assigned to record the requests for service by 716. STT–179 then rings the called party station C over tip and ring and the calling Station A receives ring-back tone over tip and ring.

When the called party answers, the ring trip relay operates in STT–179 to connect the calling and called tip and ring to battery feed relays so that conversation can ensue.

The connection then comprises the the path from station A, path 102, line circuit 103, path 126, SLA 127, path 128, SLB 129, path 130, SOT 131, paths 135 and 201, group selector 202, path 178 of the five hundred line group 2 level from group selector 202, path 221, path 178, STT–179, path 179A, SLC 179C, path 179E, SLB 171, path 170, SLA 169, path 168, line circuits 158, path 157 to station C on a line of the five hundred group of lines designated 156.

The calling station A controls the holding of the connection. If the called party at station C releases first, his supervisory relay in STT–179 releases. When the calling subscriber hangs up, station A operates the loop from his substation into STT–179 which removes the ground from the test wire, releasing all equipment held.

LOCAL TO TRUNK CALL

Referring to FIG. 1, it will be assumed that the subscriber at Station A which is connected to one of the lines of the five hundred lines, designated 101, originates a call by lifting the receiver from his substation set to distant subscriber F (see FIG. 4) reached on an extended area basis over trunk group 1 comprising two-way trunks, and that the call becomes completed over trunk 1, designated 416, of group 1.

Up to a point, the description of such call would be essentially the same as that set forth previously for a local-to-local call. More specifically, marker 110 (or marker 111) connects station A over SLA and SLB crossbar switches, a subscriber originating trunk SOT, an SRL crossbar switch, and a slipped or graded multiple, to a register-sender such as 716.

RCU–1 (or RCU–2) in going through its program detects the logic 1 in the seizure bit associated with 716 in DTU–5. Thereupon RCU–1 (or RCU–3) via DTU–5, etc., and DTU–10 determines the SLM, SOT, and calling line identity which it stores in its memory, such as 1324; and passes the calling line identity via DTU–9 to data memory 800, which for purposes of explanation shall be assumed to be passed via paths 914, 822, control circuit 817, path 816 to data core memory 815. Thereupon RCU–1 proceeds with other steps.

When control circuit 817 is advised via path 816 that the answer is ready, control circuit 817 via paths 822A and 835C signals OR circuit 915X (which the other control circuits 821 ... 903 and 1908 also can signal) and the OR circuit 915X via paths 935A, 1309, and 1309A transmits an interrupt signal to processor control circuit 1322 of RCU–1. Thereupon RCU–1 looks at identity bits in DTU–9 (one for each control circuit) to determine which control circuit is signalling. Upon determining that circuit 817 is signalling, RCU–1 looks at RT words in DTU–9, and receives back the class marking of the calling line which it stores in the memory, such as 1324.

Upon receiving dial tone from receiver-sender 716, under control of RCU–1 (or RCU–2) via DTU–5, the subscriber at station A dials the digits of the directory number of station F comprising the three digit office code plus four digits defining the called line. (Under some circumstances, an access code and/or area code might proceed the office code).

Receiver-sender 716 pulses bit position 09 in an RT word in DTU–5 assigned thereto as the called number is dialed, whereby RCU–1 during successive scans every ten milliseconds or less detects the same and stores the digits received in memory 1324 in registers comprising pluralities of magnetic cores assigned to receiver-sender 716. As before described dial tone is removed after the first digit has been dialed.

After the three office code digits have been received and stored in memory, such as 1324, RCU–1 (or RCU–2) compares the same with the four three digit local office codes stored in memory 1324 and discovers that the called station is not associated with the local exchange.

Thereupon, RCU–1 (or RCU–2) passes an address on the basis thereof via its SMR word or words in DTU–9 to data memory 800 and receives back via its RT word or words in DTU–9, the translation thereof comprising group selector routing codes, the type of outpulsing (dial out pulsing at 20 pps., for example), digits to be outpulsed over the trunk, a dial stop code, if appropriate; digit delete information, if appropriate; a free service trunk class code, and any other information set forth hereinbefore required. This information is stored in the "register" groups of cores associated with receiver-sender 716 in memory 1324.

Thereupon, as before, RCU–1 places the logic 1 signal in bit positions 11 and 13 of the SMR word associated with receiver-sender 716 in DTU–5 enabling RS 716 to place solid ground on the lead via SRL 133 to SOT–131. The second relay in SOT–131 thereupon operates to forward the sleeve lead ground over path 135 to the group selector circuits 202 which extend the inlet over path 203 to the inlet identifier circuits 204. The inlet is thereby identified and a tip and ring connection is extended by circuits 204 over path 205 to the group selector marker circuits 206, which contain code receiver means.

The group selector marker circuits 206 place −24 volts as a "code start" signal on the tip lead from circuit 206 which extends back to the receiver-sender 716, which places the logic 1 signal in bit position 6 of its RT word in DTU–5 (whereby RCU–1 is notified that sending is in order) and stores this information in the RT word in memory 1324 associated with receiver-sender 716.

RCU–1 via DTU–5 causes receiver-sender 716 to code send two digits to the group selector first stage marker code receiver which switches the calling line through the first stage into the second stage. RCU–1 now receives another code start signal and via DTU–5 causes receiver-sender 716 to code send two additional digits to the group selector second stage marker code receiver means which enables the group selector marker (with the aid of the route relay circuits and route relay control circuits) to test for and select an idle trunk in trunk group 1.

Referring now to FIGS. 14—19, in making this test, trunk 416 will test idle because of 1600 ohm negative battery on the TB lead over the path from negative battery, 1600 ohm resistor 1430, contacts k of relay 1429 (abbreviated contacts 1429–k), contacts 1506–d to the TB lead. It is assumed that trunk 416 is selected.

Thereupon the group selector marker circuits 204 cause the group selector circuits 202 to close crossbar crosspoints extending a connection from SOT 131 via paths 135 and 201, group selector crosspoints over path 416A (trunk 1) of the two-way trunk group 1 level, path 221, and 416A to trunk 416.

Ground on the C lead extends from SOT 131 through 1428*a*, 1506*c*, R2 lead, designated 1507, to detector 1713, causing detector 1713 to place a signal over paths 1716, 1719, and 1719B to trunk encoder 1651.

At this point the operation of the supervisory control units, such as 625 in effecting control of the trunks is set forth.

OPERATION OF SUPERVISORY CONTROL UNIT

The supervisory control unit (SCU) is a common control unit used for the control of trunks in the NX–1E system. One SCU can control 512 trunks, but two SCUs are dedicated to 512 trunks for reliability purposes. SCU controls the trunks by scanning each trunk every 10 ms.; allotting a particular time slot for each trunk. In this time slot, the SCU will control the transfer of trunk hook state and relay status from the trunk to the SCU, perform work upon the information and transmit the changed or unchanged relay status to the trunk.

Figure 17:
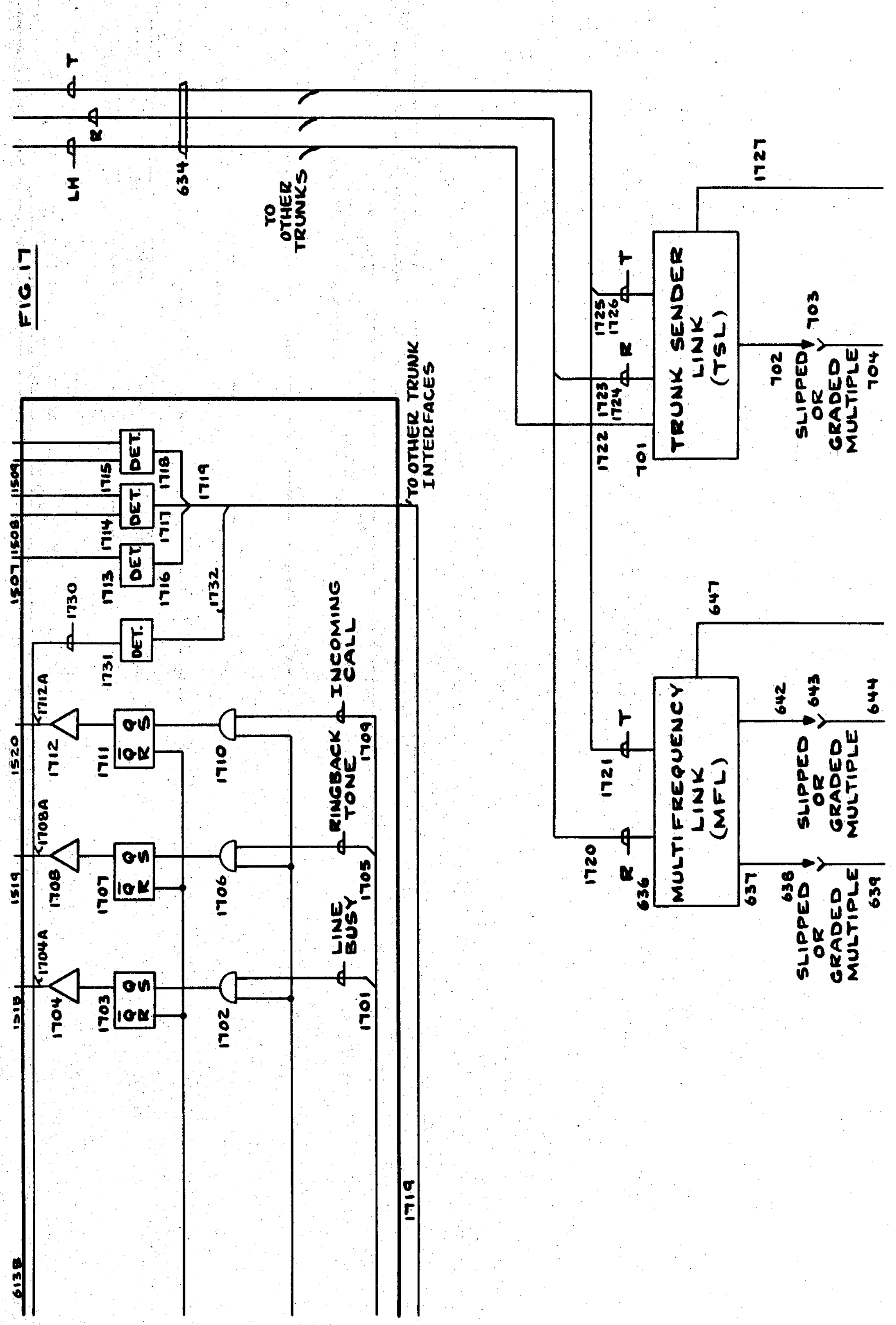

More specifically, with reference to FIG. 17, the detectors 1731, 1713, 1714, and 1715 in the trunk interface transfer the trunk status (hook state and relay status) to the SCU on command via path 1719. The control logic, by utilizing the trunk status, determines the sequence to be performed. A working register or a dial pulse receiver register may be used to complete the proper sequence. If so, the control logic will guide the sequencer, such as 1648, to either search for an idle register or find a particular one that was obtained previously. It does this by indicating to the sequencer to step through certain variations of the sequence. The sequencer, by following commands from the control logic, will have variations in its sequence.

After all the information is gathered relative to the trunk, a decision is made as to whether or not the relay status of the trunk should be changed. This status is changed when the relay status is subsequently transmitted to the trunk. In other words the supervisory control unit, such as 625, performs work on this trunk by bringing information in from the trunk and gathering all the necessary information into the control logic pertinent to this trunk. This consists of collecting the information from the working register, such as 1803, or the dial pulse receiver register, such as 1813, and/or inputting information from the RCU.

The control logic then transfers information to the trunk interface, such as 613, through the trunk function decoder 1601 making changes in the relay status, if necessary.

A brief description of the various blocks of the SCU is now set forth.

TRUNK ENCODER 1651

The trunk encoder 1651 is an interface between the detectors and the control logic 1808. It transfers and encodes the trunk status upon receiving a command from the control logic. The command consists of the trunk number used an an address and a start signal.

TRUNK FUNCTION DECODER 1601

The trunk function decoder 1601 is an interface between the control logic and the trunk relay latch circuits and drivers. The trunk encoder 1601 upon receiving a command from the control logic 1808, decodes and transfers the relay status to the trunk interface. The command consists of the trunk number used as an address and a start signal.

CONTROL LOGIC 1808

The control logic 1808 contains an input holding register, a trunk output data register, the logic required to determine the sequence to be followed during the trunk time slots and the logic required to change or leave unchanged the relay status.

SEQUENCER 1648

The sequencer 1648 comprises a five flip-flop counter capable of defining 32 states of which 27 are used to define timing states, plus control gates, controlled by logic 1808. The control gates force the counter to go through selected patterns of counting.

TRUNK COUNTER 1649

The trunk counter 1649 is a nine bit binary counter, advanced by the sequencer 1648. The trunk counter drives the trunk decoding selector 1650.

TRUNK DECODING SELECTOR 1650

The trunk decoding selector 1650 decodes the nine bits of the trunk counter 1649 to 512 outputs. It then outputs signals to the trunk encoder 1651 and trunk function decoder 1601.

REGISTER COUNTER 01 or 02 1801 or 1811

The register counters 1801, 1811 each consist of five bits. The counters are advanced by the sequencer 1648. The counter output signals to the address matrix, such as 1802 or 1812 respectively.

ADDRESS MATRIX 1802 or 1812

The address matrices 1802, 1812 decode the five bits from the register counters 1801, 1812 respectively to 32 outputs. The outputs are used to address the working register circuit 1803 or the dial pulse register circuit 1813 respectively.

WORKING REGISTERS 1803

The working registers consist of a series of four bit × four bit memory arrays arranged for 32 registers consisting of 21 bits each. The memory provides a non-destructive type of storage.

The working register 1803 is used for performing timing on release and connection sequences. The twenty-one bits for accommodating special features trunk operation, for example, consist of two timers of three bits each, five bits for sequence states, nine bits for trunk number, and one bit for parity. The 21 bits for accommodating central office trunks, for example, consist of a three bit timer, a four bit timer, three bits for sequence states, one bit for pulse indication, nine bits for trunk number, and one bit for parity.

DATA REGISTER 1804

The data register 1804 consists of 21 bits and will temporarily store the data from addressed working register.

DIAL PULSE RECEIVER REGISTERS 1813

The dial pulse receiver registers 1813 are of the same type as the working registers arranged for 32 registers of ten bits each. The registers 1813 are used for allotting a particular dial pulse receiver buffer bit to thus assign a particular word in the DTU for use by a particular trunk. They are used for incoming calls in impulsing mode only. The 10 bits consist of nine bits for trunk and one bit for parity as an option.

DATA REGISTER 1816

The data register 1816 consists of 10 bits and will temporarily store the data from an addressed dial pulse receiver register.

BUFFER INTERFACE 1818, 1821 & 1824

The buffer interfaces are located between the control logic and the DTU 633 and consists of three sections 1818, 1821, 1824 (two sections are outgoing and one section is incoming). One outgoing section (1818) will receive the trunk number, dial pulse receiver number and an interrupt signal which indicates to the RCU that dial pulses can be expected from the indicated trunk via the indicated dial pulse receiver. The other outgoing section (1824) is the dial pulse receiver section that consists of 32 bits which are in a 1 to 1 relationship with the dial pulse receiver of register circuit 1813. This interface contains the "hook state" of the various trunks. The incoming interface (1821) contains the trunk functions and associated trunk number. These functions are used to signal the SCU 625 as to the status of the incoming call during the receiving and sending portions of the call.

OBTAINING A WORKING REGISTER

When the information is brought in from the trunk interface 613 through the trunk encoder 1651 to the holding register in the control logic 1808, the control logic decides whether or not an idle working register 1803 is required. If so, the control logic informs the sequencer 1648 that it is necessary to find a working register. The sequencer then advances the register counter 1801 which in turn feeds the address matrix 1802

On the next time slot, the trunk number has already been stored in the working register 1803. The control logic 1808 will indicate to the sequencer 1648 to search the words in working register 1803. The sequencer will advance through the working register 1803 again in the same sequence as before outputting the contents of these words into the data register 1804. When the trunk number appears in the data register 1804, it will be compared with the trunk number that exists in the counter 1649. When this comparison is valid, the control logic 1808 uses the data associated with the trunk number that is now in the data register 1804 advising the control logic 1808 as to what work should actually be performed on the trunk.

For example, let us say that the SCU 625 is performing a 140 ms. time out on a trunk. The three bit counter in the selected word of working register 1803 which gives eight states would be used to count to 140 ms., advancing this counter every 20 ms., which means every second scan. The control logic 1808, after looking at the information in the selected word of register 1803 will indicate that the count is a particular value. When this information is rewritten, the timer will be advanced by one count via path 1807 and 1806. This continues on successive trunk scans until the information stored in 1803 indicates 140 ms. time out.

OBTAINING A DIAL PULSE RECEIVER REGISTER

The dial pulse receiver circuit 1813 contains words used as registers for dial pulses from incoming trunks. After information is transferred in through the trunk encoder 1651 to the holding resister (not shown) in the control logic 1808, the control logic will indicate to the sequencer 1648 that a dial pulse receiver register (i.e., a word in circuit 1813) is required. The dial pulse receiver circuit 1813 will be advanced by the sequencer 1648 (similar to the working register advance described) by advancing the register counter 1811 through the address matrix 1812 and addressing the dial pulse receiver registers 1813 (i.e., words in circuit 1813).

The information will be unloaded into the data register 1816, and if the trunk number was inserted before, the trunk number will be compared. If not, the trunk number will be written back into the dial pulse receiver 1813 for further storage. This indicates that the hook state at this time, will be transferred to the data transfer unit 633 from whence it will be sent to the RCU. This is used to receive dialing information. The SCU is simply a transfer unit which transfers the hook state from the trunk to the actual register in the RCU which will store the dial pulses.

Recapitulating, sequencer 1648 via path 1653, control logic 1808 and path 1654, steps trunk counter 1649 which causes trunk decoder selector 1650 via path 1655, control logic 1808 and path 1656 to activate trunk encoder 1651 and trunk function decoder 1611 to continually scan trunk interfaces as described.

When trunk encoder 1651 finds a signal in path 1719B associated with trunk 416, it switches all signals present at this time from detectors 1731, 1713, 1714, 1715 associated with trunk 416 via path 1656 to control logic 1808 where the signals are stored in a hold register, not shown. Such information includes the status of all flip-flops of the group 1607—1711 as brought in via paths 1608A—1712A, 1730 to detector 1731, thus placing the present status of the trunk relays in the hold register. Presence of this information in the hold register causes the control logic 1808 to signal the sequencer 1648 over path 1653. The sequencer over path 1653, control logic 1808, and advance path 1805 steps the register counter 01, designated 1801, which actuates the address matrix 1802 until an idle working register in 1803 is selected; whereupon the control logic 1808 transfers the trunk number to the selected working register 1803 and the status of the trunk determined by the hold registers into a twenty bit memory in the working register.

which addresses the working register circuit 1803. The working register circuit 1803 on command of the sequencer will output the contents word by word to the data register 1804. The word content over 1807 from the output of data register 1804 will indicate whether the working register word is idle. The sequencer 1648 will step through these registers 1804 until it finds an idle one.

When a register 1804 is found idle, the trunk number of the trunk being served will be written into an idle word of working register circuit 1803 on command from the sequencer 1648. On this command, the output of the trunk counter 1649 obtained via the control logic 1808 is input via path 1806 into the word selected in working register 1803.

Thereupon the control logic 1808 via paths 1652, the trunk function decoder 1601, and paths 1602 and 1648 pulses enable gate 1603 and master reset gate 1604, whereby all flip-flops 1607—1711 are reset. Immediately via paths 1619, 1605, and 1623, the control logic 1808 pulses gates 1620, 1606, and 1623 which sets flip-flop 1621, 1607, and 1625 which via drivers 1622, 1608, and 1626 operate the following relays: outgoing call relay 1429, hold relay 1418, and register connect relay 1437.

When a working register 1803 was seized, the control logic 1808 caused a timing period to begin guard against a premature disconnect of the sender caused by contact bounce, etc.

Relay 1429 at 1429*k* opens the TB lead and at contacts *j* and *h* switches the leads R10 via windings of the repeat coil to the trunk tip and ring preparatory to receiving signals from the trunk.

Relay 1418 at 1418*b* grounds the S-wire which holds the incoming switch train; relay 1437 at the contacts *b* and *f* transfers the originating tip and ring to the trunk, bypassing the repeat coil. When dial step is removed from the distant end, battery returned on the ring lead R signals the RCU-1 via RSO–716, to commence sending.

After sending is completed, RSO–716 releases, cutting the SOT–131 through, removing the ground from the C lead, thus removing ground from the R2 lead.

When SCU–1 in its normal scanning sequence observes the absence of ground on the R2 lead, by principles already described, the SCU–1 via trunk function decoder 1601 releases register connect relay 1437 which reinserts the repeat coil between the selector and outgoing trunk conductors T and R.

Also SCU–1 (625) while standing on this trunk, seizes a working register 1803 and begins a timing interval to make sure that the calling party is still in the connection.

The release of relay 1437 operates relay battery feed 1415, replacing ground on R2 lead, apprising SCU–1 that the calling party is still off-hook. At this time the SCU–1, as a result of scan, resets the working register 1803.

At the called end three conditions could arise: (a) called line busy; (b) congestion; (c) called line free. If condition (a) exists, slow busy tone (SBT) is returned to the called end. If condition (b) exists, fast busy tone (FBT), i.e., the congestion busy signal is returned to the called end. If condition (c) exists ringing tone is returned to the calling end via the trunk 416.

Assuming condition *c* exists, the called line is rung and when the called subscriber answers, a reversal of line potential takes place. The reversal is detected at R10 and the SCU outputs to operate answer supervision relay 1420. This reverses the polarity to the calling line. Conversation can now ensue.

RELEASE CONNECTION

If the calling subscriber releases first, such release is observed by detector 1714 which is picked up by the SCU. The SCU 625 outputs to release answer supervision relay 1420. SCU times a minimum of 140 milliseconds and then if the calling party has not gone back on hook, releases hold relay 1418. Relay 1418 in releasing removes ground from the sleeve wire to the group selector, releasing the switch train. SCU times for 610 milliseconds more and outputs to release outgoing call relay 1429. The trunk is now idle, with 1600 ohm battery on the TB lead.

If the called subscriber releases first, reversal of polarity is detected at R10 by SCU–1, and SCU–1 outputs to release 1420 and obtains a word in working register 1803 and initiates a 30 second timing. Three conditions can arise: (2) Called subscriber goes off hook; (2) Calling subscriber goes on hook; (3) Time out.

With condition (1) the reversal places ground on R10 lead again, and SCU will output to operate relay 1420 and reset the working register word. A state of conversation exists.

If condition (2) occurs, ground is removed from the R2 lead when relay 1415 releases. The SCU will time for 140 milliseconds and release hold relay 1418. It will further time for 610 milliseconds and then release outgoing call relay 1429. The circuit is idle.

If condition (3) occurs, after the 30 second time out, the SCU outputs to release 1418, times for a further 610 milliseconds and outputs to release 1429. The circuit is idle.

OPERATOR HOLD

When a call is connected outgoing to a manual office, the control is taken over by the manual office. When the calling subscriber clears, the missing loop will release relay 1415. Relay 1415 in releasing opens the loop to the manual office and lights a lamp giving the operator an indication of the release. Ground on the R2 lead is maintained via the 1424 strap and SCU assumes all is normal. When operator releases, this is detected at R10 and the SCU starts a release sequence.

TRUNK TO LOCAL CALL

Receiving

Referring generally to FIGS. 1—13 and more specifically to FIGS. 14—19, a trunk-to-local call is now described. Referring to the left side of FIG. 14, closure of the incoming loop via tip and ring conductors T and R is detected via the R11 leads by detector 1714 which signals over paths 1717, 1719, and 1719B to SCU–1 designated 625. SCU–1, in response thereto, via trunk function encoder 1601 and interface 613 outputs to operate incoming call relay 1505 and auxiliary incoming call relay 1506, no delay dial relay 1428 and, if strap 1427 is in for "delay dial" operation, answer supervision relay 1420 via rectifier 1426.

Relay 1420, at its make contacts *h* and *f* reverses the polarity of the incoming trunk, connecting ground through resistor 1419, contacts 1420-*h*, 1429-*i*, winding 1442 of the repeat coil, etc., to the ring conductor 1420 which is the dial stop signal to the distant sender. Negative battery through resistor 1421, contacts 1420-*f*, 1429-*g*, winding 1440 of the repeat coil, etc., will be found on the tip conductor 1401. (In case the trunk 416 is connected to a step office at the distant end, strap 1424 will not be connected and accordingly on relays 1505, 1506, and 1428 will be operated at this time, whereby the dial stop is omitted.)

Auxiliary incoming call relay 1506 prepares a circuit to the R2 lead, designated 1507, and at its contacts *a* and *b* holds open the tip and ring conductors which extend from the group selector. Additionally SCU–1 searches for an idle register in the dial pulse receiver circuit 1813 and, when one is found, inserts the number of the calling trunk 416 and makes the register busy.

SCU–1 also communicates with a routing control unit such as RCU–1, for example, via interrupt circuitry involving OR gate 633X and DTU–1, designated 633.

Before proceeding with the sequence, the relationships between trunks, SCU's, DTU's, RCU's, and interrupt circuits, such as OR circuits 633X and 633Y, are briefly described.

Figure 18:
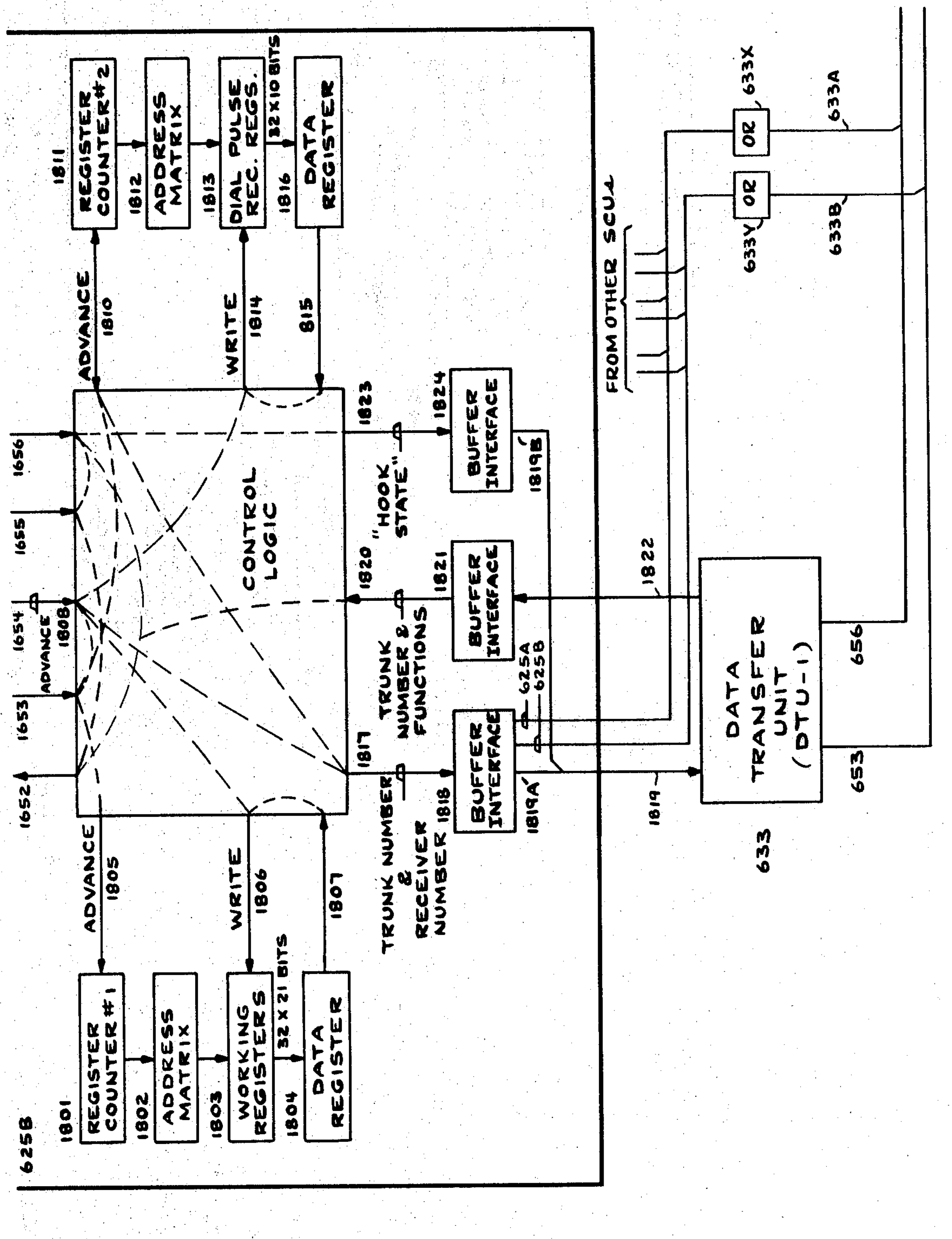
Figure 19:
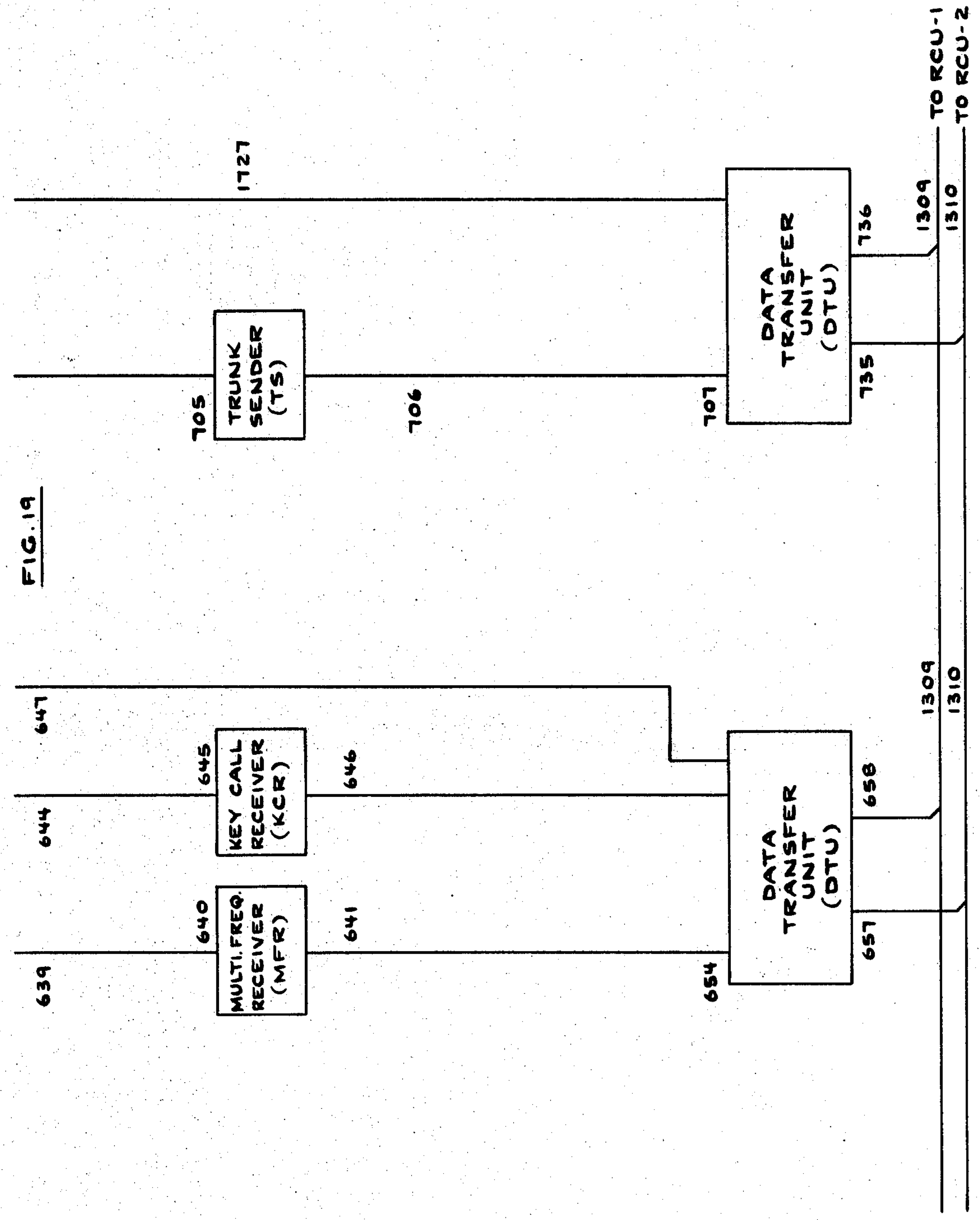

Referring to FIG. 6, it will be seen that conductors 625A, 626A, 627A, and 628A are extended from SCU–1, SCU–2, SCU–3, and SCU–4 respectively, over path 633C to OR circuit 633X, whereby a logic 1 signal over any one of these conductors causes OR circuit 633X to output the logic 1 signal as an interrupt signal over single conductor 633A, and paths 1309 and 1309A to processor control unit (PCU) designated 1322 of RCU–1. PCU–1322 places this interrupt at the correct location in its system supervisory program so that action can be taken at the proper real time so as to not lose information, and also so as to coordinate with the rest of the RCU–1 program. It will be seen also that paths 625B, 626B, 627B, and 628B extend from SCU–1, SCU–2, SCU–3, and SCU–4 respectively, over path 633D to OR circuit 633Y whereby a logic 1 signal over any one of these conductors causes OR circuit 633Y to output the logic 1 signal as an interrupt signal over signal conductor 633B, and paths 1310 and 1310A to processor control unit (PCU) designated 1330 of RCU–2, PCU–1330 handles this interrupt signal with respect to the RCU–2 system supervisory program in a similar manner. Referring to FIG. 18, it can be seen that the signal on conductor 625A or 625B originates in the buffer interface 1818 of SCU–1.

Furthermore, the data transfer unit DTU–1 designated 633 (see FIGS. 6, 18 and 21), for example, contains four RT bit positions for signalling purposes to indicate that the supervisory control unit, such as SCU–1, SCU–2, SCU–3, or SCU–4, is calling for service to the associated RCU–1 or RCU–2. These four RT bit positions are designated SCU–1 calling bit position 01, SCU–2 calling bit position 02, SCU–3 calling bit position 03, and SCU–4 calling bit position 04.

Besides these calling bits DTU–1 (633) contains a plurality of RT words and a plurality of SMR words for each of the associated SCU's 1–4.

Within memory 1324 of RCU–1, which normally, as programmed, handles SCU–1 and SCU–2 (but which can be programmed to also handle SCU–3 and SCU–4) are 32 "registers" each composed of a plurality of magnetic cores, the same as any other cores of the memory but assigned for register duty, for temporarily storing the identity of the trunk using the "register," the status of the trunk, and digits received from the trunk. Memory 1332 of RCU–2 which normally handles SCU–3 and SCU–4, but which can also handle SCU–1 and SCU–2 has 32 similar "registers." The number of these registers for use in handling trunk calls is determined by traffic and redundancy considerations.

Thus, the condition of each trunk is constantly reflected in its associated interface, and a supervisory control unit, such as SCU–1, constantly scans the associated trunk interface at least once every 10 milliseconds and stops thereat to observe the condition thereof and places the address of the trunk and its condition in the RT word space of the DTU, such as DTU–1, assigned to the SCU, such as SCU–1. If the trunk is calling for service from the routing control unit, the SCU besides extending the logic 1 interrupt signal to the associated OR circuit, such as 633X, also places the logic 1 signal in the SCU calling bit position in the DTU circuit 633.

Thus a single interrupt conductor common to four SCU's can be run to a routing control unit, whereby the RCU gets a general SCU interrupt. The RCU then determines, by observing which particular SCU calling bit position in the DTU 633 contains the logic 1 signal, which SCU is calling.

Returning from the digression, as a result of the trunk number having been placed in the register in the dial pulse receiver circuit 1813, SCU–1, via the buffer interface 1818, sends the interrupt signal via OR circuit 633 to RCU–1, places the logic 1 signal in the SCU–1 calling bit in DTU–1, and places the number of trunk 416 and the number of the dial pulse receiver register assigned to the trunk call (in 1813) in the RT word space of SCU–1 in DTU–1.

RCU–1 having received the interrupt signal, at the proper time in the system supervisory program, determines which SCU is calling, assigns an idle "register" composed of a group of memory cores to the call, enters in this register the identity of the calling trunk using the register and the status of the trunk, and signals the trunk number and function to be performed over paths 1309 and 656 via an SMR word assigned to SCU–1 which via path 1822, buffer interface 1821, path 1820, to control logic 1808, which via path 1652, and the trunk function decoder 1601 and path 1651A and interface 613, operates the register connect relay 1437.

RCU–1 uses the trunk number to address date memory 800 via DTU–9 and receives the trunk class markings which indicate to the RCU the number of digits to expect to receive; the type of call which is incoming, such as free service call, toll call or toll-ticketing call (a free service call is assumed for exemplary purposes); the type of incoming signalling, such as dial pulse, battery and ground, or multifrequency (dial pulse is assumed for exemplary purposes).

Relay 1437 at contacts *a* and *e* holds open the tip and ring conductors to the group selector, and at contact *h* grounds the *c* lead to the group selector.

When the SCU–625 receives a reset delay dial signal from the RCU via DTU–633, the SCU–625 outputs to release relay 1420. This reverses the line polarity and removes the dial stop allowing the distant sender to commence sending. The incoming dial pulses are received by the electronic detector via RII.

The incoming dial pulses are received over paths RII by the electronic detector 1714 and, via the path described heretofore and trunk encoder 1651, are passed into the logic of the SCU–625.

When the incoming trunk call was detected, a dial pulse receiver register in 1813 was obtained by means of the control logic 1808 advancing register counter 1811 to drive the address matrix 1812 which caused the dial pulse receiver registers of circuit 1813 to successively empty into the data register circuit 1816 which in turn emptied into the control logic until an idle receiver register was found.

When an idle receiver was found, the trunk number for which it is planned to store the hook states, is stored in the selected dial pulse receiver register. This word is stored therein whereby on each successive scan the registers are searched to find this trunk number in a particular register, the identification of this register will direct the placing of the incoming "hook-state" information via the buffer interface 1824 into the assigned word in DTU–633, whereby this information reaches RCU–1 (or RCU–2).

There are 32 bits in the buffer interface, each bit having a 1 to 1 correlation with the dial pulse receiver registers of circuit 1813. These also have a 1 to 1 correlation with the RCU memory so that 32 actual registers in the RCU memory will count the dial pulses and store the digits. These dial pulses are counted by monitoring the hook state of the trunk via the receiver bit which is transferred from the trunk to the buffer interface by the SCU.

The RCU, after receiving all of these digits, will, on the basis of the received digits, address the number group area in data memory. This will provide the RCU with group selector codes, class and ring codes, and line codes, which will be needed to terminate the call locally.

The RCU also effects the connection of a sender to the trunk by operating the trunk sender link (TSL). The SCU 625 having detected a sender ready signal from the RCU outputs via DTU to operate hold relay 1418.

Relay 1418 at its contact *b* grounds the *s* lead to effect seizure of a group selector marker, The trunk is now ready for sending. At this time the RCU will also inform the SCU as to whether the call is to be terminated locally or tandem. (If the call were tandem, the SCU will output to operate relay trunk call 1443). The RCU will then send via the sender, through the trunk, to the group selector marker, the STT, and the subscriber's terminating line marker.

Backtracking, after the RCU indicates to the SCU to engage a group selector marker, the RCU receives via the trunk and sender, a code start signal from the group selector. This indicates to the RCU that the group selector marker is connected. The RCU then sends via the sender to the group selector marker two digits comprising the terminating five hundred line group code.

The RCU will then receive a code start signal from the STT and will send the class and party digits. Thereafter the RCU will receive a code start signal from the SLM and will send the hundreds, tens and units digits which will designate the equipment location of the called line.

Thereupon RCU-1 effects sending as described. At the end of sending, the SCU receives from the RCU a sender disconnect signal and on receiving this signal the SCU outputs to release relay 1437.

The call is now in a ringing mode. However, if the called line was found busy or congestion had been encountered, SBT or FBT would be returned to the calling line.

CALLED SUBSCRIBER ANSWERS

Assuming the line is free and the called subscriber answers and the call is terminated locally, the terminating loop on T and R will operate relay 1415. Relay 1415 in operating will apply a ground on R2 lead.

The SCU 625 will detect the ground on the R2 lead and output to operate relay 1420. Relay 1420 will reverse the polarity to both ends of the repeat coil. Such reversal is an answer supervision to the originating end.

Conversation can now begin.

RELEASE

Assuming the calling subscriber clears first, the opening of the calling loop is detected at RII. The SCU will time for about 140 milliseconds and release relays 1418, 1420, and 1437. SCU then times for a further 610 milliseconds and releases relay 1505.

If the called subscriber clears first, the opening of the called loop will release relay 1415. Relay 1415 in releasing will remove the ground from the R2 lead at contact *f* and the SCU will start a 30 second time out.

Three conditions can now arise: (a) Calling subscriber goes on hook; (b) Called subscriber goes off hook; (c) Time out. If condition (a) occurs, the SCU will detect the opening of the calling loop at RII, and will time for 140 milliseconds and release relays 1418 and 1420. If condition (b) occurs, the ground on R2 lead will be reapplied by relay 1415 and conversation can ensue. If condition (c) occurs, SCU outputs to operate relays line busy (1501) and origin hook state relay (1449) and releases relays 1418, and 1420. Relay 1501 returns SBT to the calling line. With the release of 1420, the originating trunk gets a reversal and should start to clear down sequence. However, the trunk is held until the calling subscriber clears or is put on lockout. When this occurs, SCU times for 610 milliseconds and outputs to release relays 1505 and 1501. The trunk is now idle.

JOINT HOLD

In the case where trunk to trunk call is tandem and terminates in a manual board, the joint hold function will be provided by the SCU. To give the operator an indication of the originating clear when this happens, the missing loop will be detected at RII and the SCU will output to release relays 1418, 1420, and 1449. Relay 1449 will open the loop to the terminating end.

TRUNK TO TRUNK CALL

The seizure sequence and the receiving sequence are the same as that of trunk to local call. In sending, SCU, having detected a sender, outputs to operate relay 1418. Relay 1418 grounds the S lead at contact *f* and by so doing seizes a group selector. At this time RCU will inform SCU that the call will be tandem terminated. SCU then outputs to operate trunk call relay (1443).

When the called subscriber answers, ground is returned on the C lead which through the contact *e* of relay 1443 is applied to the lower winding od relay 1415. Relay 1415 operates and at contact *f* grounds the R2 lead. Thereafter the description is similar to that for a local-to-trunk call except that release may be somewhat different.

CALL WAITING VIA SPECIAL FEATURES TRUNK

Figures 33, 34:
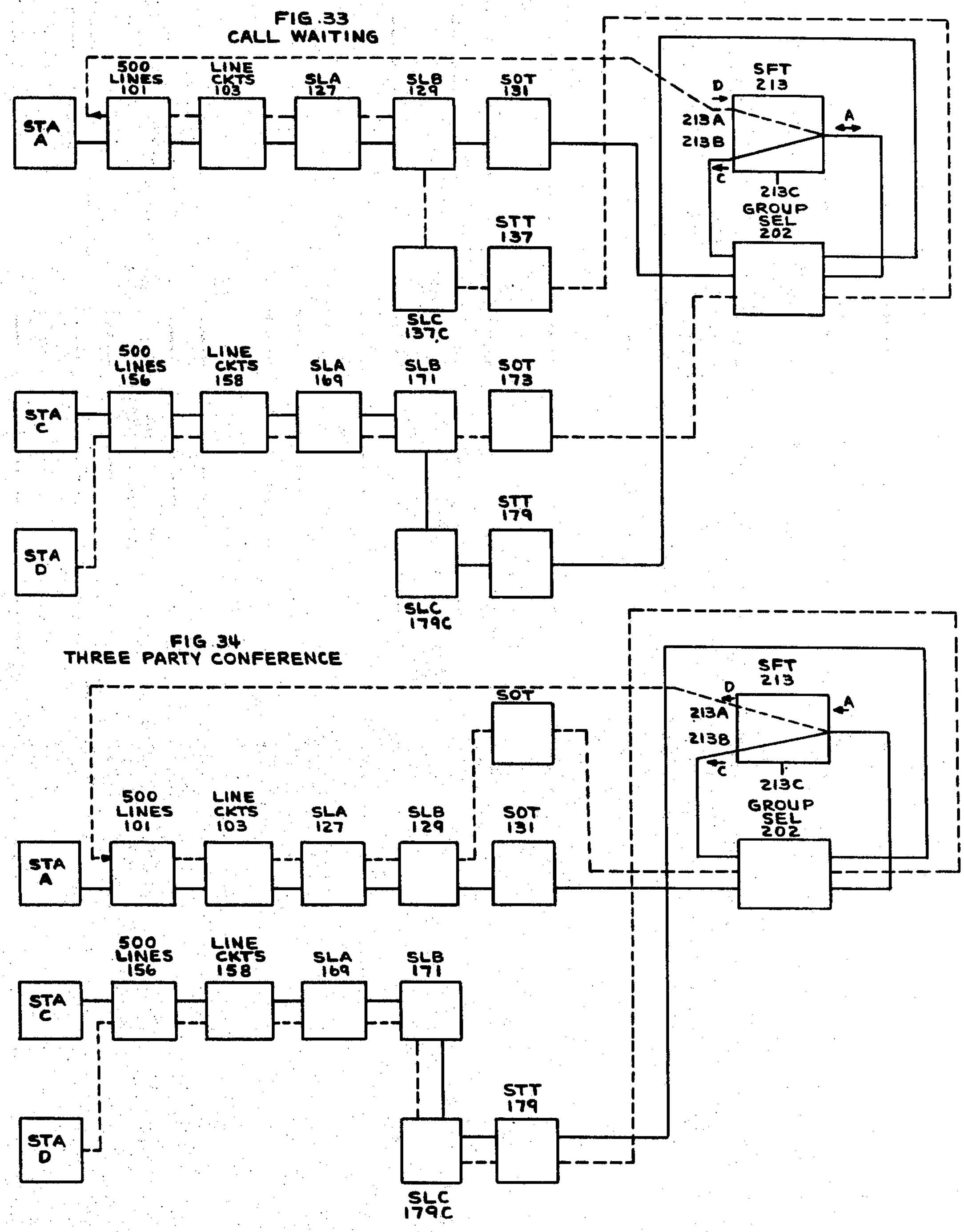
FIG. 33 is a block diagram illustrating the call waiting feature.
FIG. 34 is a block diagram illustrating the three party conference feature.

The block outline in FIG. 33 is based upon the system block diagram of FIGS. 1—13 and is included for the purpose of illustrating the call waiting feature.

Call waiting in a special feature which allows a subscriber at station A who is talking to station C to be informed that someone else at station D is trying to reach him and also allows A to use his hookswitch to transfer to D while placing C on hold. The party at station A can alternate between C and D by single hookflashes.

Let us suppose that subscriber A in a five hundred line group, such as 101, has provision for call waiting service as a result of appropriate class marking of his line. Also let us assume that subscriber A is trying to call station C in a five hundred line group such as 156 which may or may not be class marked for waiting service. We shall assume that station C is so class-marked.

As station A goes off hook, the subscriber line via intervening equipment communicates with RCU-1, such as 1303 (described in the local-to-local call). The RCU-1 becomes aware that station A has call waiting privilege by getting the class marking information from data memory 800 via DTU-9. Station A then gets dial tone and dials the directory number of station C. The dialed digits via DTU-5 are stored in a "register" in the temporary memory portion of memory 1324 in RCU-1.

After the called directory number has been stored in memory 1324, RCU-1 sends an address corresponding to the called number to the data memory 800 via DTU-9, and receives back and stores in memory 1324 a "number group" translation which includes the class identification of the called party.

As all special features trunks are wrap around trunks, they are reached from the first stage of group selector 202, i.e., RCU-1 sends only two digits via DTU-5, for example, and receiver-sender 716 to the group selector marker circuits.

After receiving the two digit code, the group selector selects an idle special features trunk, such as 213 in a group which has a maximum of 124 such trunks associated with the RCU pair comprising RCU-1 and RCU-2. An automatic trunk identification for the purpose of identifying the particular trunk which has been selected (similar to the automatic line identification) is performed by an SCU, such as 628, via interface, such as 616, path 612, path 608, path 606A, and path 213C. The information that A is talking to C over a selected trunk is stored in the SFT memory and data memory 800. Since the special features trunk used for call waiting is a wrap around trunk, the outlet, such as 213B, goes through the group selector which routes it to a STT, such as 179, in the five hundred line group of subscriber C over path 221 and path 178. Station C then is connected via a SLC, such as 179C, a SLB, such as 171, a SLA, such as 169, path 168, and path 157. When C goes off hook, the conversation can ensue. The switch train is held jointly by the STT and by the special features trunk.

If neither A nor C has gone on hook and subscriber D in a five hundred line group, such as 156, tries to call A, as D dials the directory number of A, data memory 800 is aware of the following facts: (1) A and C have call waiting provisions; (2) A is calling to C; and (3) The particular SFT which is involved in the conversation.

RCU-1 or RCU-2 outpulses the routing digits to the group selector code receiver which routes the switch train originating in the five hundred line group 156 (over path 157, line circuit 158, SLA 169, SLB 171, SOT, such as 173, path 181, path 182, path 201) to path 221, path 178, STT, such as 137, path 137A, SLC, such as 137C, path 137E, SLB 129, path 128, SLA 127, path 126, path 102, path 213A to SFT 213.

At this time subscriber A is rung for one second and subscriber D gets ring-back tone. More specifically, the RCU knows which subscriber is to receive the incoming call waiting signal. The ground on the incoming S lead will operate a relay in SFT which gives a signal to SCU. SCU, such as SCU–4, detects this signal and via the path 624, interface 616, path 612, and path 213C operates relay means which complete the circuit for injection of a call waiting signal to subscriber A. This signal is applied for one second after which SCU–4 again outputs to release the above-mentioned relay means and subscriber A can resume his conversation with subscriber C.

If subscriber A who was talking to C at this time chooses to ignore this ring, he is rung again after nine seconds. In the meantime D keeps getting the ring back tone. If now A hook-flashes, the resultant signal is detected of AFT 213, and by the operation of certain relays in SFT, A is connected to D. A can now converse with D and has the choice of hook flashing again and talking to C.

On the other hand if A also ignores the second waring signal, then it is left to the discretion of subscriber D to clear.

If station A should go on hook, his number as well as the number of C, is erased from the SFT memory located in data memory 800.

It should be noted that while A is talking to D and C is kept on hold, a fourth subscriber calling C would get a busy tone, i.e., at this time C cannot make use of call waiting though he has subscribed for it. Also, since the information about SFTS s is stored in data memory with which all RCUS can communicate, there is no restriction on location of A, C and D.

THREE-PARTY CONFERENCE VIA SPECIAL FEATURES TRUNK

Referring to FIG. 34 and FIGS. 1—13, a description follows of the three-party conference feature via the special features trunk.

Three-party conference is a special feature which allows a subscriber at station A who is talking to a subscriber at station C to dial another subscriber D so that all three of them can take part in the ensuing conversation.

Let us suppose that station A in a line group, such as 101, is class marked for three-party conference. Also let us assume that the party at station A calls a subscriber at station C in a five hundred line group such as 156.

As substation A goes off-hook, the subscriber line attains communication with RCU–1, such as 1303 (described in local-to-local call). RCU–1 becomes aware that station A has three-party conference privilege by getting the class marking information from data memory 800 via DTU–9. Station A then gets dial tone and dials the directory number of station C. The dialed digits are stored in a "register" in temporary memory portion of memory 1324 in RCU–1.

After the called directory number has been stored in memory 1324, RCU–1 sends an address corresponding to the called number to the data memory 800 via DTU–9 and receives back and stores in memory 1324 a "number group" translation which includes the class identification of the called party.

After receiving the two digit code signals from RCU–1, the group selector selects an idle special features trunk, such as 213, of a maximum of 124 such trunks in the control group comprising a pair of RCUS. An automatic trunk identification (similar to automatic line identification) is performed by SCU, such as 628, via interface, such as 616, path 612, path 608, path 606A and path 213C. The information that A is talking to C over a selected trunk is stored in the SFT memory in data memory 800. Since three-party conference uses an SFT (which are wraparound trunks) the outlet, such as 213B goes through the group selector which routes it to an STT, such as STT–179 over path 221 and path 178. C then gets a ring signal from STT–179 via SLC, such as 179C, SLB, such as 171, SLA, such as 169, path 168, and path 157. When C, in answering, goes off hook, conversation can ensue. The switch train is held jointly by the STT and by the special features trunk.

Now suppose that neither A nor C has gone on hook and A desires to bring another subscriber D in a five hundred line group, such as 156, into the conversation.

Subscriber A hook flashes and this signal is detected at SFT 213. By the operation of relay means in 213, the inlet to 213 gets connected to an outlet 213A, which is one of the incoming lines of the fine hundred lines 101, whereby a call is entered via line circuits 103. A new receiver-sender is seized and subscriber A gets dial tone over the path involving the connected SOT, SLB 129, SLA 127, etc., path 213A, special features trunk 213, group selector 202, SOT 131, SLB 129, SLA–127, etc. to station A.

Subscriber A then dials the SLC number of D and the digits are stored in the temporary memory such as 1324 of RCU–1 (or RCU–2). After getting the routing information from RCU–1 (or RCU–2) via DTU means, the group selector selects an idle STT, such as 179, in the five hundred line group of subscriber D. A subscriber line marker establishing a path from STT 179 via SLC 179C, for example, SLB 171, SLC 169, etc., to station D and D is rung over this path. When D goes off-hook in answering, he can talk to A over the path (solid line) from station A, SLA 127, SLB 129, SOT 131, group selector 202, SFT 213, path 213A (dotted line) etc., SLA 127, SLB 129, SOT, group selector 202, STT 179, SLC 179C, SLB 171, SLA 169, etc., station D. At this time C is kept on hold. If A hook-flashes again, all three parties get connected and the conference can take place.

If A goes on hook, C can still continue talking to D until one of them goes on hook also. However, since only A had provision for three-party conference A is the only one who can originate such a conference. Even if C also had this provision, and after A has gone on-hook, he cannot at this time dial another party E and originate a three-party conference between C, D, and E.

Also, since the information related to all SFTs is stored in data memory 800 with which all RCUs can communicate, there is no restriction on location of A, C, D and E.

ABBREVIATED DIALING

There are two objectives in providing abbreviated dialing service: (i) Reduced number of memorized digits; (ii) Speed up of call handling.

Let us suppose that subscriber at station A in a five hundred line group, such as 101, has provision for abbreviated dialing. Let us further assume that he wants to dial a two digit abbreviated code instead of the seven digit number of subscriber at station D in a five hundred line group, such as 156.

As A goes off-hook a dial tone is provided from receiver-sender, such as 716. Assuming that station A is properly class-marked, the subscriber at station A then dials a "modify abbreviated number" access code. This access code is recognized by RCU–1 (or RCU–2) and A is given another dial tone via RSO–716. A then dials a two digit abbreviated number after which he gets a five hundred ms. burst of dial tone. He then dials the complete ten digit number (including the area code) of the subscriber at station D.

The dialed digits are received by the instruction and temporary memory, such as 1324, of RCU–1 and along with their abbreviated code are stored in the data memory, such as 800.

At a subsequent time if A wants to call D he will just have to dial the two digit abbreviated code for D. The RCU will get the complete number of subscriber D from the data memory 800 and the call will proceed as usual.

If at a later date D wants to erase the directory number of subscriber D of that particular two digit code, he dials the "-modify abbreviated number" access code, dials the abbreviated number and, when he gets the five hundred millisecond dial tone burst, he hangs up. If, however, he wants to substitute another subscriber E in place of D, he should dial the ten digit number of subscriber E after receiving the five hundred millisecond dial tone.

Figure 26A:
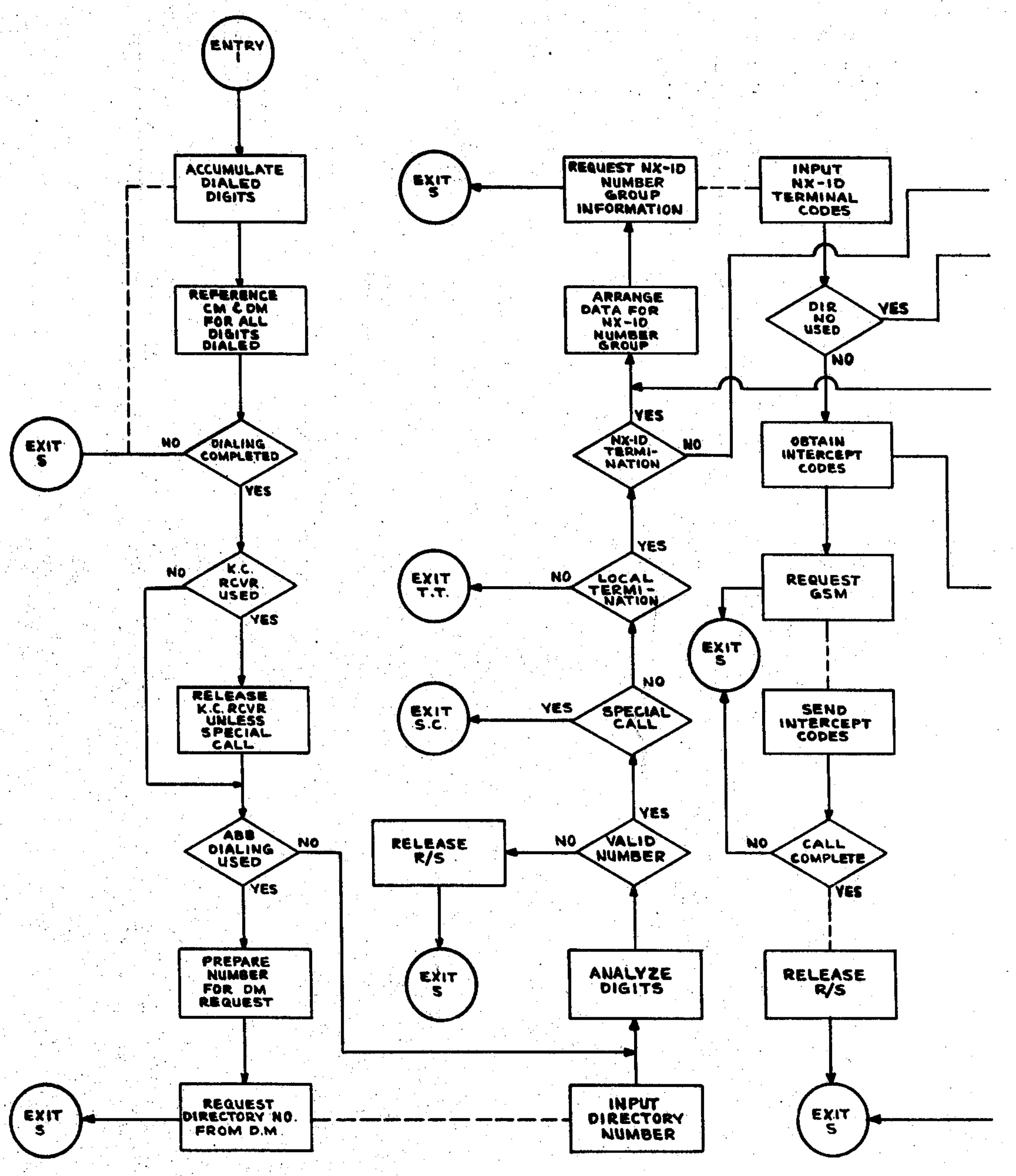
Figure 26B:
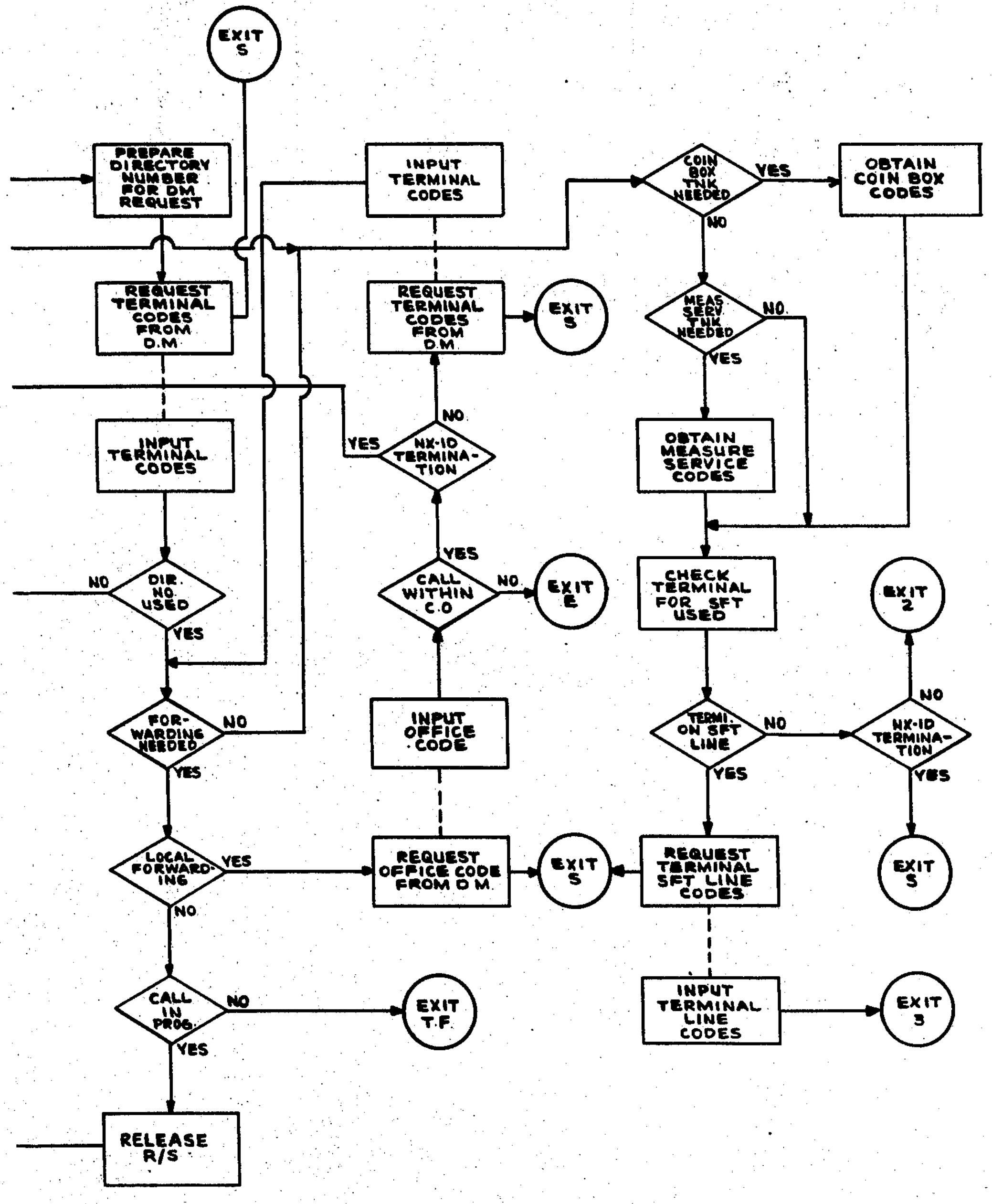
Figure 27A:
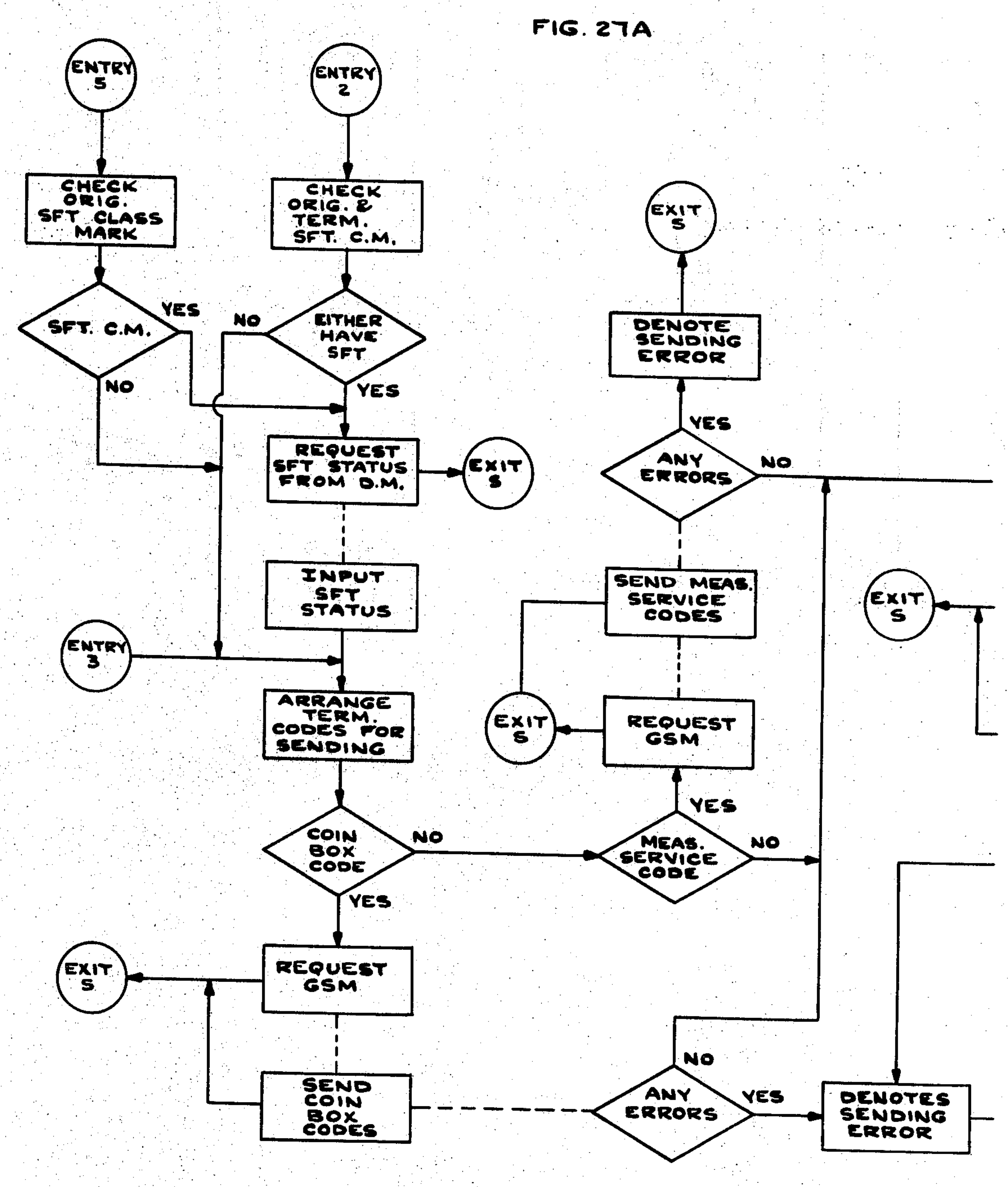
Figure 27B:
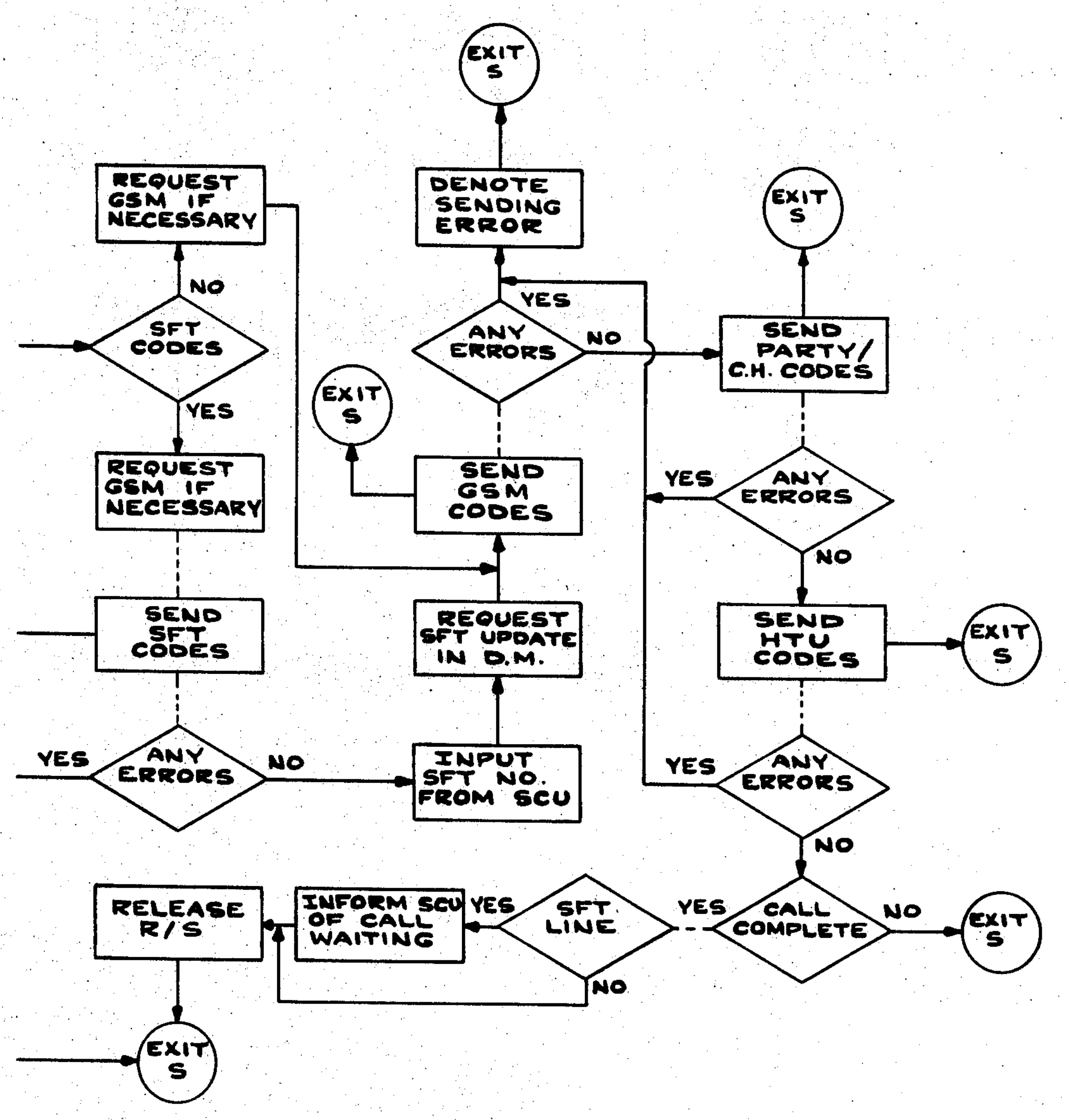
Figure 28A:
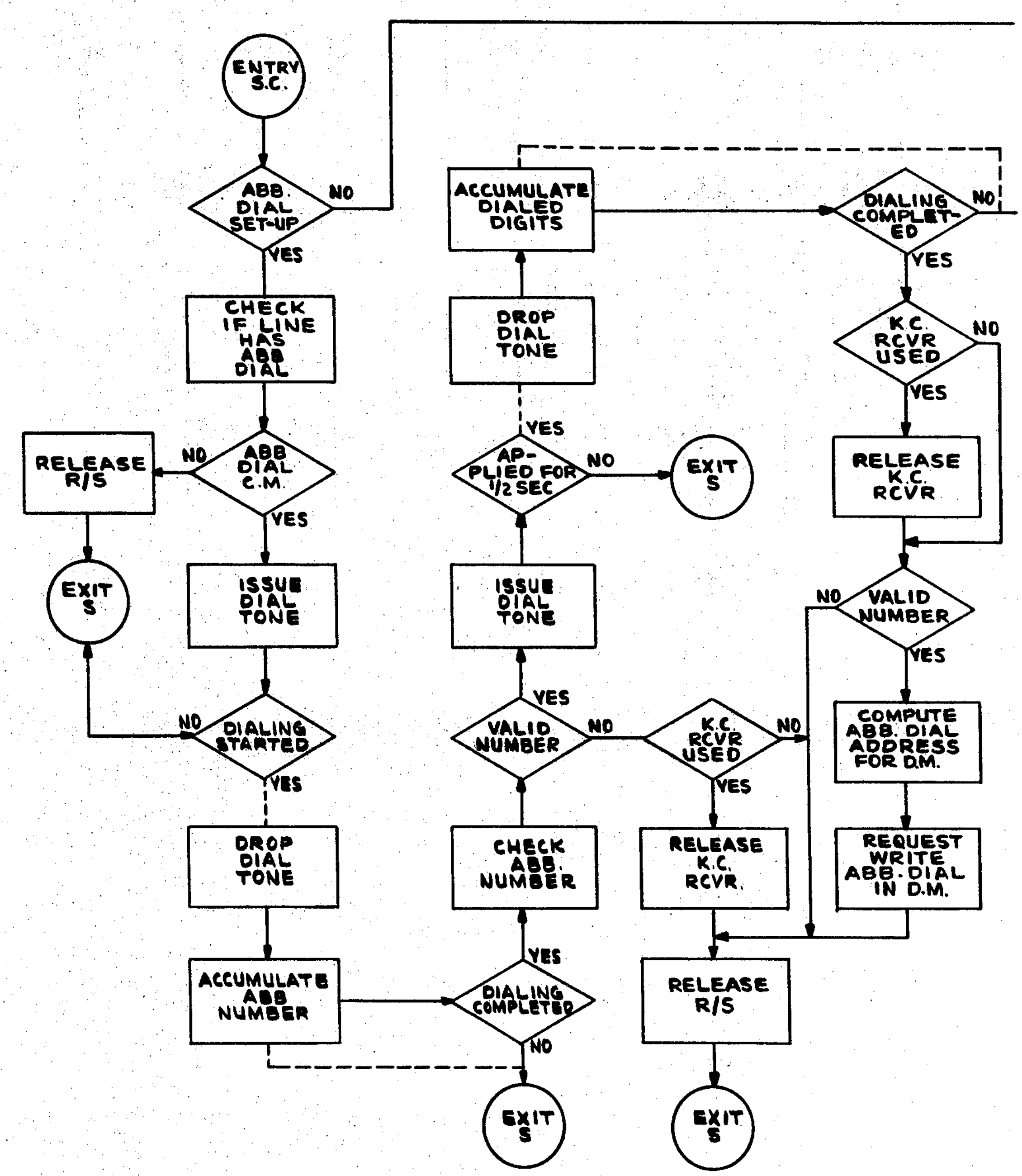
FIGS. 28A and 28B comprise a flow chart illustrating abbreviated dialing.
Figure 28B:
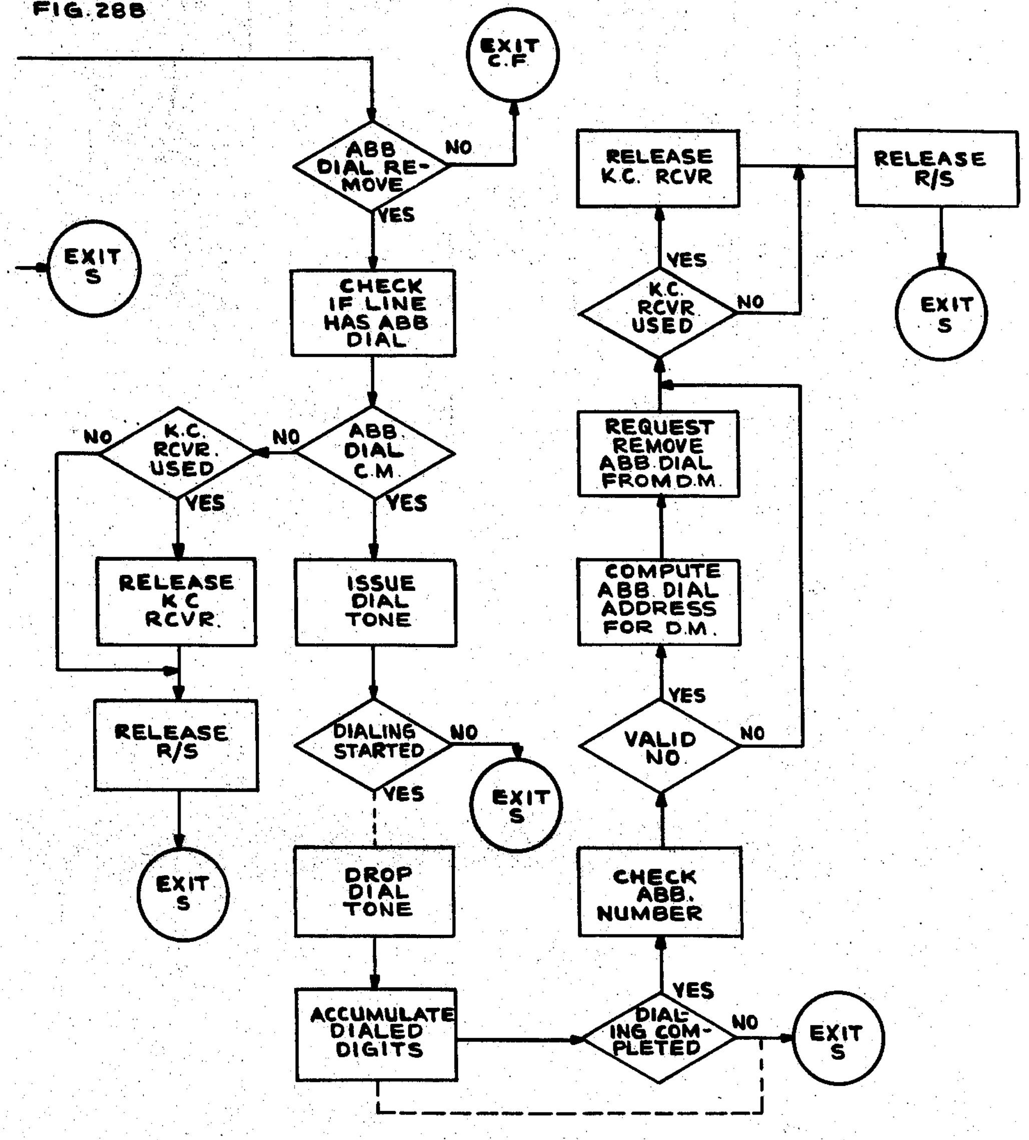

The fact that any particular subscriber with an abbreviated dialing provision has completed dialing is verified by a five second time-out after receipt of the second digit by the RSO, such as 716. FIG. 26A sets forth detailed sequence of the abbreviated dialing setup.

CALL FORWARDING

Call forwarding is a special feature which allows a subscriber to have his calls transferred to any number when he so wishes. He can activate or deactivate a given transfer at any time by dialing certain codes.

Assuming that a subscriber at station A in a five hundred line group, such as 101, has call forwarding provision, and that A wants his calls to be forwarded to a subscriber at station B in a five hundred line group, such as 101, A goes off-hook and gets a dial tone from the register sender, such as 716. A is class-marked for call forwarding. He then dials a call forwarding access code 91 for example. Dial tone is returned from RSO 716 and the subscriber at station A dials the complete number of the subscriber at station B.

Assuming further that A is being called by a subscriber D in a five hundred line group, such as 156, the call proceeds as usual until the class marking information of the called party is obtained from data memory 800. A this stage the RCU, through data memory 800, knows whether the call is to be routed to A or to a different directory number initiated by A, such as the directory number of B. If the call has to go to A, it proceeds in the normal manner. However if the call is to be routed to a different number, as in the above case, the calling subscriber D gets a short tone burst from a SOT, such as 173. This notifies D that the call is being routed to a different number so that he can hang up if he so desires.

If D remains off-hook, the call is forwarded to B. However, if B was located in a distant line group (i.e., if it was a toll call), subscriber A is billed for the call.

Figure 29A:
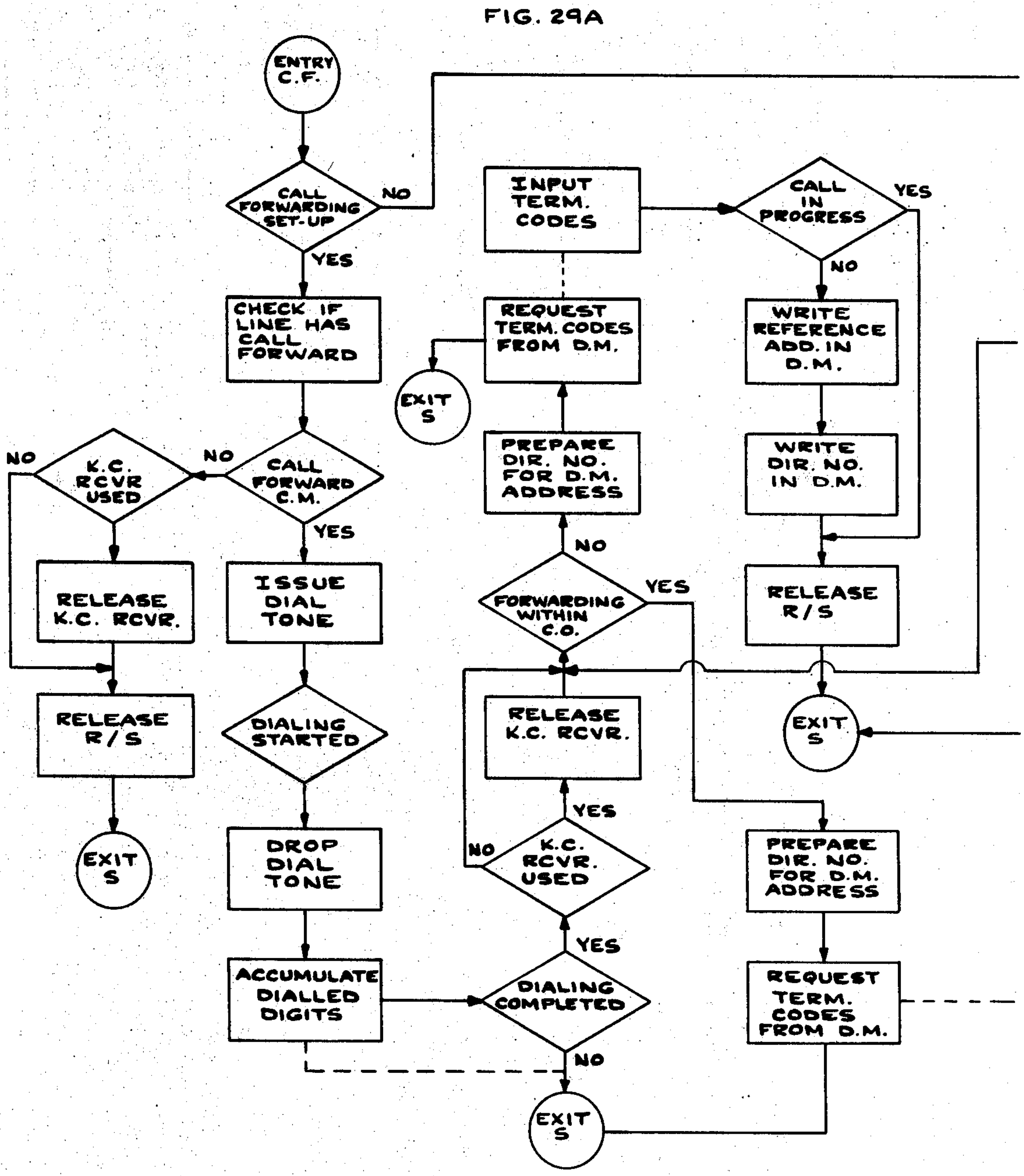
FIGS. 29A and 29B comprise a flow chart illustrating call forwarding.
Figure 29B:
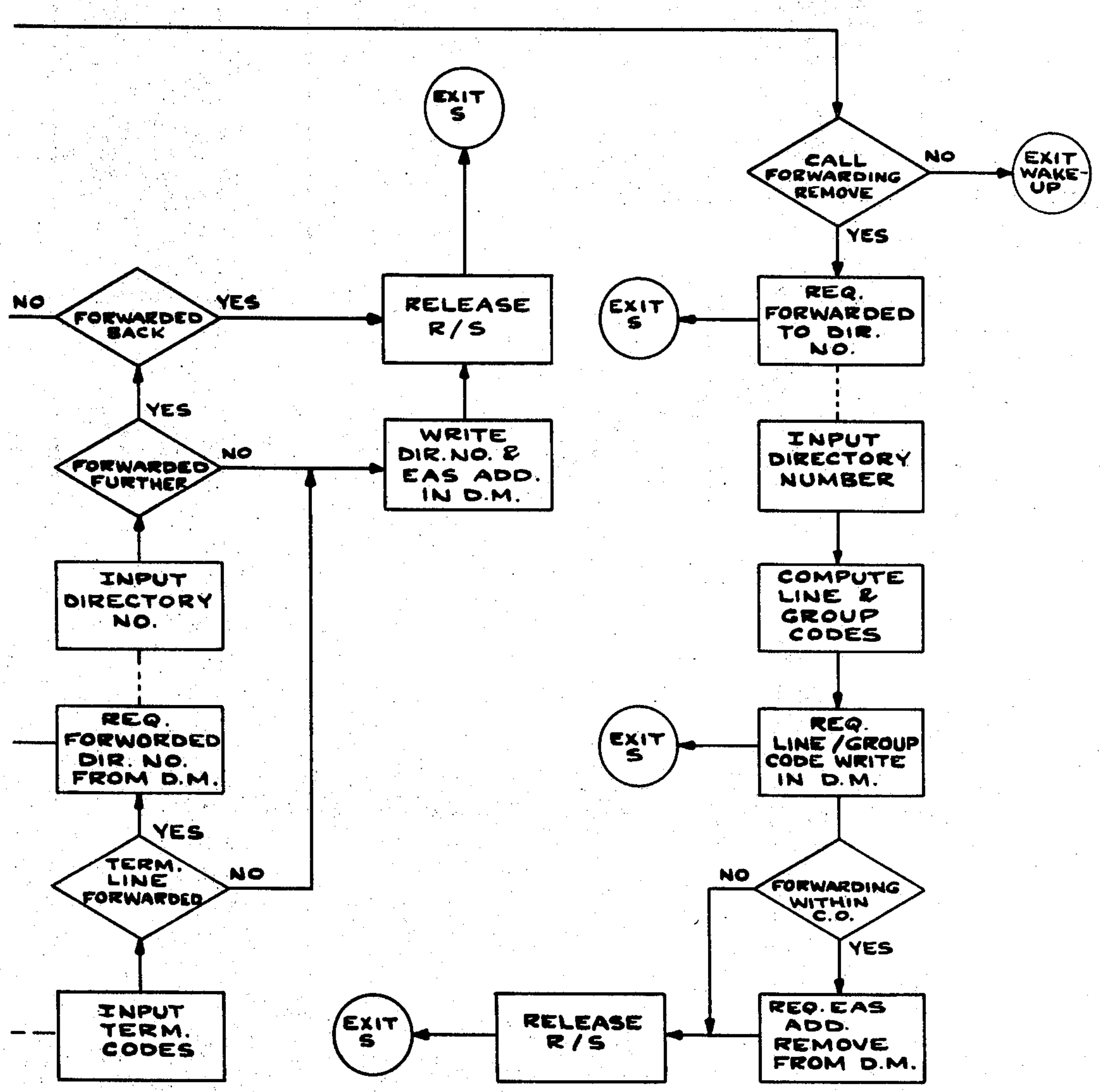

Subscriber A can forward his calls to a different number by dialing an access code, as for example, 91 and then the complete new number. Also A can cancel call forwarding by dialing another access code, as for example 92. A detailed sequence of call forwarding setup is shown in FIG. 29A.

PAD SWITCHING

Figure 14:
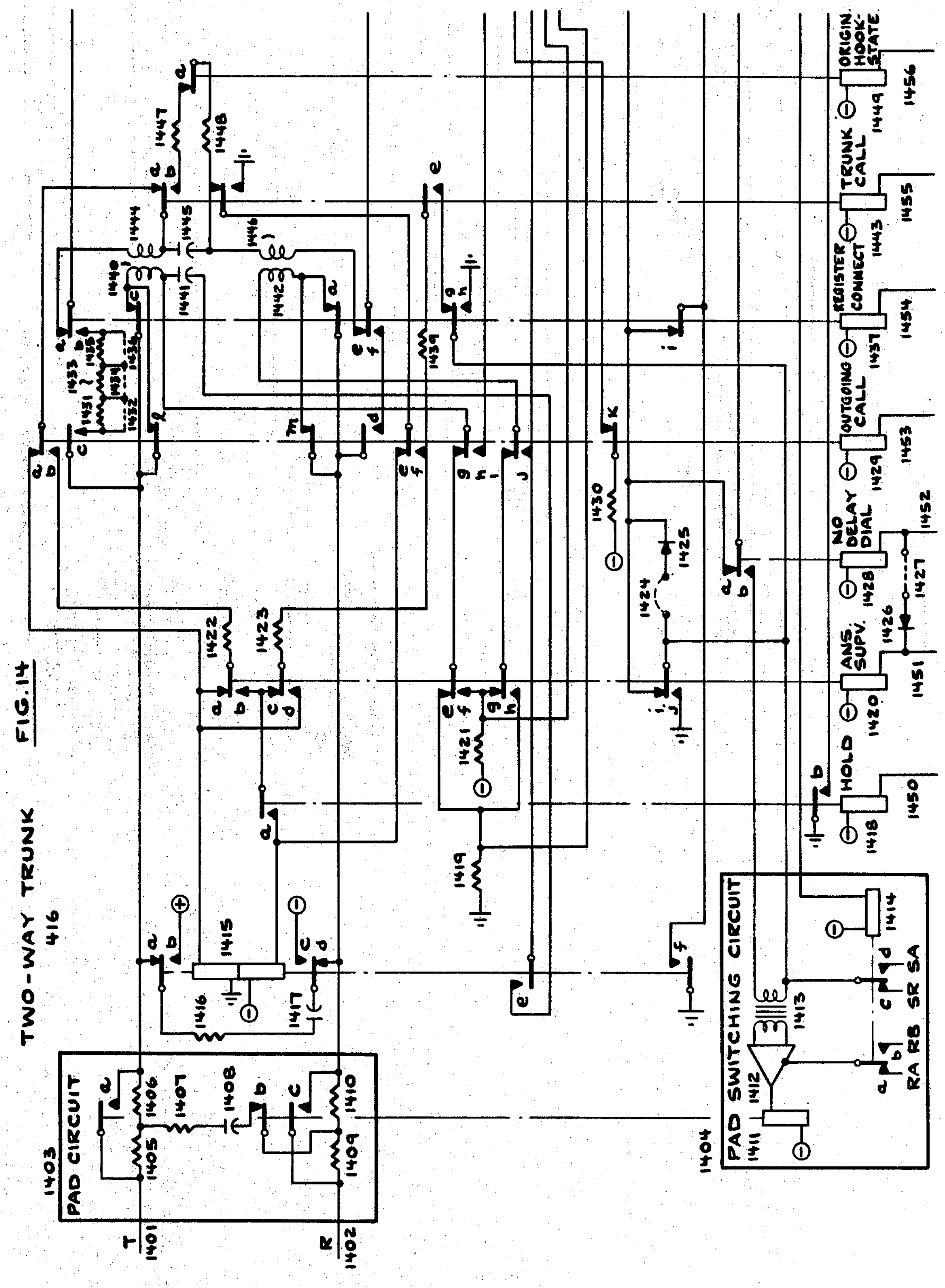
FIGS. 14—19 assembled as shown in FIG. 31, provide an assemblage drawing associated with trunk operation comprising: a two-way trunk schematic as shown in FIGS. 14 and 15; the associated interface logic diagram as shown in FIGS. 16 and 17; a supervisory control block diagram as shown in the lower part of FIG. 16 and in FIG. 18; blocks representing a multifrequency link, a trunk sender link, and associated apparatus in FIG. 19; and blocks representing data transfer units in the lower portion of FIGS. 18 and 19.
Figure 15:
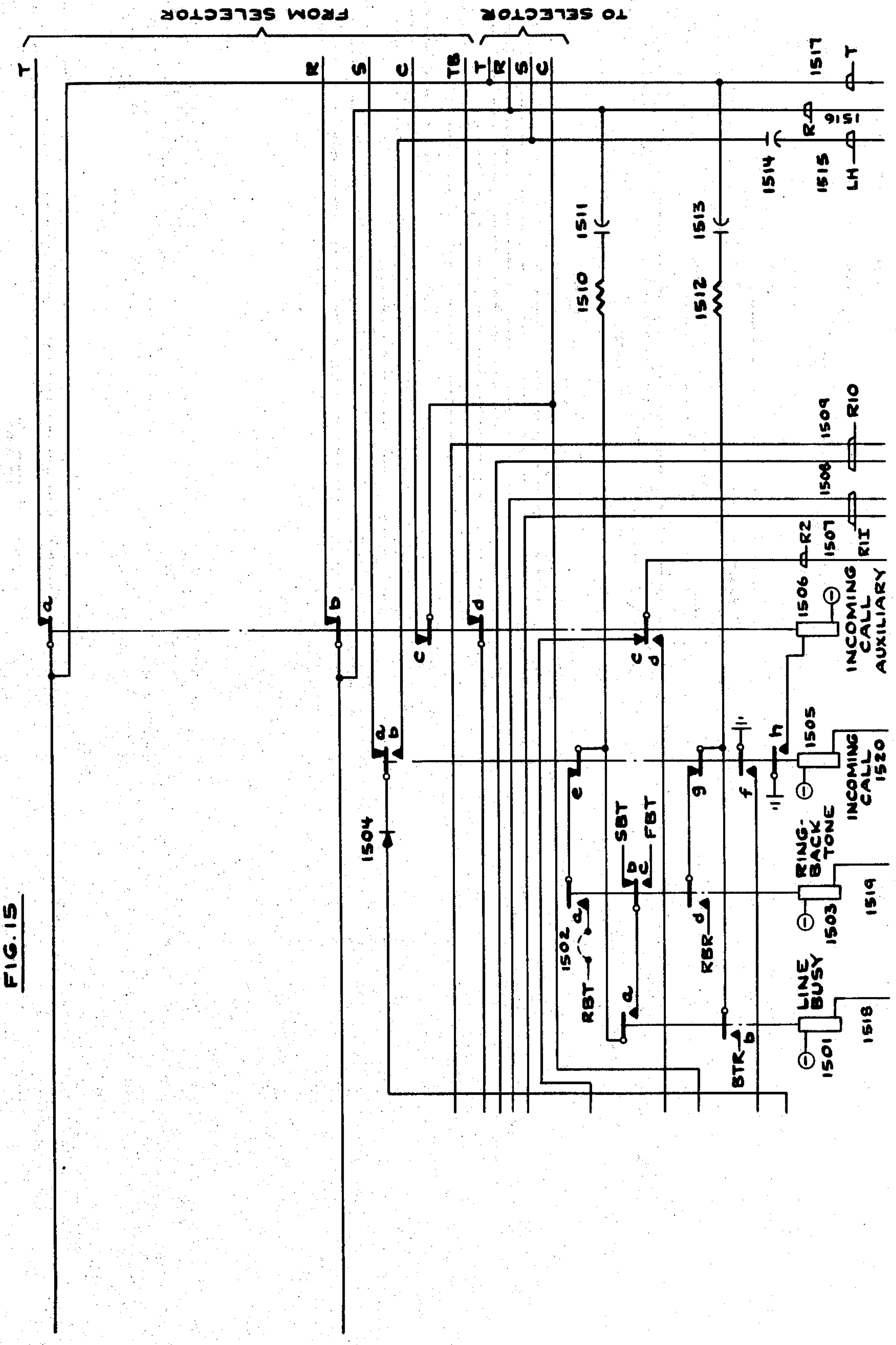
Figure 16:
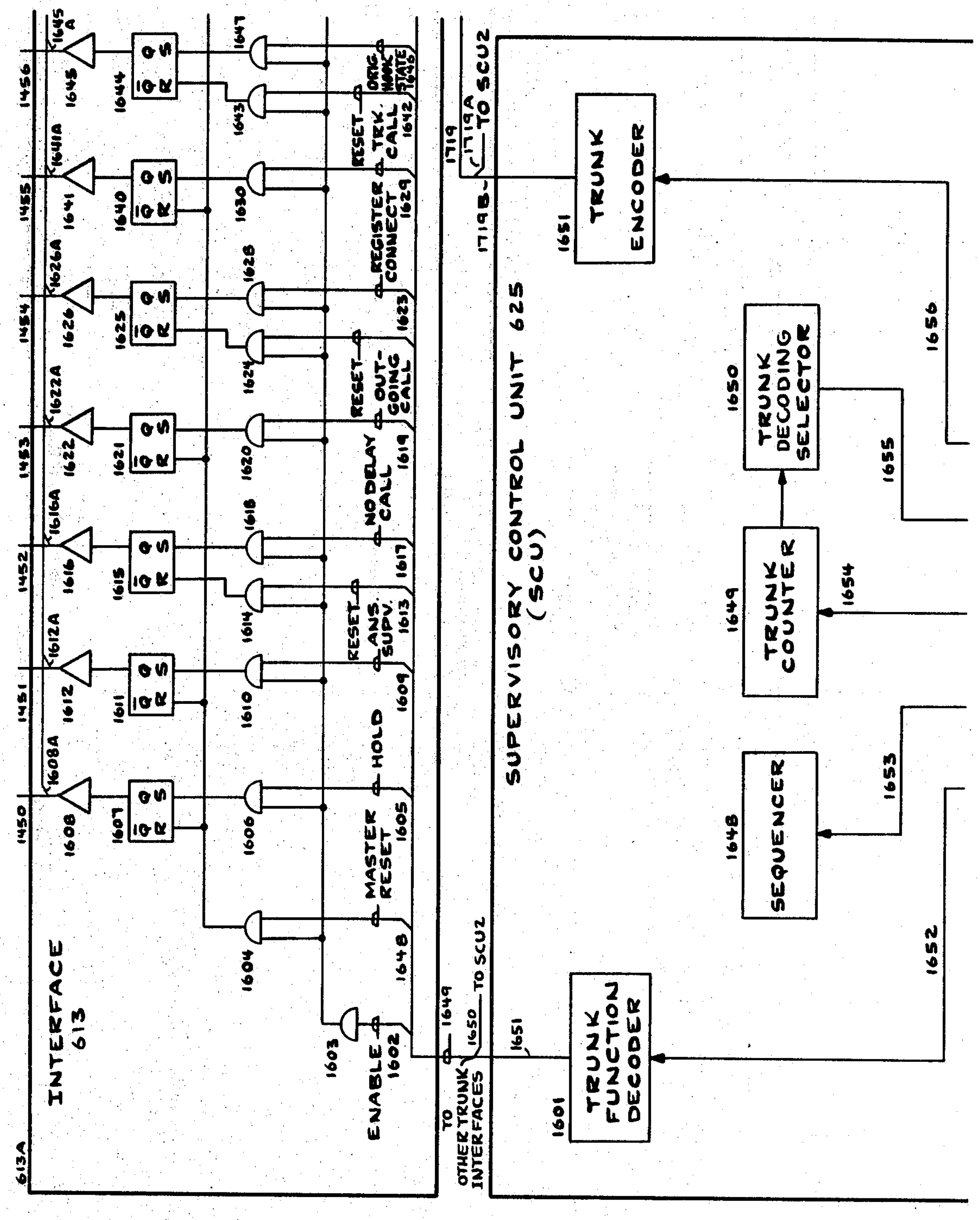
Figure 35:
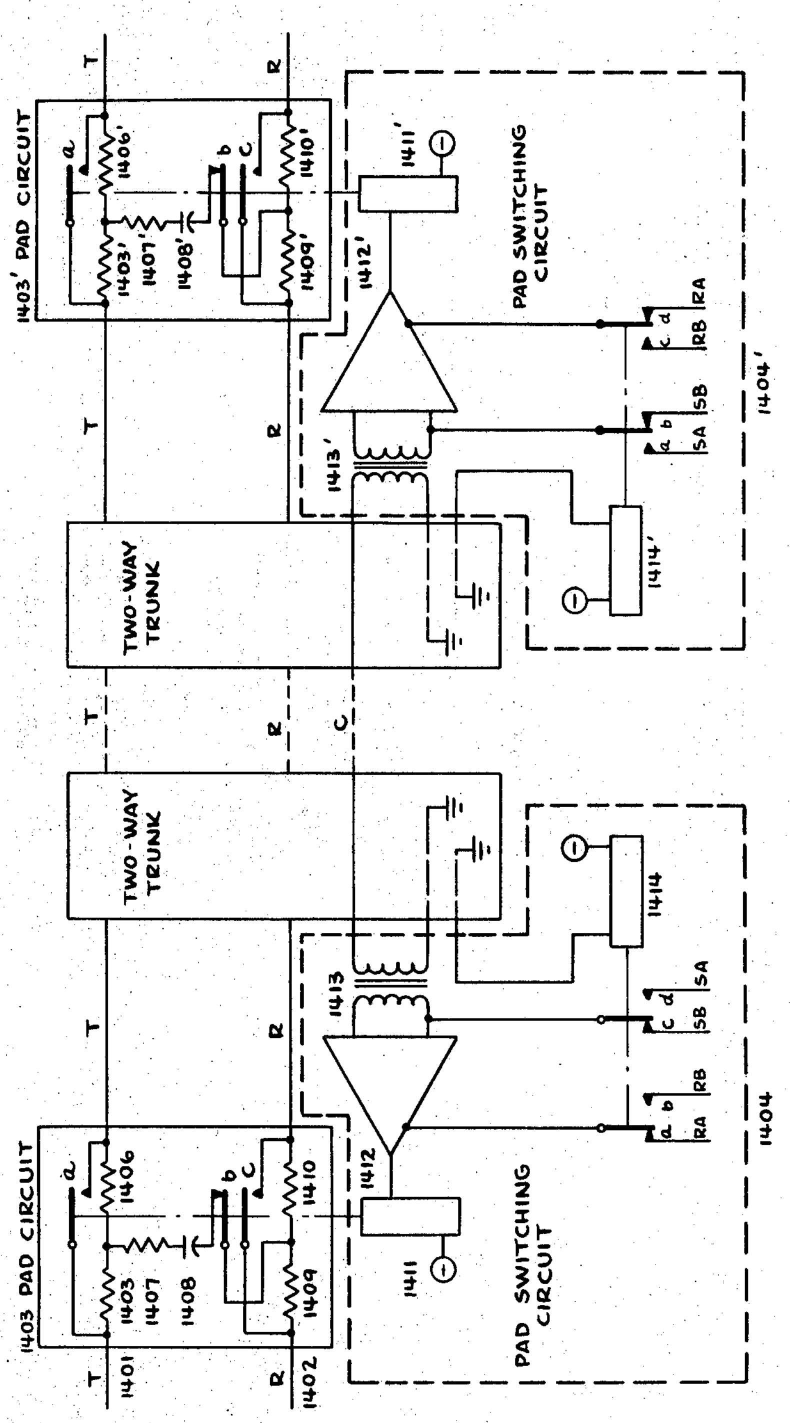
FIG. 35 is a sketch illustrating pad switching.
Figure 36:
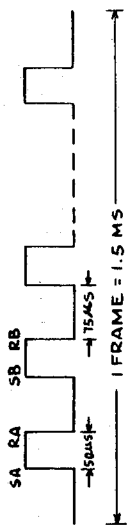
FIG. 36 is a showing of the waveforms of pulses input to the pulse receiver means of the pad switching circuit.

Referring to FIGS. 14, 35 and 36, transmission pads that incur a transmission loss of 2 *db* at 1000 cps. are used for the control of echo and singing in telephone networks. The requirements depict a transmission loss of (VNL + 4) *db* on toll calls where VNL is the via net loss of the transmission path between the originating and terminating telephone offices.

The 2 *db* pad, such as 1403, essentially consisting of an RC attenuating network, along with a synchronous pulse receiver (SPR) such as 1412 and associated transformer, such as 1413, is mounted as a separate plug-in unit with control leads from the trunk.

The synchronous pulse receiver is continuously receiving reference pulses of 50 $\mu s$ duration with a 75 $\mu s$ interval between successive pulses. There are 12 such pulses in a frame of 1.5 ms. duration (FIG. 36). SPR has means for detecting the coincidence of this reference pulse with the signal pulse of the same duration and at whatever time this coincidence is detected a ground is extended to the associated pad switching relay.

To meet the transmission loss requirements on a tandem call, the switching center takes the 2 *db* pad out of both the incoming and the outgoing trunks.

More specifically, referring to FIG. 14 and FIG. 35, when a trunk is being used as an incoming trunk, relay 1414 operates and through its contact *d* sends out a synchronous pulse SA on the C wire. Since the call is a tandem call this incoming trunk will be metallic connected to an outgoing trunk. The SA pulse sent over the C wire is received by the synchronous pulse receiver 1412' of the outgoing trunk which is also receiving a reference pulse RA from the pulse generator. The coincidence of the two pulses operates the pad switching relay 1411 which at contacts *a*, *b*, and *c* removes the pad 1403' from the outgoing trunk. At a different time slot *a*, pulse SB is sent over the C wire through the contact *b* of relay 1414 in the outgoing trunk and which is received by the synchronous pulse receiver 1412 in the incoming trunk. The SPR 1412 is also receiving a reference pulse RB from the pulse generator and the coincidence of SB and RB operates the pad switching relay 1411 which, at its contacts *a*, *b*, and *c*, removes the pad 1403 from the incoming trunk.

After the call is completed, the absence of the SB and SA pulses is detected by the pulse receivers 1412' and 1412 which brings the relays 1411' and 1411 back to normal and this reinserts the pads 1403' and 1403 in the trunk circuits.

Figure 24:
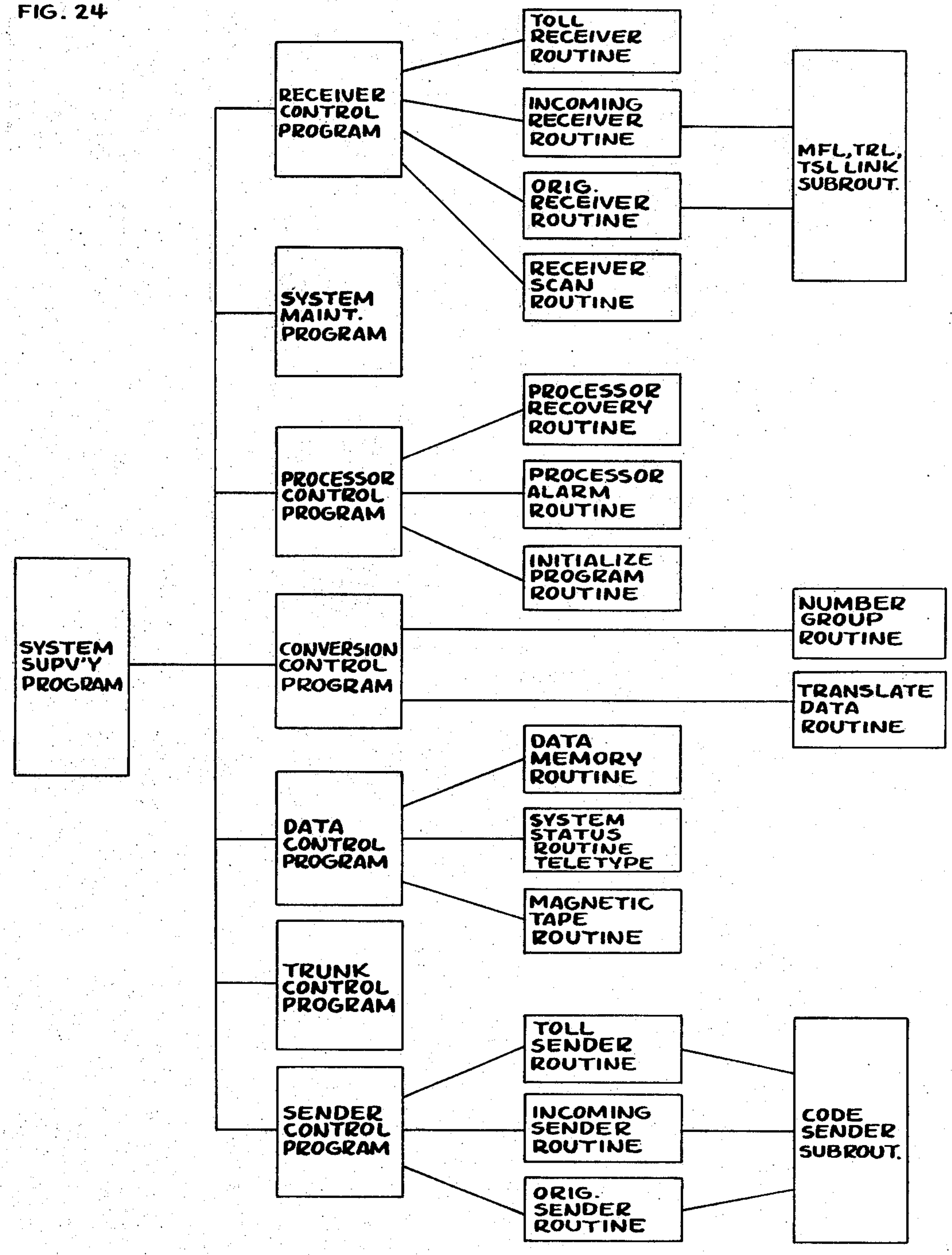
FIG. 24 is a block diagram of the routing control unit stored program.
Figure 25A:
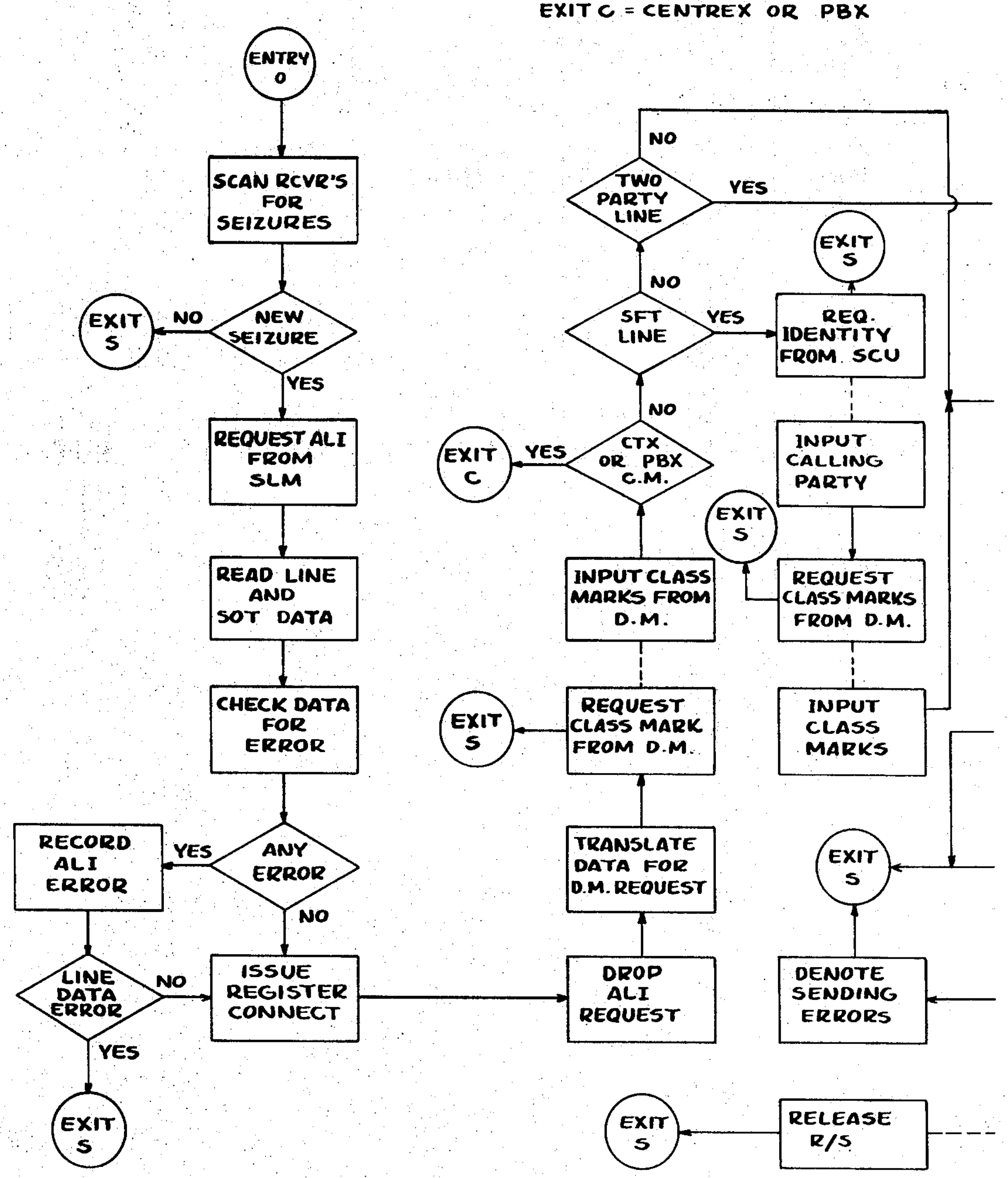
FIGS. 25A, 25B; 26A, 26B; 27A, 27B, comprise a flow chart illustrating a local-to-local call.
Figure 25B:
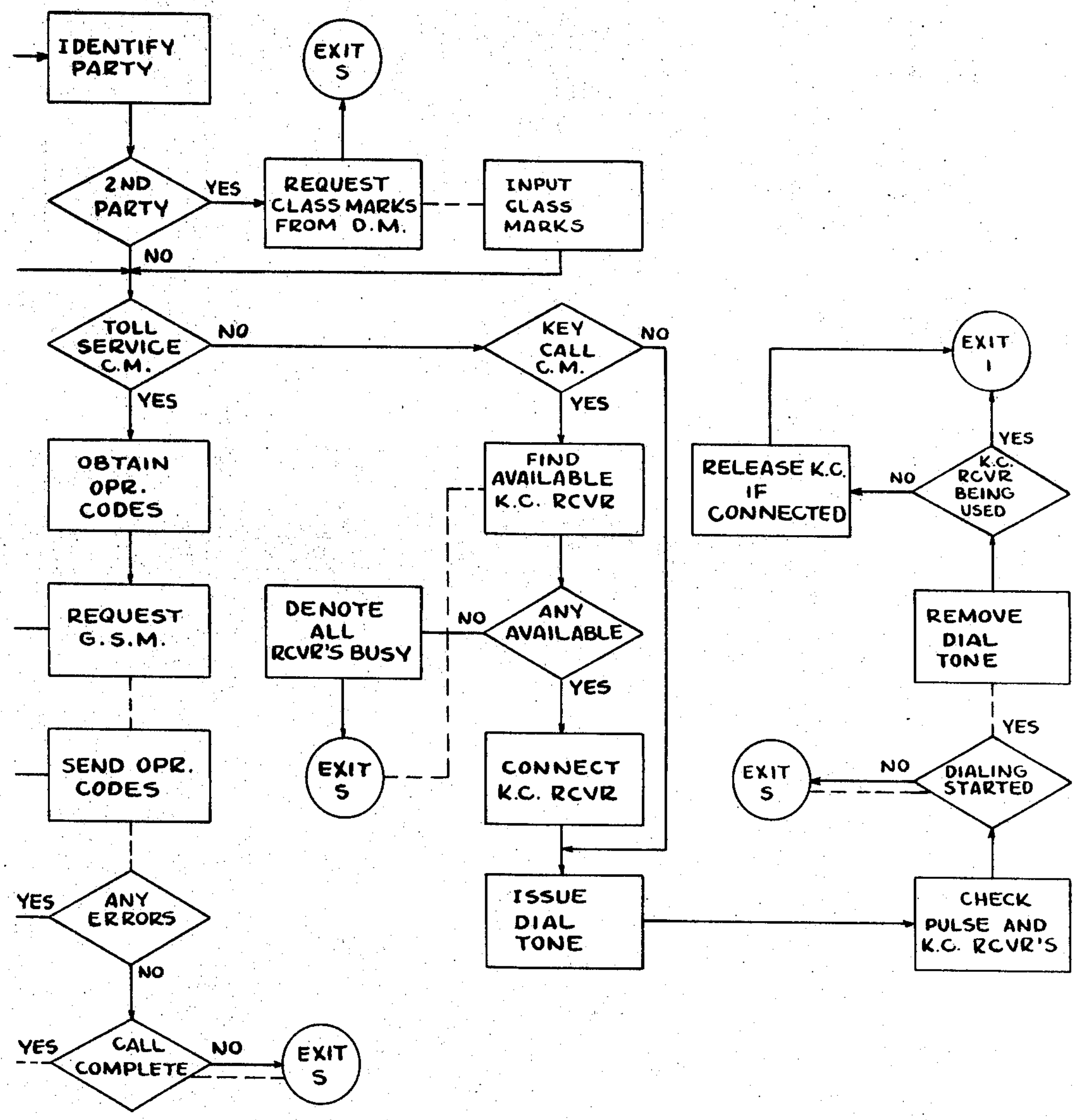

SUPERVISORY PROGRAM OF SYSTEM (See FIG. 24)

The system supervisory program consists of the following programs:

1. Receiver Control Program.
2. System Maintenance Program.
3. Processor Control Program.
4. Conversion Control Program.
5. Data Control Program.
6. Trunk Control Program.
7. Sender Control Program.

1. Receiver Control Program. This program consists of the following routines:
   a. Receiver Scan Routine. This routine scans all RSO's every 10 ms. and identifies and line associated with any seized RSO.
   b. Original Receiver Routine. This routine prepares RCU–1 or RCU–2 for the reception of dialed digits over an RSO, such as 716.
   C. Incoming Receiver Routine. This routine prepares RCU–1 or RCU–2 for the reception of dialed digits over an incoming trunk.
   d. Toll Receiver Routine. This routine takes care of the toll ticketing associated with an incoming trunk call.
2. System Maintenance Program. This program checks to see if the various system elements in the system are functioning properly.
3. Processor Control Program. This program consists of the following routines:
   a. Initialize Program Routine. This routine performs the setting up of main program parameters.
   b. Processor Alarm Routine. This routine is capable of detecting any fault in the system associated with one processor and issuing an interrupt to the other processor.
   c. Processor Recovery Routine. In case of some difficulties (for example, parity error in the memory) with one processor this program performs the transfer to the other processor in the same RCU pair.
4. Conversion Control Program. This program will access the data memory 800 and get the number group translation along with the necessary routing information.
5. Data Control Program. This program consists of the following routines:
   a. Magnetic Tape Routine. This routing prepares the KCU for input and output from the magnetic tape mounted on the magnetic tape deck 810.
   b. System Status Routing Teletype. This outputs the call process information as well as inputs any instructions from the teletype units.
   c. Data Memory Routine. This routine prepares the data memory 800 for the input or the output from the RCU's.
6. Trunk Control Program. This routine supervises an communications, such as SFT, information (except the dialed digits) between SCU and RCU's.
7. Sender Control Program. This program consists of the following routine:
   a. Original Sender Routine. This routine prepares the RSO, such as 716, for the sending of the translated digits.
   b. Incoming Sender Routine. This routine brings about the outpulsing of the translated digits to an outgoing trunk.
   c. Toll Sender Routine. This routine takes care of the toll ticketing associated with an outgoing trunk call.

PROCESSOR

The processor 1319 is an integrated circuit, stored program special-purpose digital control processor. With flexible but powerful instruction addressing capability, fast computation speeds, and data transmission. The processor is efficient in limited-volume data processing and in controlling switching systems.

Processor Characteristics Stored Program Flexible repertoire of instruction Parallel mode operation Fixed point arithmetic Single Address logic Logical and masking operation 17 bit storage word Indexing (16 data + 1 parity) Two 16-bit Index Registers Bit Sensing Two 8-bit Base Registers Binary Arithmetic System Interrupt (8 levels) TTL circuits

Basic Processor

The basic processor consists of logic processor control unit 1322, a data handling unit 1320, a magnetic core storage comprising instruction and temporary memory 1324, and a console (not shown). Overall system operation depends on the integral operation of these elements.

The magnetic core storage unit 1324 provides highspeed, random access storage for up to 65,536 words. Storage words can be used to hold either data or instructions. As each word is used from storage, the appropriate parity bit accompanies it to the processor where it is scheduled for parity.

Storage Addressing

The location of each word in storage is identified by an assigned number (address). An address consists of up to 16 bits of information.

Registers

The processor 1319 contains program addressable registers in data handling unit 1320. The majority of these registers are made up from a 16 × 16 memory array which is located in the data handling unit (DHU). 1. PC — 16 bits in length, contains the binary address of the next memory word which will be executed as an instruction (Program Counter). 2. A — 16 bits in length, used as a data accumulator and operand register. 3. Q — 16 bits in length, used for holding intermediate or data masks. 4. X — 16 bits in length, used as an address index or counter. 5. I — 16 bits in length, used as an address index or counter. 6. no — 8 bits in length, used as a base address register. 7. B1 — 8 bits in length, used as a base address register. 8. R — 16 bits in length, used as a general purpose register. 9. S — 16 bits in length, used as a general purpose register. 10. T — 16 bits in length, used as a general purpose register. 11. U — 16 bits in length, used as a general purpose register. 12. V — 16 bits in length used as a general purpose register. 13. W — 16 bits in length, used as a general purpose register. 14. IA — 16 bits in length, contains the address for the first word of interrupt data. 15. N — 5 bits in length, used as the indicator register with the following bit position assignment.

| 4 | 3 | 2 | 1 | 0 |
|---|---|---|---|---|
| Branch | High | Equal | Low | Overflow |

16. M — 8 bits in length, used as the interrupt mask register. 17. E — 8 bits in length, used as the interrupt recognition register.

Data Representation

All data processed by the processor will be represented as binary numbers (base 2). The following is the bit value for each position in a word.

| Word | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Bit Value | $2^{15}$ | $2^{14}$ | $2^{13}$ | $2^{14}$ | $2^{11}$ | $2^{10}$ | $2^9$ | $2^8$ | $2^7$ | $2^6$ | $2^5$ | $2^4$ | $2^3$ | $2^2$ | $2^1$ | $2^0$ |

In order to facilitate human communication of these binary numbers, they are coded as octal numbers (base 8) by grouping them into 3 bits per digit. The 16 bit binary numbers are also represented then by 6 octal digits as follows.

| Word | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| | $2^0$ | $2^2$ | $2^1$ | $2^0$ | $2^2$ | $2^1$ | $2^0$ | $2^2$ | $2^1$ | $2^0$ | $2^2$ | $2^1$ | $2^0$ | $2^2$ | $2^1$ | $2^0$ |
| | $8^5$ | $8^4$ | | | $8^3$ | | | $8^2$ | | | $8^1$ | | | $8^0$ | | |

Example:

| | | | | | | |
|---|---|---|---|---|---|---|
| Binary Number | 1 | 0 1 1 | 0 0 1 | 1 1 0 | 1 0 1 | 1 1 0 |
| Octal Equivalent - | 1 | 3 | 1 | 6 | 5 | 6 |

Memory Word Formats

Data Words

Memory data words consist simply of 16 bit binary data words with the following format:

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|

Instruction Words

Memory words which are interpreted to be instructions are assumed to have a fixed word length format.

| | 15 | 14 … 10 | 9 8 | 7 … 0 |
|---|---|---|---|---|
| Example: | B | Op. Code | M | R |

B — Selects base address register. Op. Code—Specifies the operation to be performed. M — Specifies mode of addressing. R — Address portion of the instructions.

Address Formation

Three types of address formations are used by the processor:

1. Operand
2. Fixed
3. Relative

Operand

Four modes be utilized by instructions which access one operand from memory. These modes are: N —No Address The half precision operand is contained in the address portion of the instruction. (R) Bits 81315 of the operand are forced to zeros. 2. D —Direct Address —The operand address is formed by the concatenation of a selected base address register contents and the R portion of the instruction word. The R portion of the instruction word is thus capable of directly addressing any word within a given 256 word block. The word is addressed by the contents of a selected base address register, which is always assumed to be preloaded with the desired value. Thus, the direct address mode allows the processor to access any operand word up to the maximum memory capacity. 3. I —Indexed Address — The indexed address is formed by first concatenating a selected base address register contents and the R portion of the instruction word. Next the I register contents are binarily added to form the operand word address. The indexed address provides a convenient means of sequentially accessing a series of up to 65,536 data words. 4. X —Indexed 2 Address —Same as I except the X register contents are binarily added to form the operand word address.

Fixed

Fixed addressing is used by some instructions where the address of the operand is contained in a specific register in the memory array.

Relative

Relative addressing is used by all test instructions to determine the location of the next instruction to be executed when a branch condition exists. This instruction forms the N.I. (next instruction) address by specifying an address relative to the location in memory of the test instruction word. A single bit (S) specifies the relative direction, and the contents of the R portion of the instruction specify the number of words. Thus, the most test instructions can branch to any instruction word located ±256 word positions relative to its location. Longer branches, when necessary, are performed by executing a Jump instruction which has full memory addressing capability.

Jump Address

The JUMP instructions has full memory word addressing capability. The definition of the next instruction address corresponds to the operand word in previous descriptions. The following address relationships should be carefully noted:

Jump Addressing

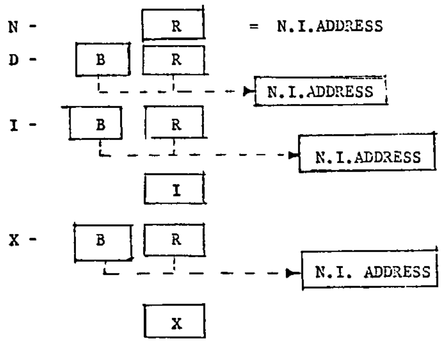

Register Array Addressing

Any register within the array can be addressed by using the operand address function.

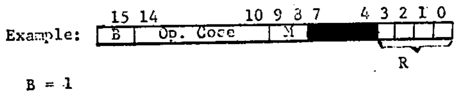

B = 1

Op.Code = any op. code.

M = N

R = any register within the array.

Input/Output Operation

The processor communicates with peripheral devices through busses which may be a set of common I/O busses. If a set of common I/O busses are used, the processor issues two types of information for use by system peripheral control units.

1. Output Data Word
   16 bits in length, presented on the transfer control unit-output data bus (TCU–OB) in conjunction with an address, which specifies the device, presented on the transfer control unit-address bus (TCU–AB). The address must be loaded into the Q register before executing ODW instruction.
2. Input Data Word
   16 bits in length, the 16 bits transfer control unit-input data bus (TCU–IB) are sampled in conjunction with an address, which specifies the device, presented on the TCU–AB. The address must be loaded into the Q register before executing IDW instruction.

Interrupt Operation

The processor contains eight (8) interrupt levels 0—7 which are used in controlling the sequence of program execution. Each of the interrupt levels has a priority permanently assigned to it, with level 0 having top priority and level 7 having lowest priority. Each of the eight interrupt inputs has assigned to it, on a 1: 1 basis, a bit in the interrupt mask register. If the mask bit is set and the corresponding bit in the interrupt register is set by an interrupt, the processor will recognize the interrupt.

If the mask bit is off, the interrupt is inhibited and the processor will not recognize the interrupt.

A single control element is used to allow the processor to recognize or ignore all interrupt register requests. This element, the Interrupt Enable (IE) unit is turned on by:

1. The processor executing an ENA instruction.
2. The processor executing an RCD instruction.

The IE is reset by one of three methods:

Executing a DIS instruction.

2. Recognition of an interrupt condition.
3. Master Reset.

The processor checks all interrupt register levels during the execution of each instruction; recognition can only occur after the instruction is completed.

Each level of interrupt has permanently assigned to it two words of memory. The recognition of an interrupt on a particular level causes the processor to transfer control to the address of the first word associated with that level. It is assumed the first word will contain a SCD instruction and the second work will contain a JMP instruction. Execution of the SCD will save pertinent data, concerned with the routine in which the interrupt occurred, to allow the processor to return and continue processing, beginning with the next instruction of that routine. The JMP instruction will transfer control to the appropriate routine for servicing the interrupt level.

The interrupt register and mask register are program addressable which allows the programmer to exercise complete control over the interrupt processor.

Routine Linking

Special hardware considerations have been provided to facilitate program routine linking and retain reentrant programs. This feature is implemented on the JMP instruction. A JMP instruction will transfer processor control from the JMP instruction location N to the desired routine. Also, the address N + 1 is calculated and stored into the T register.

If the routine does not require T during its execution, the Q register can be used as a temporary link register. Upon completion of the routine, A JFT instruction will return processor control back to the main routine.

If the routine requires the use of T or desires to return to a location rather than N + 1, T can be processed and/or stored for use upon completion of the routine.

Another feature is that the interrupt level may be ascertained by examination of Q following the execution of the JMP instruction in the second interrupt level word.

SYSTEM INPUT/OUTPUT OPERATION

The processor system must provide for a means of asynchronously transferring data between the processor memory and input/output devices (I/O), such as 801, 803 and 810, relative to the processor internal operation. A need is to provide data I/O transferral and control functions concurrent with normal online system routing control functions. This can be accomplished several ways. One method would be to allot processor interrupt signals to I/O devices. This method does not make efficient use of processor time unless a buffer is provided. A large buffer, however, is an expensive solution because it must be designed to accept synchronous data input and provide asynchronous data output with dual storage areas. Another method would be to design for direct access data transfer to and from the I/O devices from and to memory. This method requires a device to work with the processor on a memory cycle stealing basis whenever data transfer is necessary. Another method which incorporates parts of both of the other methods and integrates these by utilizing the existing processor hardware, follows.

The processor is designed with major parts comprising a Data Handling Unit (DHU), a Processor Control Unit, and a memory. The DHU has several general purposes (GP) registers available for data handling. The data operation will use two of these registers. One register will contain the next memory data word address to the input or output. The other register will contain the word count (WC). The contents of these GP registers will be preset by internal processor instructions prior to operation. The WC content will define the number of words to input or output. As each word is transferred, the WC contents are decremented and when WC equals zero, the operation is complete.

The processor will be connected to two types of control units in a system. One type of control unit, such as 812, manipulates the Magnetic Tape (MT) unit and the other type of control unit, such as 808 and 809, manipulates the two teletype (TTY) units. The two types of control units perform buffering and rudimentary data transfer unit functions and are so manipulated by the processor.

The control units are not connected directly to the RT/SMR words but via buffer means because it is desirable to have free standing units and to increase operation speed.

The first operation described will be with the MT control. Assume the processor program desires to write a record of memory words onto MT. The processor would, under program control, set up the GP registers with the first data word address and the total number of words to be written. The processor would then output a write control bit to the MT=SMR control word and then proceed to other system work. The MT control would initiate MT motion and send a MT Write Demand back to the processor. This demand would be recognized by the processor control logic and cause the normal processor functions to hesitate upon completion of its current instruction execution. As soon as the processor hesitates the control logic would address processor memory with the content of the data address GP registers; decrement the WC; input the word from processor memory; address the MT data SMR word; and output the memory word to the MT control. The processor control logic would then release the processor to continue its normal function. The MT control would buffer the data word until such time as the tape unit was conditioned to begin writing data onto tape. The data word would be divided into characters and as each tape write clock occurs, a character is written. As soon as the last character is written, a new "MT Write Demand" is sent to the processor to obtain the next data word from memory.

When the WC has been decremented to zero, a flag is set in the processor control logic. When the WC = O flag is on and a demand is recognized, the processor control logic resets the MT write control bit by addressing the MT SMR word and writing a zero. The MT control unit then terminates the record with a record gap and stops tape motion. The processor control logic also sets the MT interrupt bit which allows the processor to provide new record data pointers under system program control.

Reading MT record data and transferring the data to processor memory occurs in a similar fashion as writing. The processor, under internal program control, sets up GP control registers and initiates a "read" order. The MT control unit executes the order by starting MT motion. As each data word is accumulated in the MT control unit, A "MT Read Demand" is sent to the processor. At the completion of its current instruction execution, the processor hesitates and the DHU is ordered to input the data word and write it into processor memory. The GP control registers are updated and the processor is released.

Termination of MT reading and writing can occur from several causes. The normal cause would be when the WC = O condition occurs. Another case would be when reading a record which is shorter than specified by WC. This case would be detected by the MT control unit recognizing the End of Record (EOR). The MT control unit would then do three things:

1. Set MT interrupt bit in processor.
2. Set status RT word End of Reading (EOR) bit on.
3. Stop tape motion.

The processor in servicing the interrupt under program control would interrogate the status word and take appropriate action. End of tape (EOT) would also terminate tape operation.

Error conditions which are recognized during reading and writing do not cause termination but are recorded by setting appropriate status word bits. The processor upon normal termination, always verifies no error conditions were encountered prior to processing the tape data. Read retry can be programmed and if not successful, the record can be identified for manual assistance. When writing, the record space on tape can be deleted.

MT control functions such as rewind, backspace, etc., are controlled by the processor setting appropriate control bits in the MT SMR control word.

It should be apparent that the operations described are similar to cycle stealing direct access channel operations. The difference being that the direct access channel and processor operation involves the interaction of two units while the method described has integrated the two control functions and time shares the data handling unit (DHU) of the processor between the two functions. The advantage of the method obviously is reduced cost since the control registers, data registers and data transfer paths necessary for I/O data operation are provided by the DHU. The advantage of this method over the large buffer control units is again reduced cost. The response time of the method is sufficient to allow only a single data word to be buffered by a control unit.

The processor system uses two TTY units during operation. One TTY unit provides keyboard, printer, paper tape input, and paper tape output for the system. The other TTY unit provides only printer output. During the processor system operation, several "canned" messages will need to be printed on the TTY units. These messages can be easily printed by providing a TTY controller and a processor operation similar to that described to write MT. It is also necessary for operating personnel to communicate with the software system via the TTY keyboard. This operation is similar to reading a MT record of unknown length. It is handled by giving a maximum WC and expecting an end of message (EOM) symbol to be detected by the TTY control unit. It is then processed such as the EOR during MT read. Paper tape input/output operations are similar to MT read/write except at a much slower rate of data transfer.

Keying Via Sender-Receiver Unit 801

In further detail, let us suppose that the START key of the keyboard associated with the receiver-sender unit 801 is depressed, causing the unit to send the START character, which becomes stored in the buffer of teletype controller 808. As a result thereof, a processor interrupt signal of high priority is sent from controller 808 over paths 808A, 830A, 1309 and 1309A to processor control unit 1322 which causes the insertion of this teletype control to be inserted into the program at the proper priority level allowing the program to continue. When the program execution gets around to handling this teletype operation PCU–1322 places the number of words to be expected in the word counter register of DHU–1320, and the address in the address register DHU–1320 defining the location of the first word thereof to be stored in the temporary portion of memory 1324.

PCU–1322 also conditions the direct access channel equipment (DAC–1322B) to receive data from the teletype controller. When the next key is depressed (which is part of the message), the teletype controller buffers the signal and sends an interrupt signal to DAC–1322B, stopping the program being executed by PCU-1322 and initiating the storing cycle of DAC-1322B.

DAC-1322B picks up the address from DHU-1320 and uses this to begin the storage of information from controller 808 in memory 1324, increments the content of the address register of DHU-1320, decrements the word counter register, checks for zero count in the word counter register, and releases the processor to resume its program at the point at which it was interrupted. This process is repeated upon the receipt of succeeding characters of the message. At the end of the message an "end of message" key is depressed causing such signal to be received by controller 808 which sends an interrupt signal to the processor 1319 of the same level as the "OR" type interrupt.

Thereupon the processor 1319 interrogates the controller 808, receiving the "end of message" signal via an RT word. Processor controller 1322 releases the DAC-1322B circuit.

Sending to Receiver-Sender Unit 801

To send to the unit 801 enabling same to print out a message, the processor 1319 under program control sets up the same two registers in DHU-1320 associated with DAC-1322B, one for registering the number of words and the other the location of the first word in memory 1324, conditions DAC-1322B; initiates a command to controller 808 to begin the printing mode; and then continues execution of its program.

When the controller 808 is ready, it sends back a "write" interrupt to DAC which halts the processor execution of its program, initiates DAC access to temporary memory from which, via DAC, a word is sent to controller 808. DAC-1322B increments the register in DHU-1320 containing word location, decrements the register in DHU-132 containing the number of words, and releases the processor 1319 by means of PCU-1322. The controller 808 causes unit 801 to print the word.

The controller 808 then sends the "write" interrupt to DAC-1322B. This process continues until the word counter is decremented to zero, at which time DAC-1322B signals the processor whereby control is transferred back to the supervisory program.

The processor is a redundant system; therefore, each control unit must have the capability of communicating with either of two processors. The MT control unit must provide a switch over configuration panel to connect either processor to the MT unit. The TYY control unit must provide a switch over configuration panel which connects either processor to either of the TTY units.

It should be understood that wherever a word is described as having 16 bits, a seventeenth bit can be included for parity purposes. Also that wherever a memory is stated as having 16K or 64K word capacity this means 16×1024 and 64×1024, further the terms program and routine have been used interchangeably herein.

As an example of techniques which might be employed in "key call" receivers see U.S. Pat. No. 3,076,059.

We claim:

1. A telephone switching system comprising a plurality of lines divided into groups, a switching network for interconnecting said lines, receiver-sender means, a plurality of subscriber line marker means connected for use in controlling extension of the lines over paths including selected switches in said network to said receiver-sender means, routing control means having memory means for storing temporary information and program sequence instructions for use in controlling said switching network in the interconnection of said lines, data transfer means connected between said receiver-sender means and said routing control means, means including said data transfer means, said receiver-sender means and said subscriber line marker means for identifying to said routing control means the one of said subscriber line marker means which is used in a call, said routing control means being operative responsive to said subscriber line marker identification to effect readout of further call information from said identified subscriber line marker means via said data transfer means for storage in said memory means.

2. A system as set forth in claim 1 in which said data transfer means has a word for identifying the marker in use in a call, and each marker means has an identification lead connected to said data transfer means for marking a bit in said word, the identification lead for different markers being used to mark different bits in the word whereby readout of the word identifies the marker in use in the call to said routing control means.

3. A telephone system as set forth in claim 1 in which a predetermined plurality of said line groups are served by at least a pair of subscriber line markers, and said data transfer means includes word bits identifying the different ones of said predetermined line groups for readout by said routing control means.

4. A system as set forth in claim 1 in which said data transfer means includes means for providing calling line identity for readout by said routing control means.

5. A system as set forth in claim 1 in which said switching network includes a plurality of subscriber line switches (SLA) for each predetermined group of said lines, and in which said data transfer means includes word bits for identifying the one of the SLA switches to which a calling one of the lines is connected and other word bits for identifying said calling one of the lines connected to the SLA.

6. A telephone system as set forth in claim 5 in which said switching network includes a plurality of subscriber register link switches (SRL) for each predetermined group of lines, each SRL switch having a plurality of subscriber originating trunk switches (SOT) connected for use therewith, and in which said data transfer means also includes word bits identifying the SRL group of SOT switches which is used in the call, and the one of the SOT switches in the SRL group.

7. A system as set forth in claim 1 in which called line directory number digits dialed by the calling station are transmitted to said receiver-sender, and in which said routing control means is operative during successive scans of said receiver-sender under program control by said routing control means to detect and store the called line directory number digits in said memory means.

8. A system as set forth in claim 1 which includes means in said receiver-sender means selectively enabled by said routing control means via said data transfer means to transmit dial tone over said selected switches to said calling line.

9. A telephone switching system comprising a plurality of lines, a switching network for interconnecting said lines, a group of receiver-sender means, subscriber marker means engaged by a call incoming over a calling line for connecting said calling line over selected switches in said network to an idle one of said receiver-sender means, routing control means having memory means for temporary information and memory means for storing program sequence instructions used in controlling connection of said calling line over said switching network, means including data transfer means and said receiver-sender means for identifying said calling line to said routing control means, data memory means for providing information relating to said calling line, means for passing the calling line identity from said routing control means to said data memory means, and means for providing said information for said calling line from said data memory means to said routing control means for storage in said temporary memory means.

10. A system as set forth in claim 9 in which said data memory means includes means for providing the calling line class marking to said routing control means.

11. A system as set forth in claim 9 in which said receiver-sender means is operative to receive the digits of the called party number transmitted by the calling party and said routing control means is operative in its scanning routine to detect and store same in said memory means.

12. A system as set forth in claim 9 in which abbreviated dialing information is provided over said calling line via said data transfer means and said receiver-sender means to said routing control means, and in which said data memory means includes means for storing the directory number corresponding to said abbreviated dialing information as supplied thereto by said routing control means.

13. A system as set forth in claim 9 which includes at least one group selector stage and means for establishing a path from said routing control means via said data transferring means and said receiver-sender means to said group selector stage, and to simultaneously release the subscriber marker means which was used in establishing the connection to the receiver-sender means used in the call.

14. In a telephone switching system, a plurality of lines, a switching network including a subscriber line stage, a subscriber originating trunk and at least one group selector stage with associated group selector marker means for use in interconnecting said lines, routing control means having memory means for storing temporary information and program sequences for use in extending calls over said group selector stage, signal transfer means connected between said subscriber originating trunk and said routing control means, means including said subscriber line stage, said subscriber originating trunk and said signal transfer means for extending a called directory number provided by one of said lines to said memory means, means in said memory means for registering the called directory number, data memory means, and means in said routing control means for transmitting address indicia corresponding to said called directory number to said data memory means, means in said data memory means responsive thereto to provide routing codes to said routing control means for use in extending a path over said group selector stage, and means in said routing control means for transmitting said routing codes over said signal transfer means and said subscriber originating trunk to said group selector stage.

15. A system as set forth in claim 14 in which said means in said data memory means which provides said routing codes includes means operative in a "number group" translation to provide the identification of the group of lines in which the called number is located, the equipment hundreds, tens and units digit location of the called subscriber, and the party-on-the-line designation of the called subscriber.

16. A system as set forth in claim 14 in which said signal transfer means includes receiver-sender means and in which said receiver-sender means includes means for seizing one of said group selector markers in response to a signal from said routing control means, and code receiver means in said group selector marker for receiving said routing codes from said routing control means via said receiver-sender whereby said group selector marker is enabled to extend a path through the group selector to a line group including the called line.

17. A system as set forth in claim 14 which includes a plurality of group selector stages, a wraparound trunk connected for selection over a first one of said group selector stages, and a plurality of further trunks connected for selection over said first and second group selector stages.

18. A system as set forth in claim 16 which includes a plurality of subscriber terminating trunks (STTs) associated with a predetermined group of lines, means in said group selector marker for selecting an idle one of said STTs, subscriber line marker means associated with the line group including the called line, means in said selected STT for calling in the code receiver of one of said subscriber line marker means, means in said routing control unit for transmitting information bearing signals to said called in code receiver, and means in said subscriber line marker means for transmitting corresponding information bearing signals back to said selected STT.

19. A system as set forth in claim 16 which includes a plurality of subscriber terminating trunks (STTs) and subscriber line marker means associated with a predetermined group of said lines, each STT including a code receiver, means in said group selector marker responsive to said routing codes for selecting an idle one of said STTs, means in said routing control unit for transmitting information bearing signals to the code receiver in the selected one of the STTs, and means in said selected STT for thereafter selecting the code receiver of one of said subscriber line marker means.

20. A system as set forth in claim 18 in which said information bearing signals comprises a first signal indicating the type of origin of a call, and a second signal indicating the party on the line.

21. A telephone switching system comprising a plurality of lines, a plurality of trunks, switching network means for interconnecting said lines and trunks, a plurality of supervisory control means for effecting common control of the plurality of said trunks, including means for detecting an incoming call over one of said trunks, routing control means having memory means for storing program sequences for use by said routing control means, data transfer means connected between said supervisory control means and said routing control means for identifying said calling trunk to said routing control means, and further memory means in said routing control means for temporarily storing the calling trunk identity.

22. A system as set forth in claim 21 in which said plurality of trunks includes at least one special-features trunk, and which includes data memory means for providing the class marking of each call to said routing control means, means enabled by said routing control unit to include each special-features trunk in a call originating from a line class marked for special feature service, and means connecting signals from said routing control unit to said supervisory control unit to enable same to control said special-features trunk in said call.

23. A system as set forth in claim 21 in which said supervisory control means includes means for scanning its associated trunks in a predetermined pattern, and means for providing the address of each trunk and its condition to said data transfer means.

24. A system as set forth in claim 21 in which each of said supervisory control means is operative to signal said routing control means in response to detection of a trunk which requires service by said routing control means, and means in said routing control means for determining the one of said supervisory control means which is signalling.

25. A system as set forth in claim 21 which includes data memory means for providing class marking for the trunk, the type of call which is incoming, and the type of incoming signalling, and in which said routing control means addresses said data memory means for such information in response to receipt of a trunk number by said routing control means.

26. A system as set forth in claim 21 in which said supervisory control means includes means for making connection with each of the plurality of trunks controlled thereby, each of said trunks being connected in a different preassigned time slot of a cycle.

27. A system as set forth in claim 26 which includes interface means connected between said supervisory control means and said trunks including means for transferring information relating to the status of each trunk during said time slots, and control logic means including means for determining changes required for the reported status of each trunk.

28. A system as set forth in claim 27 in which said supervisory control means includes register counter means, an address matrix, a working register circuit, sequencer means for advancing said register counter means to cause said address matrix to address said working register circuit, data register means, and means in said working register circuit operable by said sequencer means to output successive words to said data register means in search of an idle register.

29. A system as set forth in claim 28 which includes trunk counter means including means for identifying the trunk to which said supervisory control means is connected, and in which said sequencer means is operative responsive to detection of an idle working register to effect entry of the trunk number into said idle working register.

30. A system as set forth in claim 29 in which said control logic means controls said sequencer means to search for the trunk number in said working register circuit by successive readout of the trunk numbers to said data register, and trunk function decoder means is enabled responsive to a valid comparison of the trunk number in the trunk counter means with the trunk number in the data register, and marker means for said trunk is selectively controlled by said trunk function decoder means.

31. A system as set forth in claim 21 in which said supervisory control unit includes dial pulse receiver register means for registering the trunk numbers, and word storage means in the data transfer unit for registering the number of the trunk and number of the dial pulse receiver register assigned to its trunk call.

32. A system as set forth in claim 21 in which said further memory means in said routing control means includes registers, each of which comprises a group of cores for registering the identity of the calling trunk and the status of such trunk, data memory means, means for providing information from said data memory means to said routing control means relative to the call in progress over said trunk, and means for transferring such information from said routing control means over said data transfer means to said supervisory control unit to condition the supervisory control unit for receipt of incoming signals.

33. A system as set forth in claim 32 in which said switching network includes group selector means having group selector marker means for extending an incoming trunk to a group of said lines, and said supervisory control means includes means for transferring the signals representative of a called number via said data transfer means to said routing control unit and data memory means for providing said routing control means with the codes for controlling said group selector marker means to extend a path from said trunk means over said group selector means to said line group.

34 A system as set forth in claim 21 in which certain of said trunks include attenuating means connected in the path over its trunk, and switching means for each of said attenuating means, and in which a first and a second trunk are included in a trunk to trunk call, and means in said supervisory control means for controlling the switching means for the first trunk to operate the switching means for the second trunk to effect bypass of said attenuating means in the second trunk.

35. A system as set forth in claim 34 which includes means for providing control signals to said switching means in different time slots of a cycle, and in which said switching means for the first trunk effects said control of said switching means for the second trunk in one time slot, and said switching means for the second trunk control said switching means for the first trunk in a like operation in a different time slot.

36. In a processor controlled telephone switching system adapted for use with a nonprocessor controlled system said processor controlled system having a plurality of lines, a switching network including switching means for interconnecting said lines, routing control means having memory means for storing temporary information and program sequences for use in selectively extending calls over said switching network, means for registering the called number dialed by a calling party in said routing control means, data memory means for providing routing codes to said routing control means for controlling said switching network in extending a path from a calling line to a called line over said switching network in said processor controlled system, input means for extending connections from said nonprocessor controlled system to said routing control means, and means connecting said routing control means to said data memory means to provide number translation obtained from said data memory means over said input means to said nonprocessor controlled system for use in extending connections over the processor controlled system.

37. The invention as set forth in claim 36 in which nonprocessor controlled system includes number group translation equipment for the subscriber lines associated therewith, and in which said processor controlled system includes means for effecting selective connection between said routing control means and said number group translationequipment of said nonprocessor controlled system. m 38. The invention as set forth in claim 37 in which said switching network in said processor controlled system includes a group selector stage connected common to both systems, and in which said information provided by said data memorymeans in said processor controlled systeuand said number group translation equipment in said nonprocessor controlled system respectively are used to control said group selector stage in the extensions of calls to desired line groups.

39. A telephone switching system comprising a plurality of lines, a switching network including a subscriber line stage, a subscriber originating trunk and at least one group selector stage having associated group selector marker means for use in interconnecting said lines, routing control means including memory means for storing temporary information and program sequences for use in extending connections over said group selector stage, signal transfer means connected between said subscriber originating trunk and said routing control means, said routing control means further including processor control means and data handling means for controlling information exchange between the processor control means and said memory means, and direct access channel means for providing information from an input device via said data handling means to said memory means, and output means from said data handling means for supplying information from said memory means and said processor control means over said signal transfer means and said subscriber originating trunk to said group selector marker for use in establishing a path from a calling one of said lines over said group selector stage.

40. A telephone switching system comprising a plurality of lines, a switching network including switching means for selectively interconnecting said lines, control means for said switching network, processor means for selectively operating said control means, and signal transmission means for passing signals between said processor and said control means, said processor means including memory means for storing temporary information and program instructions for use in the setting up of said interconnections, data handling means operative to transmit temporary information received over said signal transmission means from said control means for storage in said memory means, said data handling means including a word scratch pad memory which provides program addressable registers for use in storing information incident to the setting up of said interconnections, and processor control means responsive to said stored program instructions in said memory means for enabling said data handling means in the provision of said signals over said signal transmission means to said control means in accordance with the information stored in said registers.

41. A telephone switching system as set forth in claim 40 in which said word scratch pad memory comprises sixteen registers, each of which is addressable by four preassigned bits of a sixteen bit instruction word.

42. A telephone switching system as set forth in claim 41 in which each of said 16 bit instruction words includes certain bits which designate the four bits of the sixteen bits as the address bits for the 16 registers.

43. A telephone switching system as set forth in claim 42 in which certain other bits in each of said 16 bit instruction words comprise an operation code with respect to the register selected by said four bits.

44. A telephone switching system as set forth in claim 43 in which said word scratch pad memory comprises a 16 × 16 memory array.

45. A telephone switching system as set forth in claim 40 in which one of said addressable registers is a program counter which normally is incremented by 1 to provide the address of the next instruction in said memory means, and means in said routing control means which are responsive to receipt of an instruction to jump to a subroutine to store the incremented program count in a further one of said addressable registers without further program assistance.

46. A telephone switching system as set forth in claim 45 in which the last instruction of said subrouting effects reset of said program counter with the program count in said further one of said addressable registers.

47. A telephone switching system comprising a plurality of lines, a switching network including switching means for selectively interconnecting said lines, control means for said switching network, processor means for selectively operating said control means, and signal transmission means for passing signals between said processor and said control means, said processor means including memory means for storing temporary information and program instructions for use in the setting up of said interconnections, data handling means operative to transmit temporary information received over said signal transmission means from said control means for storage in said memory means, said data handling means including a scratch pad memory which provides program addressable registers for use in storing information incident to the setting up of said interconnections, and processor control means responsive to said stored program instructions in said memory means for enabling said data handling means in the provision of said signals over said signal transmission means to said control means in accordance with the information stored in said registers, said program instructions effecting storage in one of said program addressable registers (IA) of the address of a first word of interrupted data, and means in said processor control means responsive to an interrupt signal incoming from said system for interrupting said program.

48. A telephone system comprising a plurality of subscriber originating trunks and subscriber terminating trunks, a plurality of receiver-sender means, an originating line stage serving a plurality of subscriber lines and associated markers responsive to a call originated over a calling one of said lines to connect said calling line via one of said subscriber originating trunks to an idle one of said receiver-sender means, means in the receiver-sender means for receiving signals representative of the digits of a called directory number incoming over the path from said calling line, processor means having a memory containing a stored program and signal means including a data handling means a nd a processor control unit enabled by said stored program to provide a signal output to said receiver-sender means, means in said receiver-sender means controlled by said signal output to forward said digits bit by bit via said data handling means to said memory means in said processor means, a data memory, means including said signal means in said processor means controlled by said stored program to obtain a number group translation of said called directory number from said data memory, a group selector stage and astion from said subscriber originating trunk to an idle one of said subscriber terminating trunks, said processor means being controlled by said stored program and said number group translation to transmit enabling signals via said receiver-sender means to said group selector marker means, terminating line stage for connecting said subscriber terminating trunk to the called line determined by said directory number, a portion of which terminating line stage contains switching equipment common to said originating line stage and being controlled by the same line stage markers as the originating line stage, said processor means being controlled by said stored program to transmit number group information via said receiver-sender means and said group selector stage to the line stage marker means for said subscriber terminating stage.